United States Patent
Miles et al.

(10) Patent No.: US 9,860,229 B2
(45) Date of Patent: Jan. 2, 2018

(54) INTEGRATED DATA EXTRACTION AND RETRIEVAL SYSTEM

(71) Applicant: SAS Institute Inc., Cary, NC (US)

(72) Inventors: Brian Oneal Miles, Cary, NC (US); Keith Adams, Durham, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/486,480

(22) Filed: Apr. 13, 2017

(65) Prior Publication Data

US 2017/0223003 A1    Aug. 3, 2017

Related U.S. Application Data

(63) Continuation-in-part of application No. 15/333,333, filed on Oct. 25, 2016, which is a continuation of application No. 14/868,666, filed on Sep. 29, 2015, now Pat. No. 9,483,477.

(60) Provisional application No. 61/418,392, filed on Nov. 7, 2016, provisional application No. 62/105,035, filed on Jan. 19, 2015.

(51) Int. Cl.
   *H04L 29/06* (2006.01)
   *G06F 21/62* (2013.01)

(52) U.S. Cl.
   CPC ......... *H04L 63/08* (2013.01); *G06F 21/6209* (2013.01); *G06F 21/6254* (2013.01); *H04L 63/02* (2013.01)

(58) Field of Classification Search
   CPC . G06F 21/6254; G06F 21/6209; H04L 63/02; H04L 63/08
   See application file for complete search history.

(56) References Cited

U.S. PATENT DOCUMENTS 5,991,758 A * 11/1999 Ellard ............... G06F 17/30321
6,397,224 B1 * 5/2002 Zubeldia ............... G06F 19/322
(Continued)

OTHER PUBLICATIONS

R. Bourret, C. Bornhovd and A. Buchmann, "A generic load/extract utility for data transfer between XML documents and relational databases," Proceedings Second International Workshop on Advanced Issues of E-Commerce and Web-Based Information Systems. WECWIS 2000, Milpitas, CA, 2000, pp. 134-143.*

(Continued)

*Primary Examiner* — Kari Schmidt
(74) *Attorney, Agent, or Firm* — Bell & Manning, LLC

(57) ABSTRACT

A first computing device connected to an internal network de-anonymizes data. A record including a surrogate key is received from a second computing device connected to an external network to the internal network. Each identity data record includes a second surrogate key, an entity identifier field value, a record type field value, and a de-identified field value. The second surrogate key uniquely identifies the respective record. The surrogate key is compared to the second surrogate key to identify a matching record. The matching entity identifier field value is selected and compared to the entity identifier field value of the plurality of records to identify a master record for the surrogate key. The record type field value includes an indicator indicating whether the record is the master record. The de-identified field value included in the identified master record is selected. The received record is supplemented with the selected de-identified field value.

30 Claims, 20 Drawing Sheets

(56) References Cited

U.S. PATENT DOCUMENTS

| | | | |
|---|---|---|---|
| 9,292,586 B2* | 3/2016 | Ahmed | G06F 17/30581 |
| 2002/0073138 A1* | 6/2002 | Gilbert | G06F 17/30 709/201 |
| 2005/0165623 A1* | 7/2005 | Landi | G06F 21/6254 705/2 |
| 2005/0236474 A1* | 10/2005 | Onuma | G06F 19/322 235/382 |
| 2005/0268094 A1* | 12/2005 | Kohan | G06F 19/322 713/165 |
| 2006/0059473 A1* | 3/2006 | Moler | G06F 9/5072 717/149 |
| 2009/0265316 A1* | 10/2009 | Poulin | G06Q 50/22 |
| 2010/0154038 A1* | 6/2010 | Natarajan | H04L 63/08 726/5 |
| 2011/0270833 A1* | 11/2011 | Von Kaenel | G06F 17/30241 707/736 |
| 2013/0304542 A1* | 11/2013 | Powell | G06Q 30/0203 705/7.32 |
| 2014/0047551 A1* | 2/2014 | Nagasundaram | G06F 21/60 726/26 |
| 2014/0136237 A1* | 5/2014 | Anderson | G06F 19/328 705/3 |
| 2014/0297330 A1* | 10/2014 | Rock | G06F 19/322 705/3 |
| 2015/0128285 A1* | 5/2015 | LaFever | H04L 67/02 726/26 |
| 2015/0193630 A1* | 7/2015 | Von Kaenel | G06F 17/30241 707/785 |
| 2016/0085915 A1* | 3/2016 | Seow | G06F 19/322 705/3 |

OTHER PUBLICATIONS

Pinto, David, et al. "Table extraction using conditional random fields." Proceedings of the 26th annual international ACM SIGIR conference on Research and development in informaion retrieval. ACM, 2003. pp. 235-242.*

Bernstein, Philip A., and Laura M. Haas. "Information integration in the enterprise." Communications of the ACM 51.9 (2008): 72-79.*

* cited by examiner

| extract_file_description | extract_file_pattern | extract_field_order | extract_field_name | extract_field_label | extract_field_type | extract_field_length | Extract_field_position | extract_field_format | extract_field_informat | extract_dq_rule |
|---|---|---|---|---|---|---|---|---|---|---|
| Sample file | sample.txt | 10 | Horsepower | | num | | 8 | BEST12. | BEST32. | DQ_EXRANGE(73-500) |
| Sample file | sample.txt | 11 | MPG_City | MPG(City) | num | | 8 | BEST12. | BEST32. | |
| Sample file | sample.txt | 12 | MPG_Highway | MPG(Highway) | num | | 8 | BEST12. | BEST32. | |
| Sample file | sample.txt | 1 | Make | | char | 13 | | $13.00 | $13.00 | DQ_CHARS|DQ_LOOKUP(adiext.car_make_list.make) |
| Sample file | sample.txt | 2 | Model | | char | 39 | | $39.00 | $39.00 | DQ_NOTNULL |
| Sample file | sample.txt | 3 | Type | | char | 6 | | $6.00 | $6.00 | |
| Sample file | sample.txt | 4 | Origin | | char | 6 | | $6.00 | $6.00 | DQ_INLIST(list='Asia':'Europe':'USA') |
| Sample file | sample.txt | 5 | DriveTrain | | char | 5 | | $5.00 | $5.00 | |
| Sample file | sample.txt | 6 | MSRP | | num | 8 | | DOLLAR8. | COMMA12. | DQ_DATATYPE |
| Sample file | sample.txt | 7 | Invoice | | num | 8 | | DOLLAR8. | COMMA12. | |
| Sample file | sample.txt | 8 | EngineSize | | num | 8 | | BEST12. | BEST32. | DQ_DATATYPE |
| Sample file | sample.txt | 9 | Cylinders | | num | 8 | | BEST12. | BEST32. | DQ_INRANGE(3-11) |
| Sample file | sample.txt | 13 | Weight | | num | 8 | | BEST12. | BEST32. | |
| Sample file | sample.txt | 14 | Wheelbase | | num | 8 | | BEST12. | BEST32. | |
| Sample file | sample.txt | 15 | Length | | num | 8 | | BEST12. | BEST32. | |

```xml
<?xml version="1.0" encoding="windows-1252" ?>
<REGISTRY>
  <ENTRY>
    <INCOMING>superset@host.json</INCOMING>
    <FREQ>1</FREQ>
    <TRIGGER_FILE_EXT></TRIGGER_FILE_EXT>
    <TRIGGER_VAL_LOAD_FLG></TRIGGER_VAL_LOAD_FLG>
    <PARTITIONED>N</PARTITIONED>
    <RUN_TIME></RUN_TIME>
    <RUN_DAYS></RUN_DAYS>
    <RUN_MONTHS></RUN_MONTHS>
    <RUN_DOW></RUN_DOW>
    <LATE_ALERT_DUR></LATE_ALERT_DUR>
    <REPROCESS_FLG></REPROCESS_FLG>
    <MAX_DELAY></MAX_DELAY>
    <COMPRESSED_FLG></COMPRESSED_FLG>
    <EXTRACT_FOR></EXTRACT_FOR>
    <DATA_ENCRYPTION_FLG></DATA_ENCRYPTION_FLG>
    <TRIGGER_ENCRYPTION_FLG></TRIGGER_ENCRYPTION_FLG>
    <CONTENTS>
      <FILE>
        <FILEID>?</FILEID>                                                    — 1202
        <FILENAME>superset@host.json</FILENAME>                               — 1204
        <DESCRIPTION>Sample Custom Extract</DESCRIPTION>                      — 1206
        <FILETYPE>CUSTOM</FILETYPE>                                           — 1208
        <OVERWRITE_FLG>Y</OVERWRITE_FLG>
        <DELIMITER></DELIMITER>
        <FIRSTOBS>1</FIRSTOBS>
        <EXTRACT_SCRIPT>custom.java.JSON_extract_example.exe</EXTRACT_SCRIPT> — 1210
        <INFILE_OPTIONS></INFILE_OPTIONS>                                     — 1212
        <OUTPUT_TABLE>superset@ref_cost.json</OUTPUT_TABLE>
        <PRE_PROCESS_SCRIPT></PRE_PROCESS_SCRIPT>
        <POST_PROCESS_SCRIPT>custom.java.record_cnt.exe</POST_PROCESS_SCRIPT> — 1214
      </FILE>
    </CONTENTS>
  </ENTRY>
</REGISTRY>
```

FIG. 12

INTEGRATED DATA EXTRACTION AND RETRIEVAL SYSTEM

CROSS-REFERENCE TO RELATED APPLICATIONS

The present application claims the benefit of 35 U.S.C. §119(e) to U.S. Provisional Patent Application No. 62/418,392 that was filed Nov. 7, 2016, the entire contents of which are hereby incorporated by reference.

The present application is also a continuation-in-part of U.S. patent application Ser. No. 15/333,333 that was filed Oct. 25, 2016, the entire contents of which are hereby incorporated by reference.

U.S. patent application Ser. No. 15/333,333 is a continuation of U.S. patent application Ser. No. 14/868,666 that was filed Sep. 29, 2015, and which issued Nov. 1, 2016 as U.S. Pat. No. 9,483,477, the entire contents of which are hereby incorporated by reference.

U.S. patent application Ser. No. 14/868,666 claimed the benefit of 35 U.S.C. §119(e) to U.S. Provisional Patent Application No. 62/105,035 that was filed Jan. 19, 2015, the entire contents of which are hereby incorporated by reference.

The present application also claims the benefit of 35 U.S.C. §119(e) to U.S. Provisional Patent Application No. 62/105,035 through U.S. patent application Ser. Nos. 15/333,333 and 14/868,666.

BACKGROUND

Hosted systems provide a way for customers to benefit from the value of software without the burden of infrastructure setup, support, and monitoring. One of the biggest hurdles of hosting is the transfer and intake of data into a hosted environment. Customers typically perform many steps such as decryption of the data, decompression of the data, extraction of the data for use, and movement/registration to make the data accessible to the hosted tools for use by the customers.

Customers can opt to purchase dedicated network connectivity between their on-premises components/data centers and their cloud vendors, but for most situations this expense is cost prohibitive. Without a dedicated network connection, however, connectivity is unreliable and inconsistent compared to communication between hardware within a dedicated network.

SUMMARY

In an example embodiment, a computer-readable medium is provided. The computer-readable medium has stored thereon computer-readable instructions that when executed by a computing device, control the computing device to de-anonymize data. A record is received from a second computing device connected to an external network separated from an internal network by a firewall. The first computing device is connected to the internal network. The record includes a surrogate key. Identity data stored on the internal network that includes a plurality of records is read. Each record includes a second surrogate key, an entity identifier field value, a record type field value, and a de-identified field value. The second surrogate key uniquely identifies the respective record. The surrogate key is compared to the second surrogate key to identify a matching record from the read identity data. The entity identifier field value included in the identified matching record is selected. The selected entity identifier field value is compared to the entity identifier field value of the plurality of records to identify a master record for the surrogate key from the read identity data. The record type field value includes an indicator that indicates whether or not the respective record is the master record. The de-identified field value included in the identified master record is selected. The received record is supplemented with the selected de-identified field value. The supplemented record is stored on the internal network.

In another example embodiment, a computing device is provided. The computing device includes, but is not limited to, a processor and a computer-readable medium operably coupled to the processor. The computer-readable medium has instructions stored thereon that, when executed by the processor, control the computing device to de-anonymize data.

In yet another example embodiment, a method of de-anonymizing data is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 11 depicts a content of a data layout description file in accordance with an illustrative embodiment.

FIG. 12 depicts a content of a default custom registry file in accordance with an illustrative embodiment.

DETAILED DESCRIPTION

Figure 1:
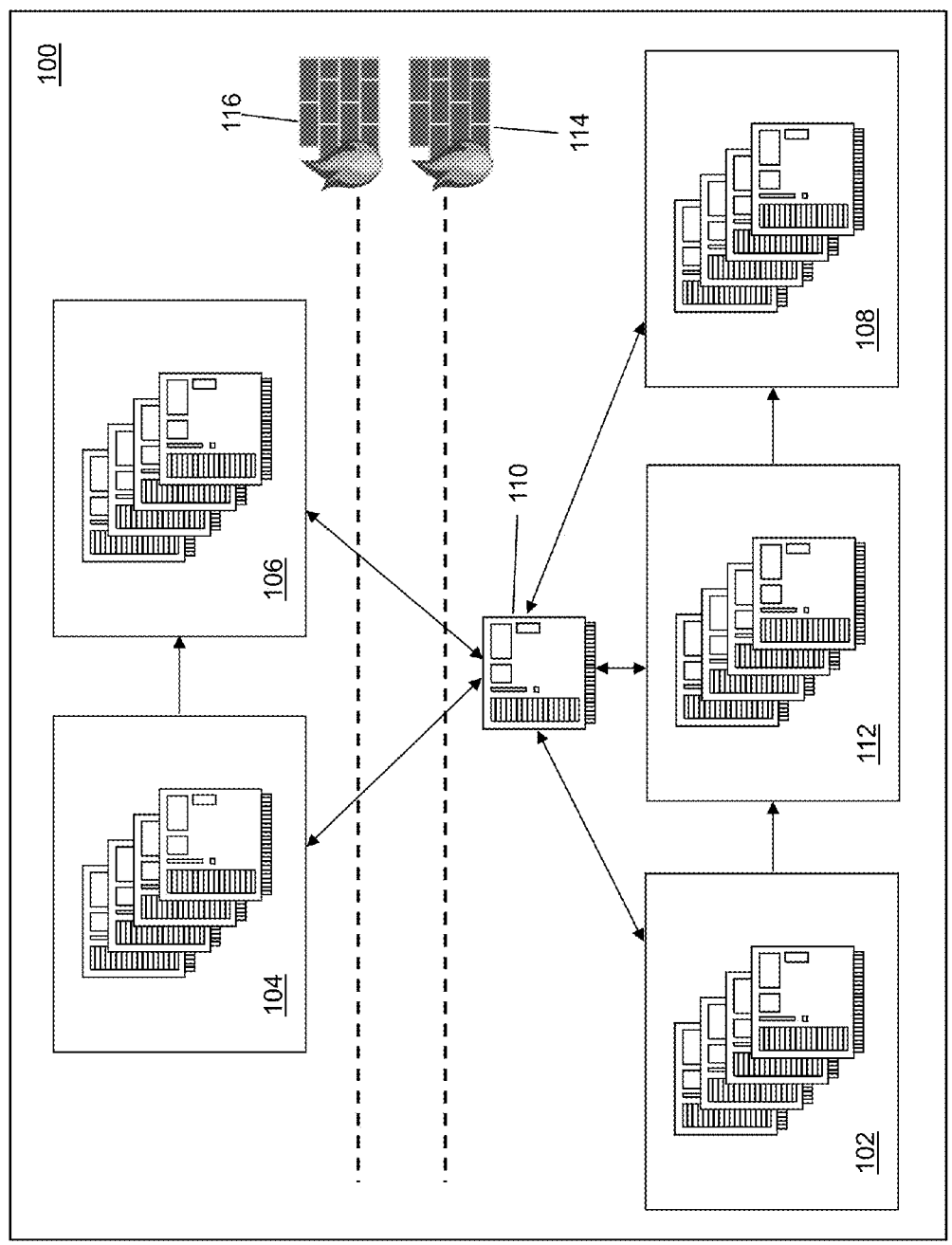
FIG. 1 depicts a block diagram of a data extraction and retrieval system in accordance with an illustrative embodiment.

Referring to FIG. 1, a block diagram of a data extraction and retrieval system 100 is shown in accordance with an illustrative embodiment. In an illustrative embodiment, data extraction and retrieval system 100 may include a data source system 102, a data intake system 104, a data host system 106, a data access system 108, a data orchestration system 110, an event stream processing (ESP) system 112, a first firewall 114, and a second firewall 116. A network (not shown) may connect one or more devices of each system 102, 104, 106, 108, 110, 112 to one or more other devices of each system 102, 104, 106, 108, 110, 112.

A firewall is a network security system that monitors and controls incoming and outgoing network traffic based on predetermined security rules to a network and/or to a device on the network. The firewall typically establishes a barrier between a trusted, secure internal network and an outside network relative to the internal network where the outside network is assumed to not be secure or trusted. For example, first firewall 114 monitors and controls network traffic to a first internal network that includes data source system 102, data access system 108, data orchestration system 110, and ESP system 112; whereas, second firewall 116 monitors and controls network traffic to a second internal network that includes data intake system 104 and data host system 106. The first internal network is not secure or trusted relative to the second internal network and vice versa. For illustration, the first internal network may be associated with a customer of a cloud provider; whereas, the second internal network may be associated with the cloud provider. Data extraction and retrieval system 100 provides integration of the cloud provider systems, data intake system 104 and data host system 106, with the customer systems, data source system 102, data access system 108, data orchestration system 110, and ESP system 112, without the cost of a dedicated network connection.

A proxy server enables users of data extraction and retrieval system 100 to access components of data extraction and retrieval system 100 without requiring additional firewall rules (which can take a lot of time and effort to develop) for first firewall 114 and/or second firewall 116. The proxy server is part of the first internal network and is trusted by the second internal network so the customer can register web applications and web services to make them available to users from one or more devices connected to the second internal network. Since the proxy server is running on a trusted host, no network changes are needed to make additional web sites and services available. Instead, the additional web sites and services are added to the proxy configuration of the proxy server. Similarly, the proxy server can be used by customers connecting to the cloud provider systems of the second internal network to serve as a single point of connectivity to data intake system 104 and data host system 106 giving the customer a single point to disable cloud connectivity either into or out of the cloud provider systems. The proxy server may be hosted by a device of data orchestration system 110.

A reverse proxy that makes requests to a uniform resource locator (URL) on behalf of a requester may be deployed. As is typical with a reverse proxy, fully qualified URLs are replaced during response processing so that all relative URLs reference the proxy server instead of the underlying system. Using a reverse proxy helps buffer the underlying systems/URLs and serves as an additional layer of security. Use cases include: 1) a request to a customer on-premises URL on the first internal network from data intake system 104 or data host system 106 on the second internal network, 2) a request to a URL hosted on the second internal network by a user on the first internal network, and 3) a request to data orchestration system 110 from either the first internal network or the second internal network.

The proxy server can be configured such that all web requests to the cloud provider systems from the customer systems go through the proxy server reducing the need for firewall updates when a new URL is accessed by users from the customer systems and providing a single point/kill switch for a customer to disable all access to the cloud provider systems. The proxy server can be configured so that all requests to data orchestration system 110 also go through the proxy server. The proxy server can be configured so that on-premises URLs can be added to the proxy configuration so the cloud provider systems can access locations without the need for firewall changes to first firewall 114 and/or to second firewall 116.

The network may include one or more networks of the same or different types. The network can be any type of wired and/or wireless public and/or private network including a cellular network, a local area network, a wide area network such as the Internet, etc. The network further may comprise sub-networks and consist of any number of devices.

Data source system 102 provides source data 214 (shown referring to FIG. 2) to data intake system 104 through data orchestration system 110 and/or through ESP system 112 and data orchestration system 110. In an illustrative embodiment, data orchestration system 110 converts source data 214, as needed, to transfer data 814 (shown referring to FIG. 8) that is sent to data intake system 104. In an illustrative embodiment, data intake system 104 receives transfer data 814 and automatically processes transfer data 814 into host data 414 (shown referring to FIG. 4) supported by data host system 106. Data access system 108 may access host data 414 stored in the hosted environment. For example, data host system 106 may convert host data 414 to analytic data 514 (shown referring to FIG. 5) and provide analytic data 514 to a user of data access system 108 based on an access request to host data 414.

Source data 214 sent from data source system 102 may be generated by a sensor, may be generated or captured in response to occurrence of an event or a transaction such as a sale of a product or a service, may be generated by a device such as in response to an interaction by a user with the device, etc. As used herein, source data 214 may include any type of content represented in any computer-readable format such as binary, alphanumeric, numeric, string, markup language, etc. Source data 214 may be organized using delimited fields, comma separated fields, fixed width fields, using a SAS® dataset, etc. The SAS dataset may be a SAS® file stored in a SAS® library that a SAS® software tool creates and processes. The SAS data set contains data values that are organized as a table of observations (rows) and variables (columns) that can be processed by one or more SAS software tools. The content of source data 214 may include textual information, graphical information, image information, audio information, numeric information, etc. that further may be encoded using various encoding techniques as understood by a person of skill in the art.

The user of data access system 108 may be executing a SAS software tool (e.g., Base SAS, SAS® Enterprise Miner™, SAS/STAT®, SAS® High Performance Analytics Server, SAS® LASR™ Analytic Server, SAS® LASR™ In-Memory Analytic Server, SAS® LASR™ Analytic Server Access Tools, SAS® In-Database Products, SAS® Scalable Performance Data Engine, SAS/OR®, SAS/ETS®, SAS® Visual Analytics, SAS® Viya™, SAS In-Memory Statistics for Hadoop®, SAS® In-Memory Statistics, SAS® Forecast Server, SAS® Event Stream Processing Engine, SAS/Graph®, etc. all of which are developed and provided by SAS Institute Inc. of Cary, N.C., USA) to access and convert host data 414 to analytic data 514.

Each of data source system 102, data intake system 104, data host system 106, data access system 108, data orchestration system 110, and ESP system 112 may be composed of one or more discrete devices in communication through the network. For example, data host system 106 may be implemented as a series of blades as understood by a person of skill in the art. Data host system 106 and data intake system 104 may communicate using a message passing interface (MPI), which is a language-independent communications protocol that may be used to program communication between parallel computers such as data host system 106. Either or both of point-to-point and collective communication may be supported by the MPI. Data host system 106 and data intake system 104 may be configured similarly in terms of both software and hardware though this may or may not be required based on the selection of software and hardware for data host system 106 and data intake system 104. Data host system 106 and data intake system 104 may be implemented in the same computing device, may be integrated, or may be separate systems.

Data source system 102 may include one or more computing devices, one or more sensors, one or more machines, one or more devices, one or more phones, etc. of the same or different type. For example, data source system 102 may be part of the Internet of Things (IoT) where the "things" (computing devices, sensors, machines, devices, phones, etc.) are connected to the network and the data generated and/or collected by the things comprises source data 214. Some of the things may be referred to as edge devices, and may involve edge computing circuitry. These devices may provide a variety of stored or generated data, such as network data or data specific to the network devices themselves.

When source data 214 comprises streaming data, the streaming data may be captured, queued, and, in some cases, analyzed using ESP system 112 prior to transfer to data orchestration system 110. Analyzing events/streaming data can separate data of value from noise prior to transfer to data orchestration system 110, reducing the data transfer times to data intake system 104 and a capacity of data host system 106. Data orchestration system 110 integrates with ESP system 112 to ensure data intake system 104 utilizes streaming data in an efficient manner. ESP system 112 may reside in one or more computing devices of data source system 102 or in one or more separate computing devices.

Data host system 106 may perform an analytic task on host data 414 that is created from extracted data 318 (shown referring to FIG. 3) and that is stored in memory accessible by data host system 106. Data host system 106 may return the results as analytic data 514 to data access system 108. Data host system 106 also may return the results as analytic data 514 to data access system 108 through ESP system 112. In addition, data host system 106 may ensure that source data 214 sent from data source system 102 is well-formatted and well-maintained for analytic use. Data maintenance may include appending new, unprocessed data to existing host data 414 and expiring data from host data 414 after it is no longer required.

Data source system 102 may include any number and any combination of form factors of devices including computing devices such as a laptop, a desktop, a smart phone, a personal digital assistant, an integrated messaging device, a tablet computer, etc., sensors, etc. For illustration, FIG. 1 represents data source system 102 as a plurality of server computers though this is not required. In general, a server computer may include faster processors, additional processors, more disk memory, and more random access memory (RAM) than a client computer as understood by a person of skill in the art. A device of data source system 102 sends and receives signals through the first internal network to/from data orchestration system 110 and/or to/from ESP system 112. Data source system 102 may communicate using various transmission media that may be wired and/or wireless as understood by those skilled in the art.

Data intake system 104 may include any number and any combination of form factors of computing devices such as a laptop, a desktop, a smart phone, a personal digital assistant, an integrated messaging device, a tablet computer, etc. For illustration, FIG. 1 represents data intake system 104 as a plurality of server computers though this is not required. A device of data intake system 104 sends and receives signals through the second internal network to/from data orchestration system 110 and/or to/from data host system 106. Data intake system 104 may communicate using various transmission media that may be wired and/or wireless as understood by those skilled in the art.

Data host system 106 may include any number and any combination of form factors of computing devices such as a laptop, a desktop, a smart phone, a personal digital assistant, an integrated messaging device, a tablet computer, etc. For illustration, FIG. 1 represents data host system 106 as a plurality of server computers though this is not required. A device of data host system 106 sends and receives signals through the second internal network to/from data orchestration system 110 and/or to/from data intake system 104. Data host system 106 may communicate using various transmission media that may be wired and/or wireless as understood by those skilled in the art.

Data host system 106 may be a distributed computing system. For example, data host system 106 may be a grid of computers as understood by a person of skill in the art. As another example, data host system 106 may be a multi-node Hadoop® cluster as understood by a person of skill in the art. For instance, Apache™ Hadoop® is an open-source software framework for distributed computing supported by the Apache Software Foundation. As another example, data host system 106 may be a cloud of computers as understood by a person of skill in the art. The SAS® LASR™ Analytic Server may be used as an analytic platform to enable multiple users to concurrently access host data 414. The SAS® Viya™ open, cloud-ready, in-memory architecture also may be used as an analytic platform to enable multiple users of data access system 108 to concurrently access host data 414. Another type of SAS server solution further may be used as an analytic platform to enable multiple users to concurrently access host data 414. Another hosted data solution offered by another vendor such as the SAP Hana Cloud Platform offered by SAP SE headquartered in Walldorf, Germany, Oracle® Database In-Memory offered by Oracle Corporation of Redwood Shores, Calif., USA, another type of in-memory server, a data store, a data lake, etc. may be used as an analytic platform to enable multiple users to concurrently access host data 414. Some systems may use SAS In-Memory Statistics for Hadoop® to read big data once and analyze it several times by persisting it in-memory for the entire session. Some systems may be of other types and configurations.

Data access system 108 may include any number and any combination of form factors of devices including computing devices such as a laptop, a desktop, a smart phone, a personal digital assistant, an integrated messaging device, a tablet computer, etc. For illustration, FIG. 1 represents data access system 108 as a plurality of server computers though this is not required. A device of data access system 108 sends and receives signals through the first internal network to/from data orchestration system 110. Data access system 108 may communicate using various transmission media that may be wired and/or wireless as understood by those skilled in the art. As another example, data access system 108 may include other types of devices such as a printer, a speaker, a display, etc. connected to the first internal network to received analytic data 514 from data host system 106 through data orchestration system 110.

Data orchestration system 110 may include any number and any combination of form factors of computing devices such as a laptop, a desktop, a smart phone, a personal digital assistant, an integrated messaging device, a tablet computer, etc. For illustration, FIG. 1 represents data orchestration system 110 as a single server computer though this is not required. A device of data orchestration system 110 sends and receives signals through the first internal network to/from the other systems of data extraction and retrieval system 100. Data orchestration system 110 may communicate using various transmission media that may be wired and/or wireless as understood by those skilled in the art.

ESP system 112 may include any number and any combination of form factors of computing devices such as a laptop, a desktop, a smart phone, a personal digital assistant, an integrated messaging device, a tablet computer, etc. For illustration, FIG. 1 represents ESP system 112 as a plurality of server computers though this is not required. A device of ESP system 112 sends and receives signals through the first internal network to/from data source system 102 and/or data orchestration system 110 and/or data access system 108. ESP system 112 may communicate using various transmission media that may be wired and/or wireless as understood by those skilled in the art.

Figure 2:
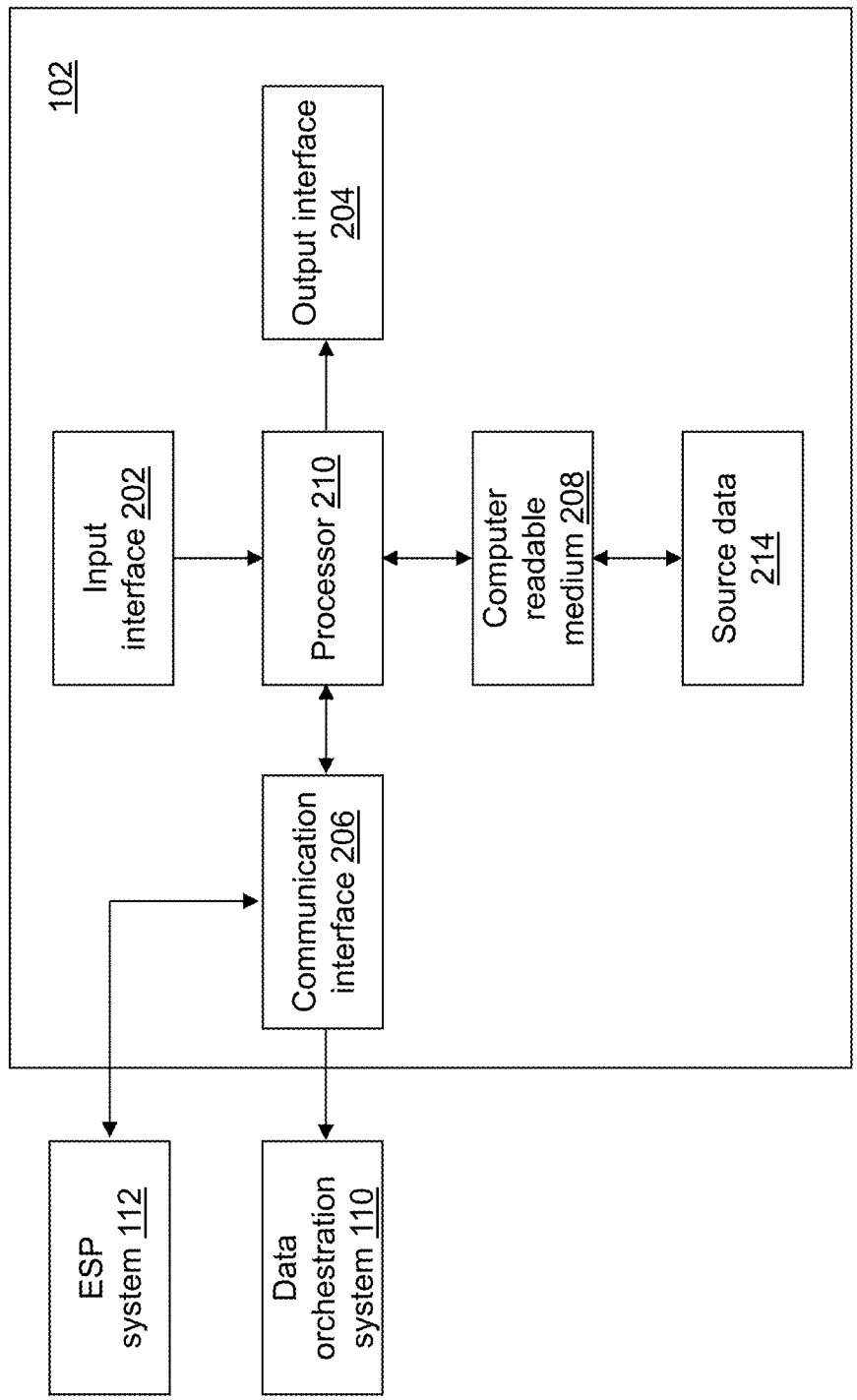
FIG. 2 depicts a block diagram of a data source system of the data extraction and retrieval system of FIG. 1 in accordance with an illustrative embodiment.

Referring to FIG. 2, a block diagram of data source system 102 is shown in accordance with an illustrative embodiment as a computing device. Data source system 102 may include an input interface 202, an output interface 204, a communication interface 206, a computer-readable medium 208, a processor 210, and source data 214. Fewer, different, and additional components may be incorporated into data source system 102.

Input interface 202 provides an interface for receiving information from the user for entry into data source system 102 as understood by those skilled in the art. Input interface 202 may further provide an interface for receiving information from another device or machine such as a sensor into data source system 102 as understood by those skilled in the art. Input interface 202 may interface with various input technologies including, but not limited to, a keyboard, a mouse, a display, a track ball, a keypad, one or more buttons, a sensor, a point of sale device, a phone, etc. The same interface may support both input interface 202 and output interface 204. For example, a display comprising a touch screen both allows user input and presents output to the user. Data source system 102 may have one or more input interfaces that use the same or a different input interface technology. The input interface technology further may be accessible by data source system 102 through communication interface 206.

Output interface 204 provides an interface for outputting information from data source system 102. For example, output interface 204 may interface with various output technologies including, but not limited to, a display, a speaker, a printer, etc. Data source system 102 may have one or more output interfaces that use the same or a different interface technology. The output interface technology further may be accessible by data source system 102 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. Data source system 102 may have one or more communication interfaces that use the same or a different communication interface technology. For example, data source system 102 may support communication using an Ethernet port, a Bluetooth antenna, a telephone jack, a USB port, etc. Data and messages may be transferred between data source system 102 and data orchestration system 110 and/or ESP system 112 using communication interface 206.

Computer-readable medium 208 is an electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Data source system 102 may have one or more computer-readable media that use the same or a different memory media technology. Data source system 102 also may have one or more drives that support the loading of a memory media such as a CD or DVD, an external hard drive, etc. One or more external data storage devices further may be connected to data source system 102 using communication interface 206.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. Data source system 102 may include a plurality of processors that use the same or a different processing technology.

Figure 3:
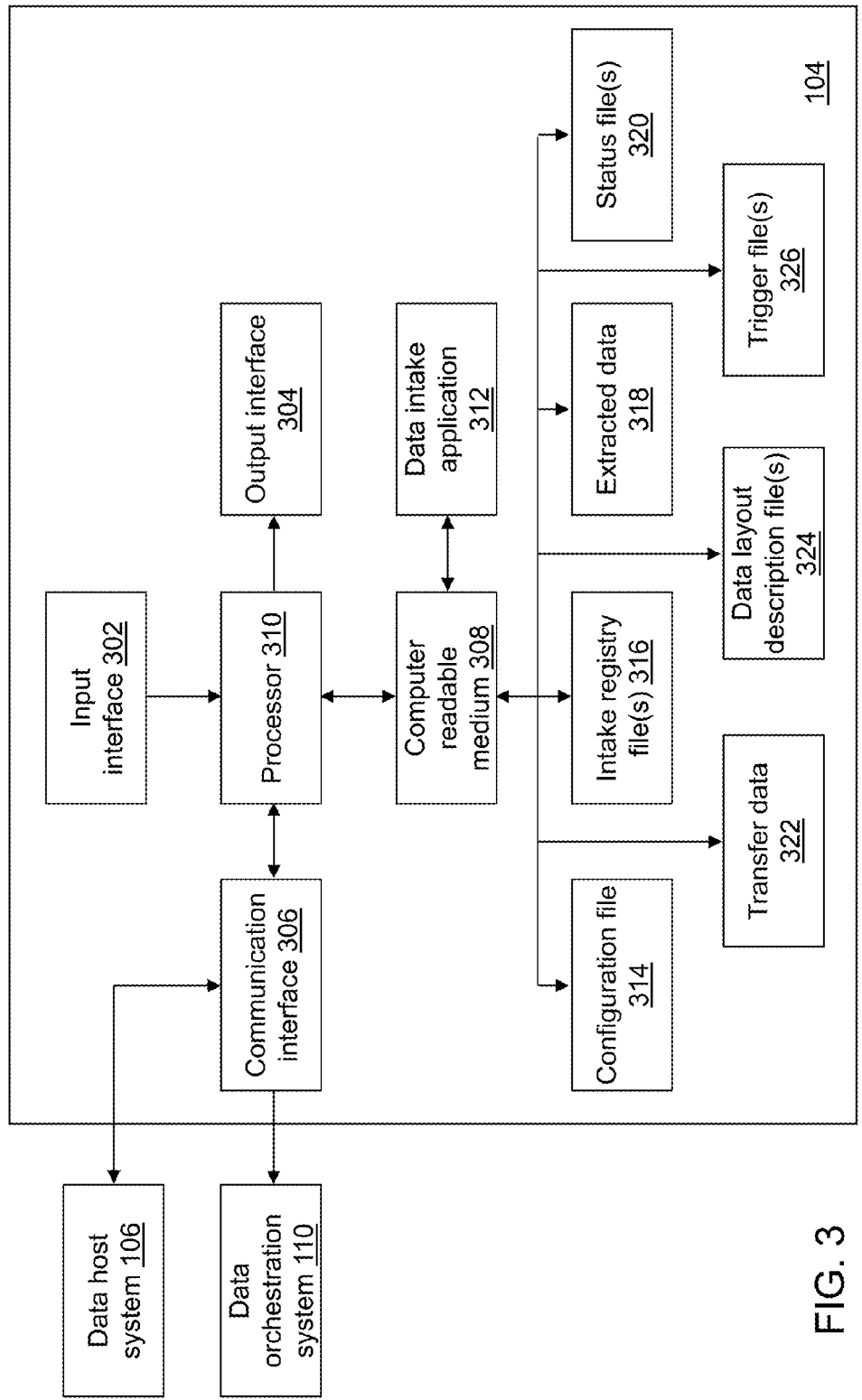
FIG. 3 depicts a block diagram of a data intake system of the data extraction and retrieval system of FIG. 1 in accordance with an illustrative embodiment.

Referring to FIG. 3, a block diagram of data intake system 104 is shown in accordance with an example embodiment as a computing device. Data intake system 104 may include a second input interface 302, a second output interface 304, a second communication interface 306, a second computer-readable medium 308, a second processor 310, a data intake application 312, a configuration file 314, one or more intake registry files 316, extracted data 318, one or more status files 320, transfer data 322, one or more data layout description files 324, and one or more trigger files 326. Fewer, different, and additional components may be incorporated into data intake system 104. Extracted data 318 may be distributed to data host system 106 and stored as host data 414 instead of or in addition to storage in second computer-readable medium 308.

Transfer data 322 stored in second computer-readable medium 308 may be a copy of transfer data 814 stored in sixth computer-readable medium 808 (shown referring to FIG. 8) after receipt from data orchestration system 110. The one or more data layout description files 324 stored in second computer-readable medium 308 may be a copy of one or more data layout description files 816 stored in sixth computer-readable medium 808 (shown referring to FIG. 8). The one or more trigger files 326 stored in second computer-readable medium 308 may be a copy of one or more trigger files 818 stored in sixth computer-readable medium 808 (shown referring to FIG. 8) after receipt from data orchestration system 110.

Second input interface 302 provides the same or similar functionality as that described with reference to input interface 202 of data source system 102 though referring to data intake system 104. Second output interface 304 provides the same or similar functionality as that described with reference to output interface 204 of data source system 102 though referring to data intake system 104. Second communication interface 306 provides the same or similar functionality as that described with reference to communication interface 206 of data source system 102 though referring to data intake system 104. Data and messages may be transferred between data intake system 104 and data orchestration system 110 and/or data host system 106 using second communication interface 306. Second computer-readable medium 308 provides the same or similar functionality as that described with reference to computer-readable medium 208 of data source system 102 though referring to data intake system 104. Second processor 310 provides the same or similar functionality as that described with reference to processor 210 of data source system 102 though referring to data intake system 104.

Data intake application 312 performs operations associated with processing transfer data 322 into extracted data 318 that may be stored as host data 414 and that is accessible by data access system 108 using data host system 106. Data intake application 312 may use information contained in the one or more data layout description files 324, the one or more trigger files 326, configuration file 314, and the one or more intake registry files 316 to convert transfer data 322 to extracted data 318. Data intake application 312 may write status data to the one or more status files 320 to maintain an audit trail and log associated with the status of the processing.

The operations of data intake application 312 may be implemented using hardware, firmware, software, or any combination of these methods. Referring to the example embodiment of FIG. 3, data intake application 312 is implemented in software (comprised of computer-readable and/or computer-executable instructions) stored in a tangible, non-transitory second computer-readable medium 308 and accessible by second processor 310 for execution of the instructions that embody the operations of data intake application 312. Data intake application 312 may be written using one or more programming languages, assembly languages, scripting languages, etc.

Data intake application 312 may be implemented as a Web application. For example, data intake application 312 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a URL that includes the location or address of the computing device that contains the resource to be accessed in addition to the location of the resource on that computing device. The type of file or resource depends on the Internet application protocol such as the file transfer protocol, HTTP, H.323, etc. The file accessed, for example, may be a simple text file, an image file, an audio file, a video file, an executable, a common gateway interface application, a Java applet, an extensible markup language (XML) file, or any other type of file supported by HTTP. For illustration, data intake application 312 may be implemented as a file transfer protocol (FTP) upload, a secure FTP (SFTP) upload, a Web upload, etc.

Figure 4:
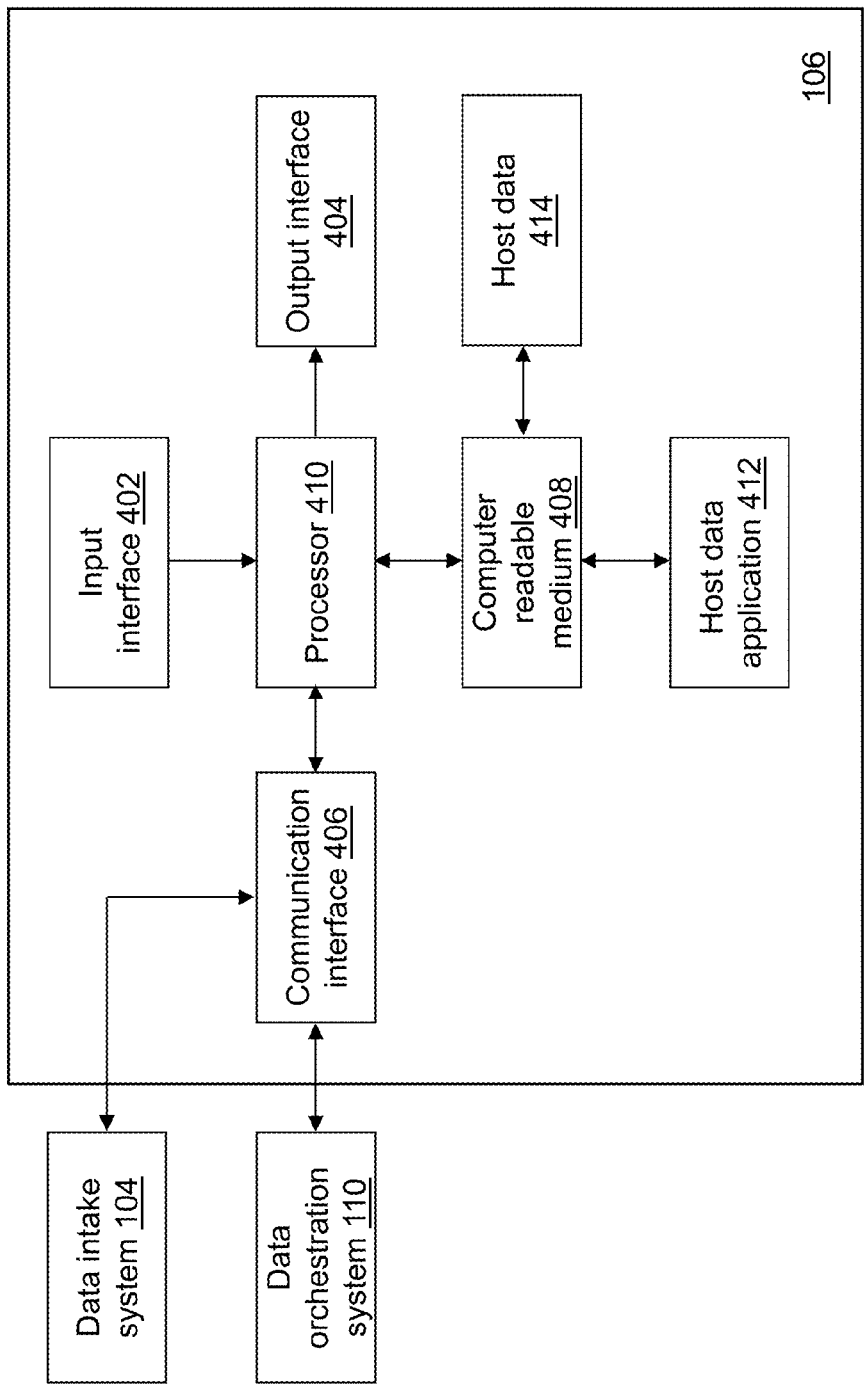
FIG. 4 depicts a block diagram of a data host system of the data extraction and retrieval system of FIG. 1 in accordance with an illustrative embodiment.

Referring to FIG. 4, a block diagram of data host system 106 is shown in accordance with an example embodiment as a computing device. Data host system 106 may include a third input interface 402, a third output interface 404, a third communication interface 406, a third computer-readable medium 408, a third processor 410, a host data application 412, and host data 414. Fewer, different, and additional components may be incorporated into data host system 106.

Third input interface 402 provides the same or similar functionality as that described with reference to input interface 202 of data source system 102 though referring to data host system 106. Third output interface 404 provides the same or similar functionality as that described with reference to output interface 204 of data source system 102 though referring to data host system 106. Third communication interface 406 provides the same or similar functionality as that described with reference to communication interface 206 of data source system 102 though referring to data host system 106. Data and messages may be transferred between data host system 106 and data intake system 104 and/or data orchestration system 110 using third communication interface 406. Third computer-readable medium 408 provides the same or similar functionality as that described with reference to computer-readable medium 208 of data source system 102 though referring to data host system 106. Third processor 410 provides the same or similar functionality as that described with reference to processor 210 of data source system 102 though referring to data host system 106.

Host data application 412 performs operations associated with supporting access (i.e., querying, adding to, deleting from, modifying) to host data 414 by a computing device of data access system 108. For illustration, host data application 412 may provide analysis, visualization, or other processing of host data 414 depending on the content and/or storage mechanism used to store host data 414 as understood by a person of skill in the art. Merely for illustration, host data application 412 may be part of an integrated data analytics software application and/or software architecture such as that offered by SAS Institute Inc. of Cary, N.C., USA. For example, host data application 412 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, host data application 412 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, etc. all of which are developed and provided by SAS Institute Inc. of Cary, N.C., USA.

Referring to the example embodiment of FIG. 4, host data application 412 is implemented in software (comprised of computer-readable and/or computer-executable instructions) stored in third computer-readable medium 408 and accessible by third processor 410 for execution of the instructions that embody the operations of host data application 412. Host data application 412 may be written using one or more programming languages, assembly languages, scripting languages, etc. Host data application 412 may be implemented as a Web application.

Figure 5:
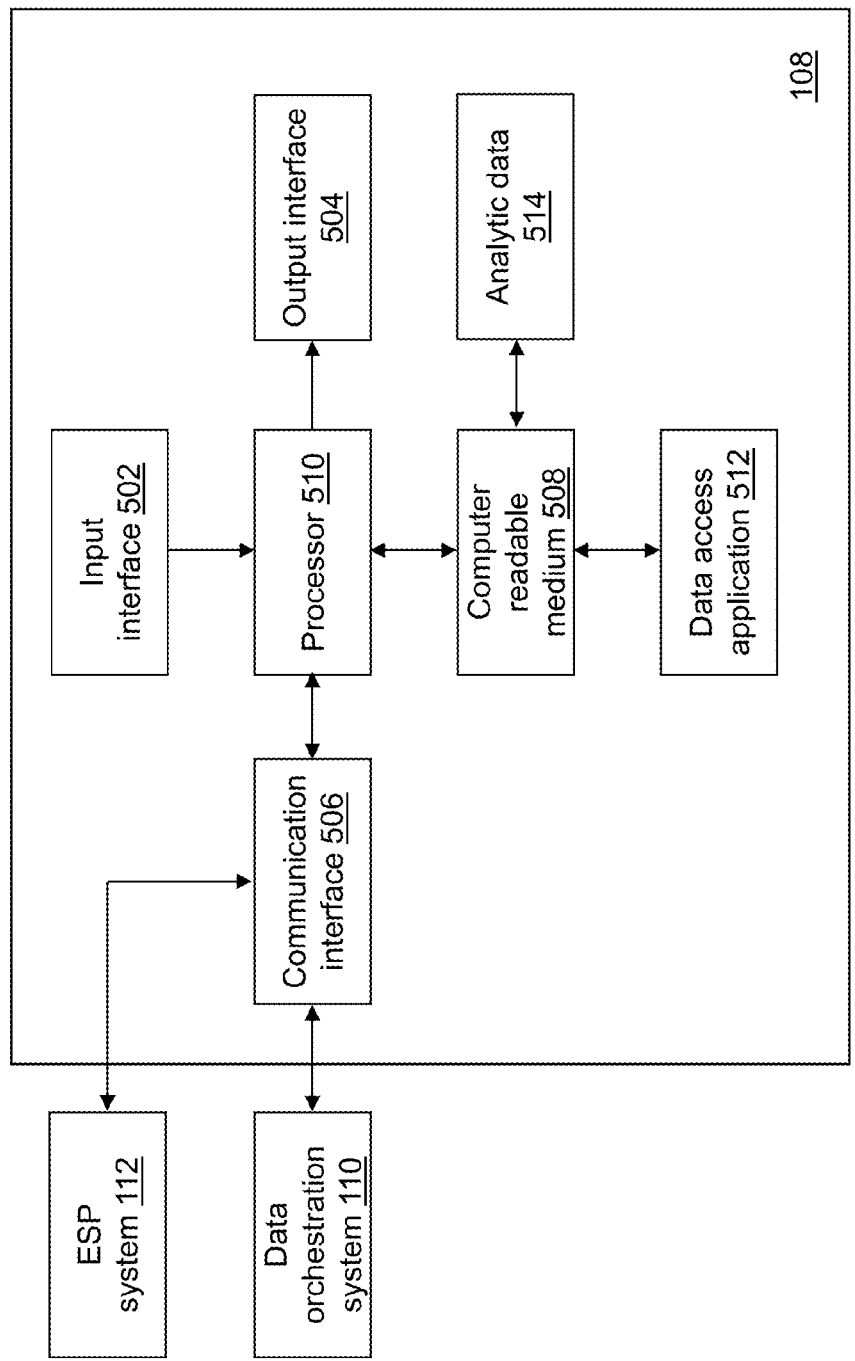
FIG. 5 depicts a block diagram of a data access system of the data extraction and retrieval system of FIG. 1 in accordance with an illustrative embodiment.

Referring to FIG. 5, a block diagram of data access system 108 is shown in accordance with an example embodiment as a computing device. Data access system 108 may include a fourth input interface 502, a fourth output interface 504, a fourth communication interface 506, a fourth computer-readable medium 508, a fourth processor 510, a data access application 512, and analytic data 514. Fewer, different, and additional components may be incorporated into data access system 108.

Fourth input interface 502 provides the same or similar functionality as that described with reference to input interface 202 of data source system 102 though referring to data access system 108. Fourth output interface 504 provides the same or similar functionality as that described with reference to output interface 204 of data source system 102 though referring to data access system 108. Fourth communication interface 506 provides the same or similar functionality as that described with reference to communication interface 206 of data source system 102 though referring to data access system 108. Data and messages may be transferred between data access system 108 and data orchestration system 110 and/or ESP system 112 using fourth communication interface 506. Fourth computer-readable medium 508 provides the same or similar functionality as that described with reference to computer-readable medium 208 of data source system 102 though referring to data access system 108. Fourth processor 510 provides the same or similar functionality as that described with reference to processor 210 of data source system 102 though referring to data access system 108.

Referring to the example embodiment of FIG. 5, data access application 512 is implemented in software (comprised of computer-readable and/or computer-executable instructions) stored in fourth computer-readable medium 508 and accessible by fourth processor 510 for execution of the instructions that embody the operations of data access application 512. Data access application 512 may be written using one or more programming languages, assembly languages, scripting languages, etc. Data access application 512 may be implemented as a Web application.

Data access application 512 performs operations associated with accessing (i.e., querying, adding to, deleting from, modifying) host data 414 that may be stored at data intake system 104 and/or data host system 106. For illustration, data access application 512 may provide analysis, visualization, or other processing of host data 414 to form analytic data 514 depending on the content of host data 414 as understood by a person of skill in the art. Host data application 412 and data access application 512 may be integrated applications. As a result, merely for illustration, data access application 512 may be part of an integrated data analytics software application and/or software architecture such as that offered by SAS Institute Inc. of Cary, N.C., USA. For example, data access application 512 may be implemented using or integrated with one or more SAS software tools such as SAS® Enterprise Miner™, Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, etc.

Figure 6:
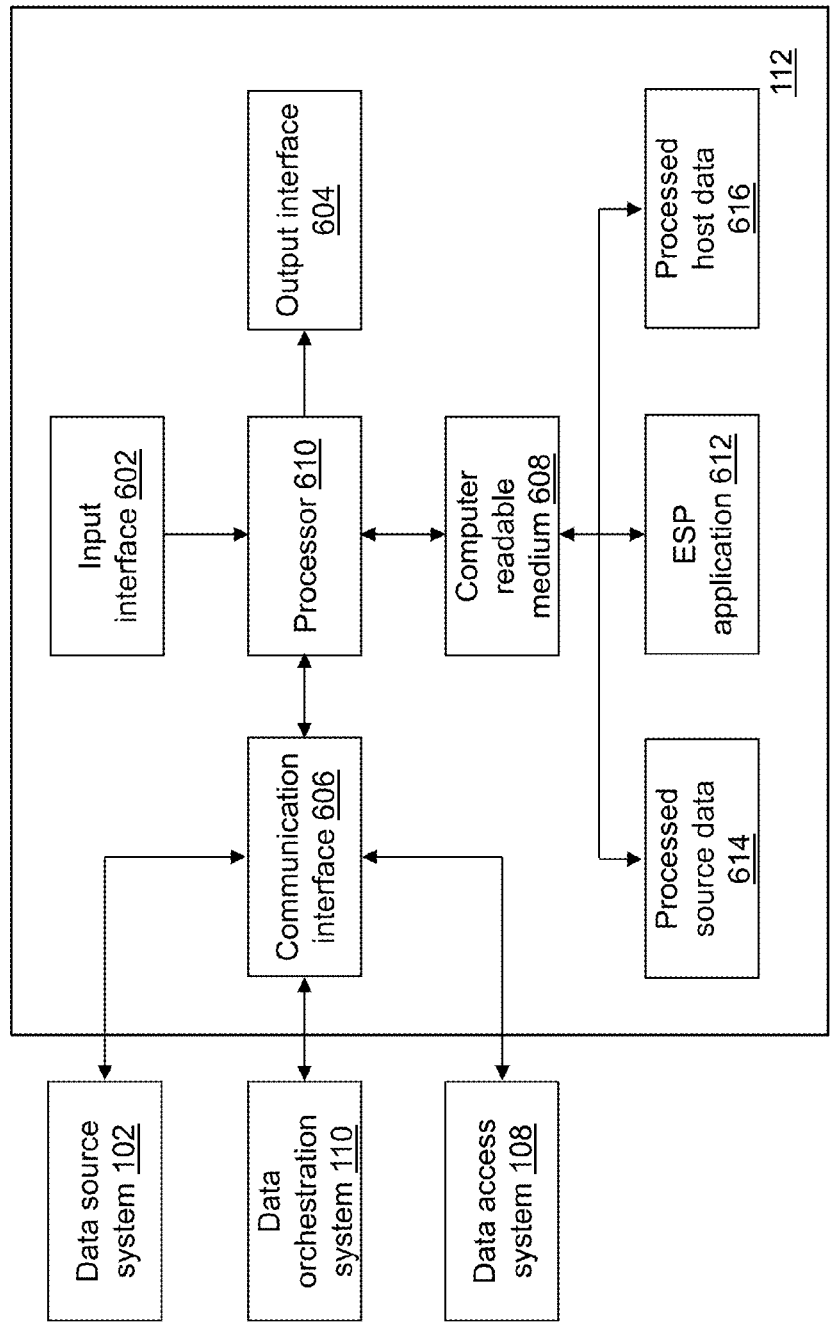
FIG. 6 depicts a block diagram of an event stream processing (ESP) system of the data extraction and retrieval system of FIG. 1 in accordance with an illustrative embodiment.

Referring to FIG. 6, a block diagram of ESP system 112 is shown in accordance with an example embodiment as a computing device. ESP system 112 may include a fifth input interface 602, a fifth output interface 604, a fifth communication interface 606, a fifth computer-readable medium 608, a fifth processor 610, an ESP application 612, processed source data 614, and processed host data 616. Fewer, different, and additional components may be incorporated into ESP system 112.

Fifth input interface 602 provides the same or similar functionality as that described with reference to input interface 202 of data source system 102 though referring to ESP system 112. Fifth output interface 604 provides the same or similar functionality as that described with reference to output interface 204 of data source system 102 though referring to ESP system 112. Fifth communication interface 606 provides the same or similar functionality as that described with reference to communication interface 206 of data source system 102 though referring to ESP system 112. Data and messages may be transferred between ESP system 112 and data source system 102 and/or data orchestration system 110 and/or data access system 108 using fourth communication interface 506. Fifth computer-readable medium 608 provides the same or similar functionality as that described with reference to computer-readable medium 208 of data source system 102 though referring to ESP system 112. Fifth processor 610 provides the same or similar functionality as that described with reference to processor 210 of data source system 102 though referring to ESP system 112.

Referring to the example embodiment of FIG. 6, ESP application 612 is implemented in software (comprised of computer-readable and/or computer-executable instructions) stored in fifth computer-readable medium 608 and accessible by fifth processor 610 for execution of the instructions that embody the operations of ESP application 612. ESP application 612 may be written using one or more programming languages, assembly languages, scripting languages, etc. ESP application 612 may be implemented as a Web application.

ESP application 612 performs operations associated with receiving and processing source data 214 that may be stored as processed source data 614 at ESP system 112 and accessed by data orchestration system 110 and/or streamed to data orchestration system 110. For illustration, ESP application 612 may provide analysis, filtering, or other processing of source data 214. ESP application 612 defines how incoming event streams from data source system 102 are transformed into outgoing event streams output to data orchestration system 110. ESP application 612 may embed an ESP engine (ESPE) 700 (shown referring to FIG. 7) with its own dedicated thread pool or pools into its application space where the main application thread can do application-specific work, and ESPE 700 processes event streams at least by creating an instance of a model into processing objects. For illustration, ESP application 612 may be implemented using the SAS® Event Stream Processing Engine developed and provided by SAS Institute Inc. of Cary, N.C., USA.

ESP application 612 may also perform operations associated with receiving and processing host data 414 from data orchestration system 110 that may be stored as processed host data 616 at ESP system 112 and accessed by and/or sent to data access system 108. For illustration, ESP application 612 may provide analysis, filtering, or other processing of host data 414. ESP application 612 defines how incoming event streams from data orchestration system 110 are transformed into outgoing event streams output to data access system 108.

Figure 7:
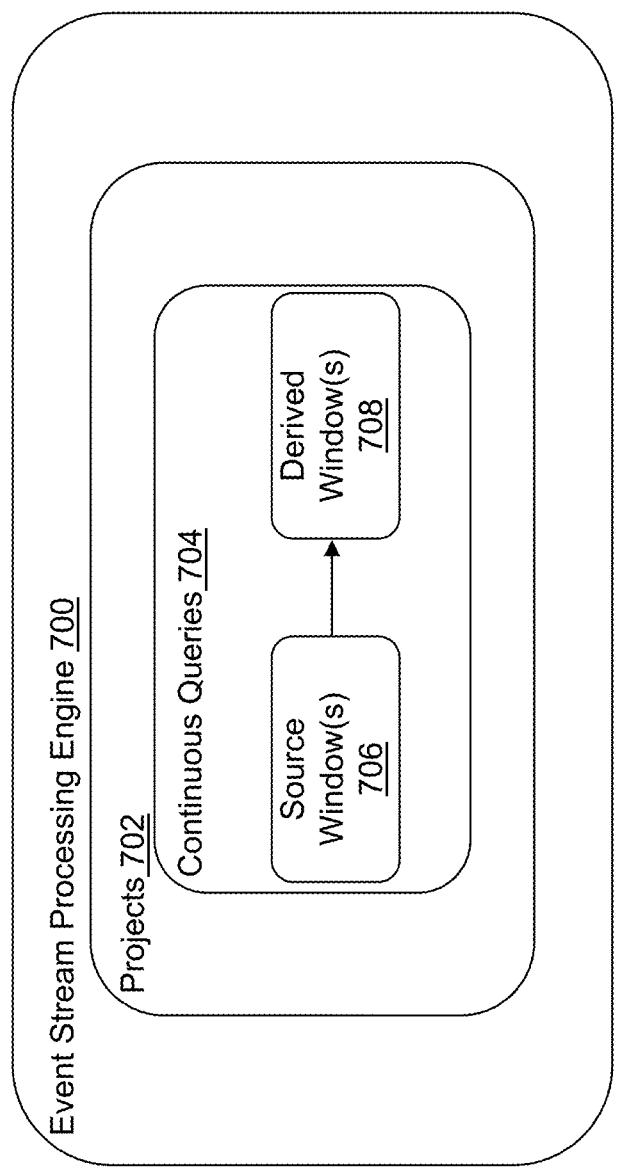
FIG. 7 depicts a block diagram of an ESP engine executing on the ESP system of FIG. 6 in accordance with an illustrative embodiment.

Referring to FIG. 7, when executed, ESP application 612 defines and starts ESPE 700 at ESP system 112. ESPE 700 may analyze and process events in motion or "event streams." Instead of storing data and running queries against the stored data, ESPE 700 may store queries and stream data through them to allow continuous analysis of data as it is received. For example, referring to FIG. 7, the components of ESPE 700 are shown in accordance with an illustrative embodiment. ESPE 700 may include one or more projects 702. A project may be described as a second-level container in an engine model managed by ESPE 700 where a thread pool size for the project may be defined by a user. A value of one for the thread pool size indicates that writes are single-threaded. Each project of the one or more projects 702 may include one or more continuous queries 704 that contain data flows, which are data transformations of incoming event streams including event block objects generated by data source system 102 and/or by data orchestration system 110. The one or more continuous queries 704 may include one or more source windows 706 and one or more derived windows 708.

The engine container is the top-level container in a model that manages the resources of the one or more projects 702. In an illustrative embodiment, for example, there is a single ESPE 700 for each instance of ESP application 612, and ESPE 700 has a unique engine name. Additionally, the one or more projects 702 may each have unique project names, and each query may have a unique continuous query name and begin with a uniquely named source window of the one or more source windows 706. ESPE 700 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 706 and the one or more derived windows 708 represent continuously executing queries that generate updates to a query result set as new event blocks stream through ESPE 700. A directed graph, for example, is a set of nodes connected by edges, where the edges have a direction associated with them.

An event object may be described as a packet of data accessible as a collection of fields, with at least one of the fields defined as a key or unique ID. The event object may be created using a variety of formats including binary, alphanumeric, XML, etc. Each event object may include one or more fields designated as a primary ID for the event so ESPE 700 can support operation codes (opcodes) for events including insert, update, upsert, and delete. Upsert opcodes update the event if the key field already exists; otherwise, the event is inserted.

ESPE 700 may receive one or more types of event objects as a packed binary representation of source data records. An event block object may be described as a grouping or package of one or more event objects. An event stream may be described as a flow of event block objects. A continuous query of the one or more continuous queries 704 transforms the incoming event stream made up of streaming event block objects published into ESPE 700 by data source system 102 and/or data orchestration system 110 into one or more outgoing event streams using the one or more source windows 706 and the one or more derived windows 708. A continuous query can also be thought of as data flow modeling.

The one or more source windows 706 are at the top of the directed graph and have no windows feeding into them. Event streams are published into the one or more source windows 706, and from there, the event streams are directed to the next set of connected windows as defined by the directed graph. The one or more derived windows 708 are all instantiated windows that are not source windows and that have other windows streaming events into them. The one or more derived windows 708 perform computations or transformations on the incoming event streams. The one or more derived windows 708 transform event streams based on the window type (that is operators such as join, filter, compute, aggregate, copy, pattern match, procedural, union, etc.) and window settings. As event streams are published into ESPE 700, they are continuously queried, and the resulting sets of derived windows in these queries are continuously updated.

ESP application 612 may be developed, for example, using a modeling application programming interface (API) that provides a set of classes with member functions. As an example, the SAS® Event Stream Processing Engine provides a modeling API that provides a set of classes with member functions. These functions enable ESP application 612 to embed ESPE 700 possibly with dedicated thread pools into its own process space. Alternatively, ESPE 700 can be embedded into the process space of an existing or a new application. In that case, a main application thread is focused on its own chores and interacts with the embedded ESPE 700 as needed.

Streams of data are typically used and reused for many functions. As a result, streaming data is typically very rich and granular, so it isn't typically tailored to a specific need. Solutions that leverage this type of data typically need to prepare and subset the data for a particular use. The need to prepare, subset, and determine which data to exclude is even more critical for defining source data 214 sent to data intake system 104, where network bandwidth can be a limiting factor. Because data extraction and retrieval system 100 does not require a dedicated network connectivity between the first internal network and the second internal network, ESPE 700 may be used to filter and prepare processed source data

614. ESPE 700 may be integrated with data orchestration system 110 to convert source data 214 to processed source data 614 that data orchestration system 110 converts to transfer data 814 that is sent to data intake system 104. ESPE 700 further may be integrated with data orchestration system 110 to convert host data 414 to processed host data 616 that data orchestration system 110 converts to analytic data 514 that is sent to data access system 108.

ESPE 700 can filter source data 214 and/or host data 414 based on fields required by data intake system 104 and/or data access system 108, respectively, based on the quality of critical fields and on the duplicity of data. Additionally, ESPE 700 can aggregate source data 214 and/or host data 414 as needed by data intake system 104 and/or data access system 108, respectively. After processed source data 614 has been filtered and prepared, ESPE 700 prepares and assimilates processed source data 614 and sends processed source data 614 as data chunks to data orchestration system 110 by calling an extract service 822 provided by data orchestration system 110. A data chunk is a collection of records that have been pre-processed, aggregated, and filtered by ESPE 700 and bundled together for efficient transfer to data orchestration system 110.

ESPE 700 integrated with data orchestration system 110 supports monitoring and adjusting/updating of metrics as streaming source data 214 is processed by ESPE 700. This allows for a record to be maintained in ESPE 700 in near-real time to represent the current state of entities based on source data 214 that is processed. Corresponding transfer data 814 may be transferred to data intake system 104 using extract service 822 when a threshold is met or a critical analytic score is changed for entities. Data host system 106 may use transfer data 322 for additional analytics, reporting, or other purposes. Examples of an event that can trigger a transfer from ESPE 700 include anytime there is an indication of an impending failure, an adverse event, a positive event, or any other event (or predicted event) that benefit a customer by transferring transfer data 814 to data intake system 104.

ESPE 700 can trigger extract service 822, for example, using a simple object access protocol/restful representation (SOAP/REST) web service call and can pass parameters into data orchestration system 110 for extract service 822 to transfer processed source data 614 to data intake system 104 appropriately. By calling extract service 822 from ESPE 700, processed source data 614 is processed through data orchestration system 110 ensuring the data integrates with data intake application 312 of data intake system 104.

Processed source data 614 may be stored in a message queue though it can be stored in a database or a flat file. ESPE 700 can be triggered to call extract service 822 based on a volume of records ready to be transferred to data intake system 104 or based on occurrence of a significant event.

Retrieved data 815 retrieved from data host system 106 may be sent to data access system 108 using a retrieve service 824 provided by data orchestration system 110. Retrieved data 815 can be enriched with streaming data that is captured, aggregated, and analyzed by using ESPE 700. This enrichment can enhance retrieved data 815 for operational use in downstream functions. Enriching retrieved data 815 retrieved from data host system 106 provides more situational awareness and context to support operational decisions. Additionally, retrieve service 824 can enrich retrieved data 815 by including a post-process function to retrieve and intersect retrieved data 815 with corresponding ESP output data. The data for this type of integration may be stored in a database. The post-process function may be triggered by a service call that integrates this data. Data host system 106 can also transfer events back to ESPE 700 based on outputs from data host system 106 to help customers prioritize and operationalize results and other output from data host system 106 by sending events to a message queue that is read by ESPE 700.

Figure 8:
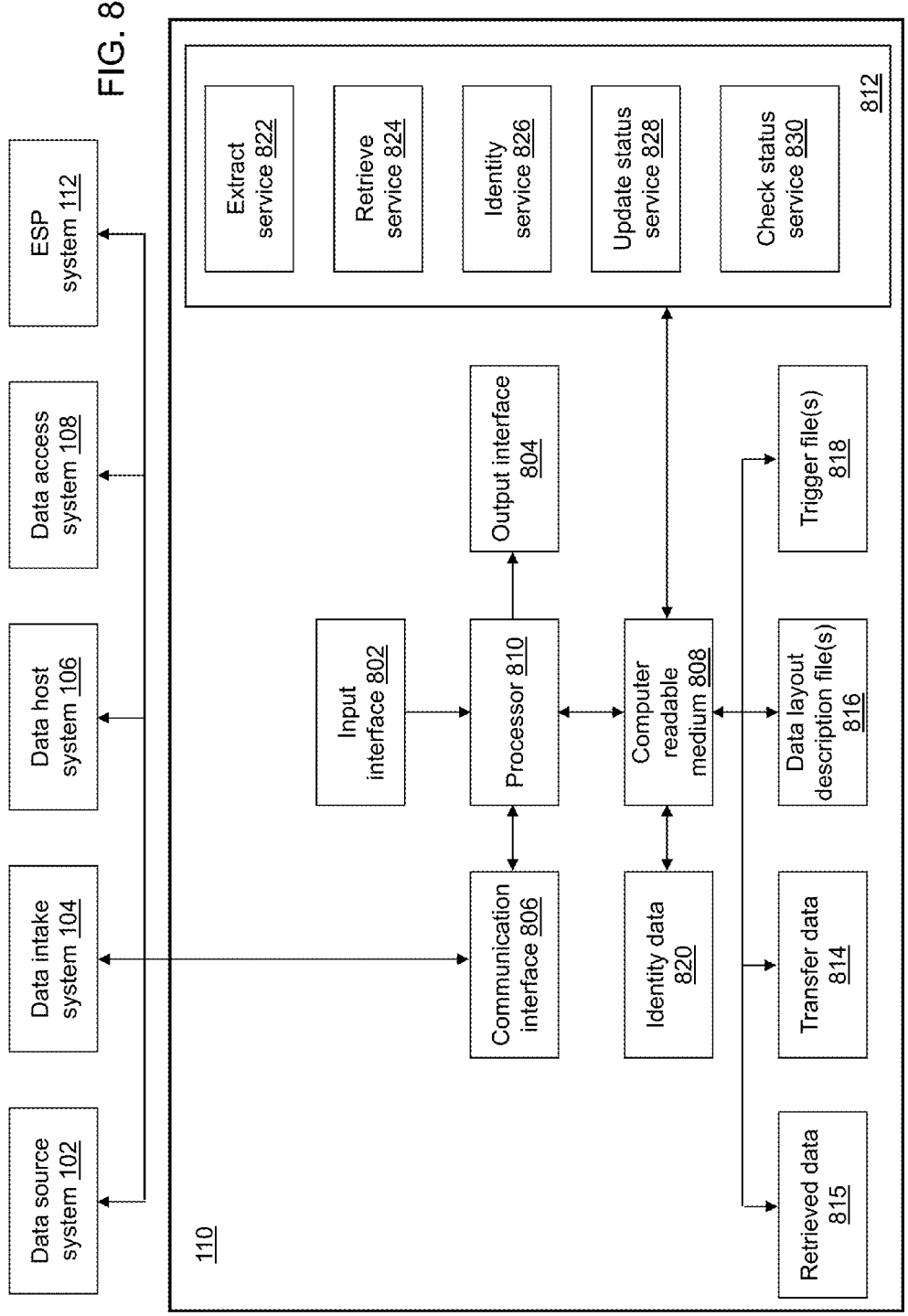
FIG. 8 depicts a block diagram of a data orchestration system of the data extraction and retrieval system of FIG. 1 in accordance with an illustrative embodiment.

Referring to FIG. 8, a block diagram of data orchestration system 110 is shown in accordance with an example embodiment as a computing device. Data orchestration system 110 may include a sixth input interface 802, a sixth output interface 804, a sixth communication interface 806, a sixth computer-readable medium 808, a sixth processor 810, a data orchestration application 812, transfer data 814, retrieved data 815, the one or more data layout description files 816, and the one or more trigger files 818. Fewer, different, and additional components may be incorporated into data orchestration system 110.

Sixth input interface 802 provides the same or similar functionality as that described with reference to input interface 202 of data source system 102 though referring to data orchestration system 110. Sixth output interface 804 provides the same or similar functionality as that described with reference to output interface 204 of data source system 102 though referring to data orchestration system 110. Sixth communication interface 806 provides the same or similar functionality as that described with reference to communication interface 206 of data source system 102 though referring to data orchestration system 110. Data and messages may be transferred between data orchestration system 110 and data source system 102, data intake system 104, data host system 106, data access system 108, and/or ESP system 112 using sixth communication interface 806. Sixth computer-readable medium 808 provides the same or similar functionality as that described with reference to computer-readable medium 208 of data source system 102 though referring to data orchestration system 110. Sixth processor 810 provides the same or similar functionality as that described with reference to processor 210 of data source system 102 though referring to data orchestration system 110.

Referring to the example embodiment of FIG. 8, data orchestration application 812 is implemented in software (comprised of computer-readable and/or computer-executable instructions) stored in sixth computer-readable medium 808 and accessible by sixth processor 810 for execution of the instructions that embody the operations of data orchestration application 812. Data orchestration application 812 may be written using one or more programming languages, assembly languages, scripting languages, etc. Data orchestration application 812 may be implemented as a Web application. Data orchestration application 812 performs operations associated with integration of data source system 102, data access system 108, and/or ESP system 112 with data intake system 104 data host system 106 without the cost of a dedicated network connection.

Figure 9A:
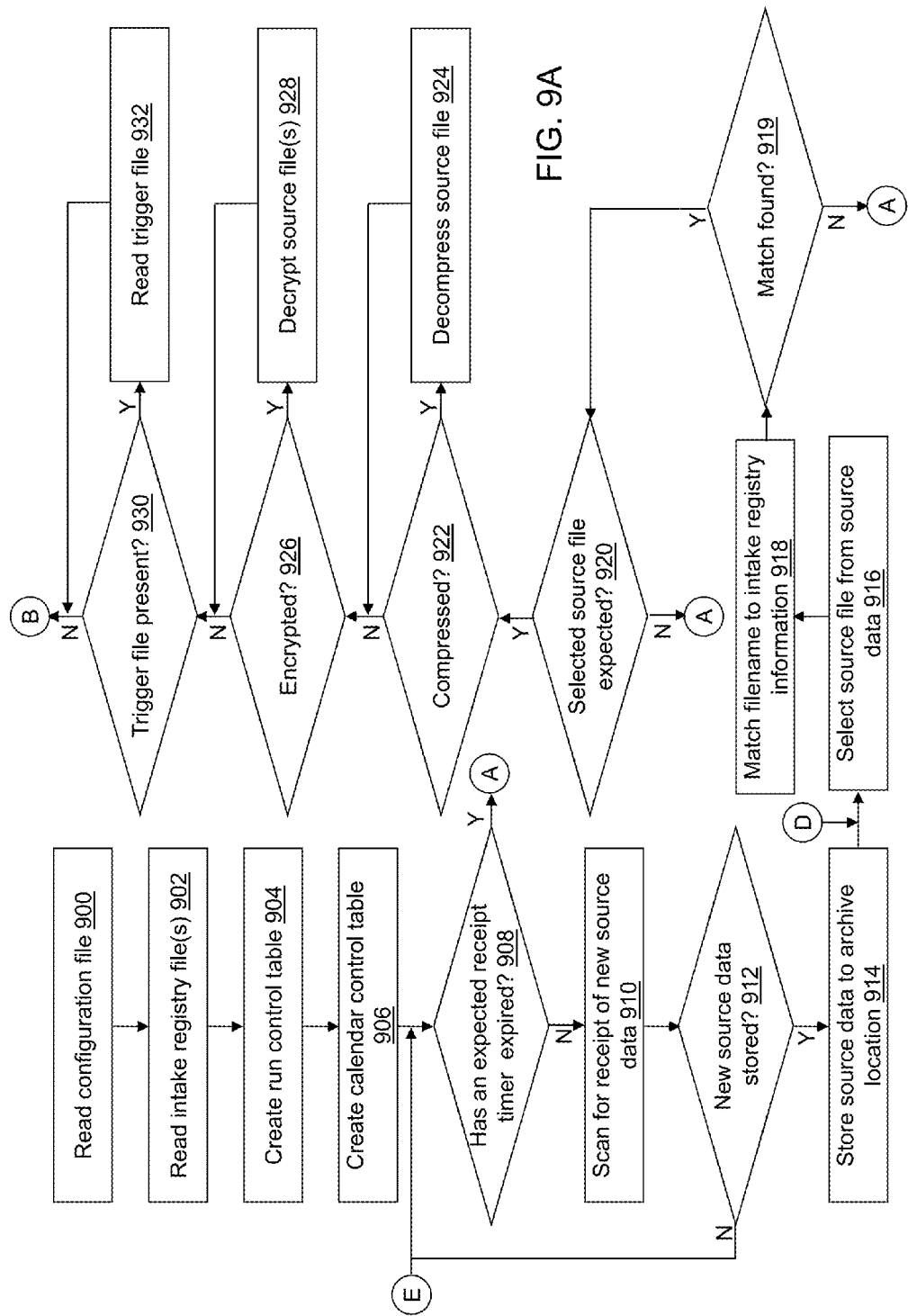
FIGS. 9A, 9B, and 9C depict a flow diagram illustrating examples of operations performed by the data intake system of FIG. 3 in accordance with an illustrative embodiment.
Figure 9B:
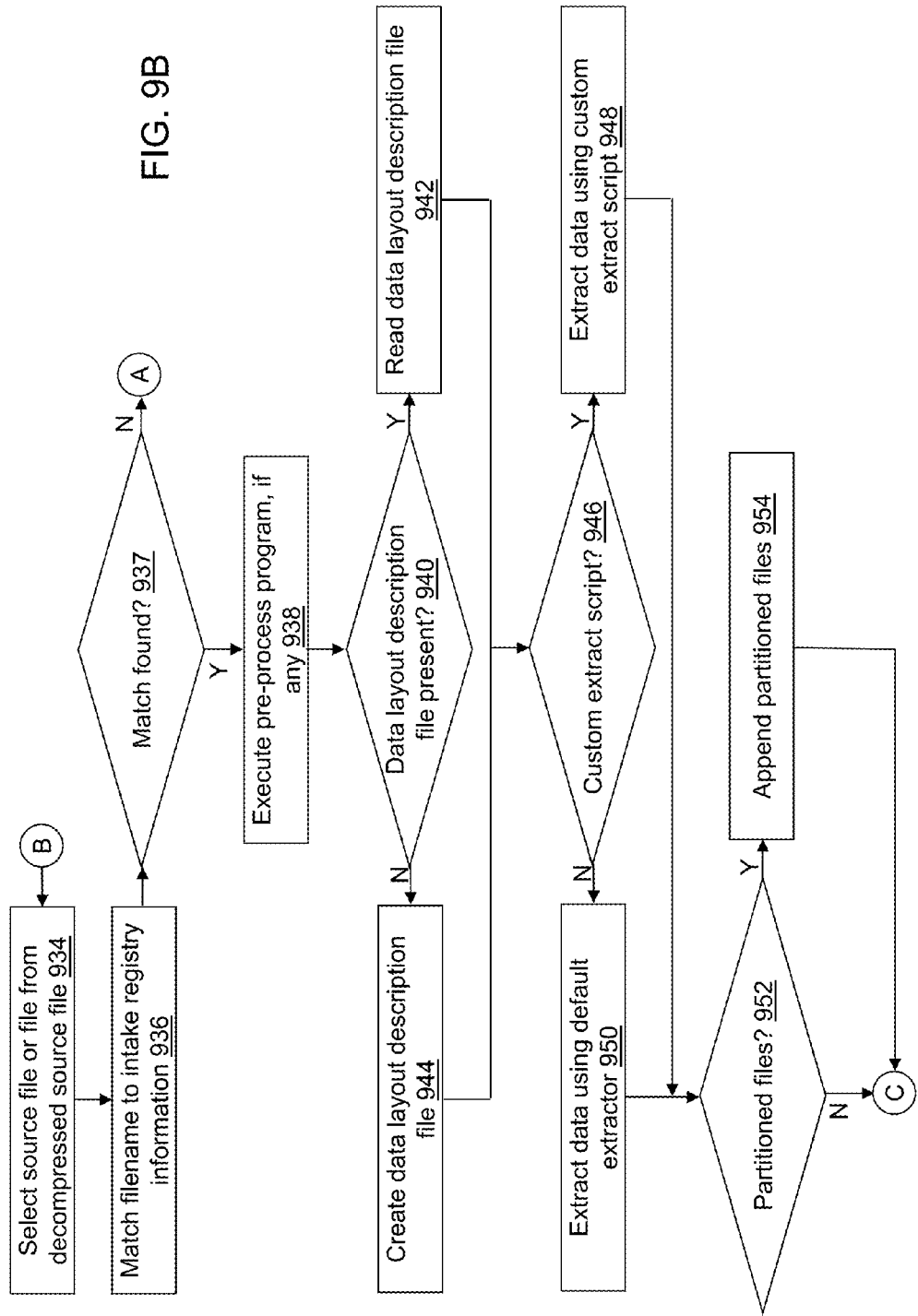
Figure 9C:
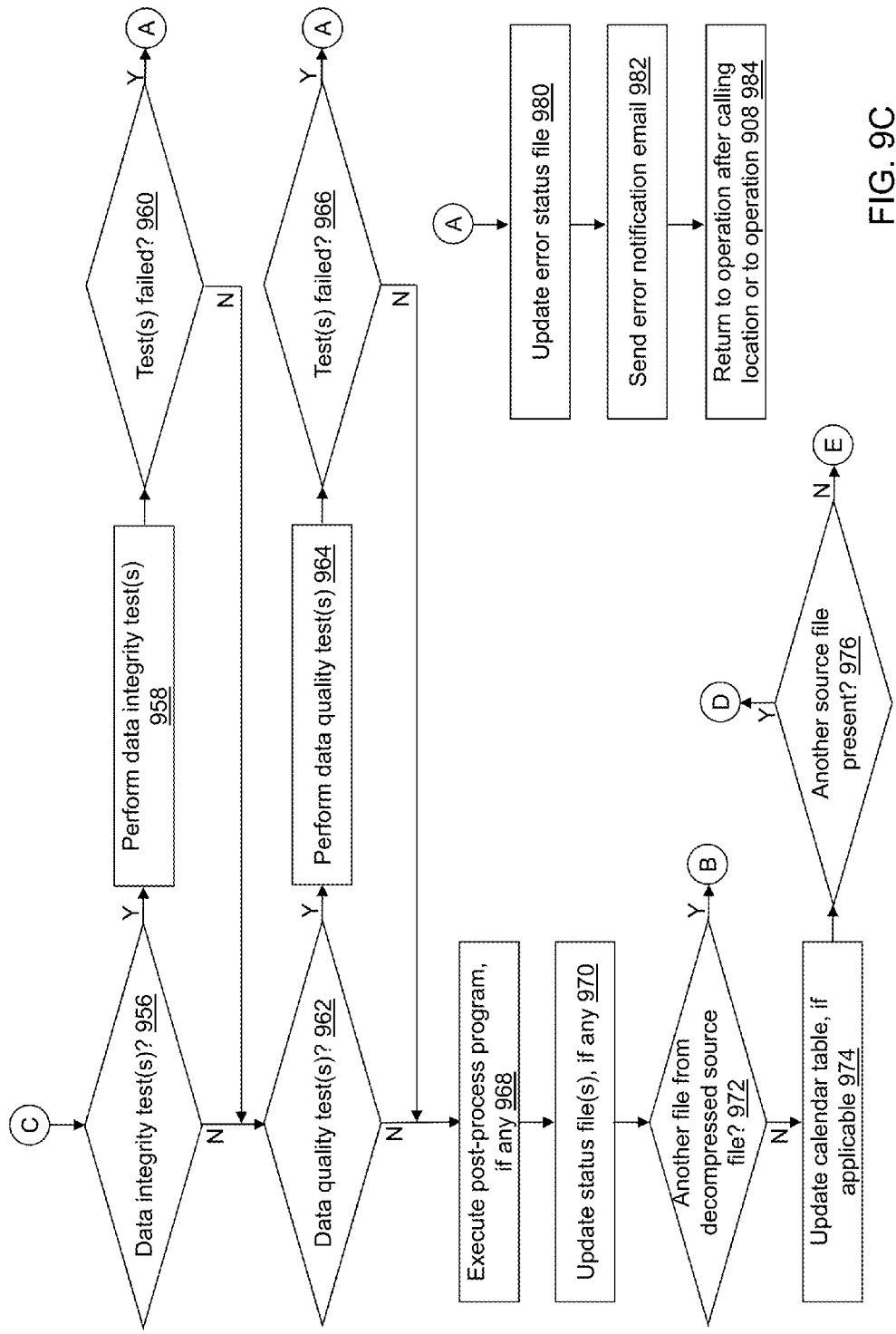

Referring to FIGS. 9A, 9B, and 9C, example operations associated with data intake application 312 of data intake system 104 are described. Additional, fewer, or different operations may be performed depending on the embodiment. The order of presentation of the operations of FIGS. 9A, 9B, and 9C is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using a plurality of threads or a plurality of processors.

Figure 10:
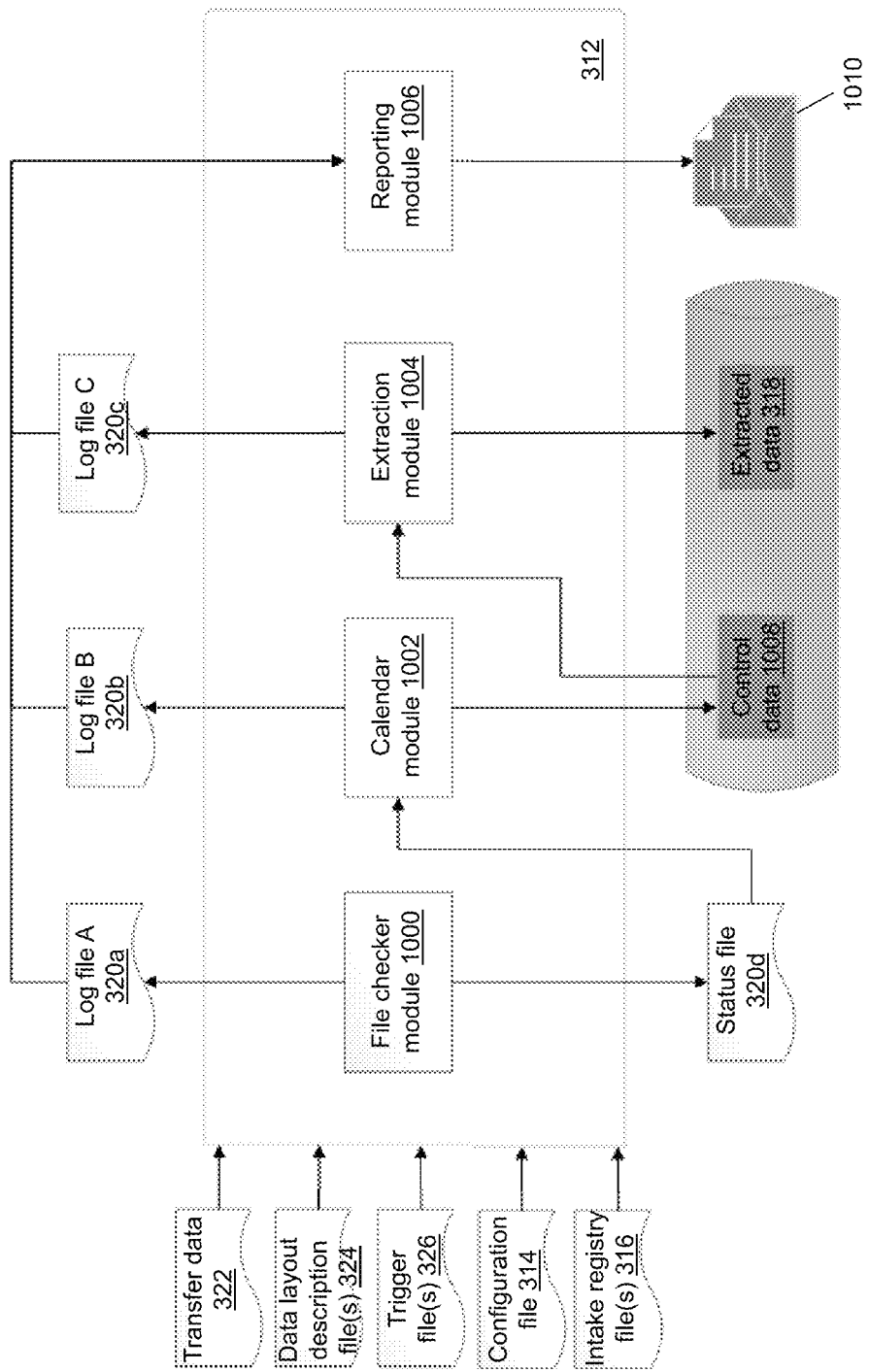
FIG. 10 depicts a block diagram of a data intake application of the data intake system of FIG. 3 in accordance with an illustrative embodiment.

Data intake application 312 may include one or more modules written in the same or different languages that may be executed or run by the same or different processors. For example, in the illustrative embodiment of FIG. 10, data intake application 312 may include a file checker module 1000, a calendar module 1002, an extraction module 1004, and a reporting module 1006. File checker module 1000, calendar module 1002, extraction module 1004, and reporting module 1006 of data intake application 312 may use information read from the one or more data layout description files 324, the one or more trigger files 326, configuration file 314, and the one or more intake registry files 316 to convert transfer data 322 to extracted data 318. Control data 1008 is used by extraction module 1004 to convert transfer data 322 to extracted data 318.

The one or more status files 320 may include a log file A 320*a*, a log file B 320*b*, a log file C 320*c*, and a status file 320*d*. Log file A 320*a* and status file 320*d* may be maintained by file checker module 1000. Log file B 320*b* may be maintained by calendar module 1002. Log file C 320*c* may be maintained by extraction module 1004. Calendar module 1002 creates and maintains control data 1008 as discussed further below. Status and/or error messages 1010 may be created and sent to message locations predefined in configuration file 314 based on a type of the message as discussed further below. Data intake application 312 may be restartable with checkpoint information logged at each point.

For illustration, data intake application 312 may be started using a command line function though other methods may be used, such as double-clicking on an executable, conversion to a daemon process or service, etc. For example, a main program of data intake application 312 may be written in the PERL scripting language and named "data_intake.pl". An example command line may be defined as data_intake.pl [-c <config file>] [-f] [-h], where [ ] indicates optional arguments:

-c <configuration file 314>;
-f force restart, ignoring any checkpoint/restart information; and
-h help on command options.

Execution of data intake application 312 may spawn file checker module 1000 and one or more of calendar module 1002, extraction module 1004, and reporting module 1006. For illustration, file checker module 1000 may be written in the PERL scripting language; whereas, calendar module 1002, extraction module 1004, and reporting module 1006 may be written in Base SAS.

File checker module 1000 looks for files in an incoming directory. If there are one or more files available, file checker module 1000 moves the one or more files from the incoming directory to an archive directory and logs this occurrence into status file 320*d*. File checker module 1000 verifies whether the one or more files are expected, as discussed further below. If the one or more files are expected, file checker module 1000 moves the one or more files to an un-archive directory after uncompressing and/or decrypting the one or more files. The location of the various directories may be defined in configuration file 314.

Calendar module 1002 determines which of the one or more files are due to be processed. A file of the one or more files may be a scheduled file or an ad hoc file. Calendar module 1002 may also set-up control data 1008 that includes a calendar table for extract processing by extraction module 1004.

Extraction module 1004 extracts all eligible files passed on by calendar module 1002 into extracted data 318 that may be in the form of output tables. Extraction module 1004 can be run in parallel with a number of parallel processes as defined in configuration file 314.

Reporting module 1006 reads log file A 320*a*, log file B 320*b*, and log file C 320*c* for errors and takes an action that may be defined in configuration file 314. For example, status and/or error messages 1010 may be reported to an email address associated with a user of data source system 102 and/or to an email address associated with a user of data intake system 104 depending on the type of error.

Referring again to FIG. 9A, once started, in an operation 900, data intake application 312 reads configuration file 314. For example, illustrative configuration file fields that can be customized for a specific data source system 102 along with a description are provided below:

CUSTOMER—an acronym for a customer.
PROJECT—a name of a project.
CUSTOMERNAME—a long name of the customer.
PROJECTNAME—a long name of the project.
OPS_MAILTO—an email address to which system error notifications are sent.
CUST_MAILTO—an email address to which data issue notifications are sent.
HOMEDIR—a home directory location.
TRANSPORT_DIR—a transport directory location.
TRANSPORT_ARCHIVE_DIR—an archive directory location.
TRANSPORT_UNARCHIVE_DIR—an un-archive directory location.
TRANSPORT_INCOMING_DIR—an incoming directory location.
TRANSPORT_OUTGOING_DIR—an SFTP outgoing directory location.
SW_HOME—a directory where data intake application 312 is deployed that may match HOMEDIR.
SW_CONF—a location where configuration file 314 is stored.
SW_SASPGMS—a location where SAS programs are stored.
SW_SASAUTOS—a location where SAS macros are stored.
MODULES_TO_RUN—a module to be run selected from FILECHECKER (file checker module 1000), CALENDAR (calendar module 1002), and EXTRACT (extraction module 1004) a plurality of modules are separated by a pipe (|).
CALENDAR—a location of calendar module 1002.
EXTRACT—a location of extraction module 1004.
REPORT_ERROR—a location of reporting module 1006.
INITIAL_SETUP—setup code run only the first time.
CUSTOM_REG—a name and location of a custom intake registry file of the one or more intake registry files 316. Turn OFF using blank.
GENERIC_REG—a name and location of a generic intake registry file of the one or more intake registry files 316. Turn OFF using blank.
CPU_COUNT—a number of maximum parallel processes that can be run.
In general, should not exceed a maximum number of available cores.
LOGS_DIR—a main log file directory.
SAS_LOGS—a SAS log file directory.
AUDIT_LOGS—an audit log file directory.
RUN_LOGS—a run log file directory.

LOG_CHANGE—a frequency of log file roll-over for audit logs (e.g. if MONTHLY is specified, the same log file is used for the entire month).

COMPRESSION_PROGRAM—an indicator of a compression program used to compress transfer data 322 in the archive directory if transfer data 322 is uncompressed when sent to the incoming directory. Accepted values may include zip, gz, gzip, tar, tar.gz, tar.bz2.

LATE_TRIGGER_FILE—a name of the file where late file records are logged.

CHECKPT_FILE—a name of the file in which checkpoint information is logged.

RUNDIR—a directory in which the CHECKPT_FILE and LATE_TRIGGER_FILE are stored.

ARCHIVE_ENCRYPTED—indicates whether or not incoming encrypted transfer data 322 is decrypted before archiving.

DECRYPT_PGM—an indicator of a decryption program used to decrypt encrypted transfer data 322.

UNHANDLED_ERRORS—identifies to whom unhandled errors are sent (e.g., operations, customer, both).

ERROR_FORWARD—the error forwarding mechanism used (e.g. email, jira,ftp).

LATE_ALERT_EMAIL—identifies who is notified regarding late receipt of transfer data 322 (e.g., operations, customer, both).

LATE_ALERT_PAUSE—a number of hours to wait before follow up late alerts are sent.

DATASPEC_FILE—a name of a common data layout description file.

DATASPEC_DIR—a location where the common data layout description file and the one or more data layout description files 324 are stored.

DATASPEC_ARCHIVE_DIR—a location where archive files for the common data layout description and for the one or more data layout description files 324 are stored.

DATASPEC_PROPERTIES—a location where a properties file is created.

UNARCH_FILES_KEEP_DAYS—a number of days that transfer data 322 is stored in the archive directory after successful processing. If the value is zero, transfer data 322 is removed immediately after processing.

UNARCH_FILES_KEEP_DAYS_ON_FAILURE—a number of days failed files are kept in the un-archive directory.

SASCMD—a command to invoke SAS, e.g., /sso/sfw/sas/930/SAS Foundation/9.3/sas.

SASAUTOS—options before invoking SAS.

CUST_PGM_DIR—a directory where custom SAS codes are stored.

USER_FUNC_DIR—a directory where a user function is stored.

SASAUTOS—a path used during SAS invocation.

DQ_ERROR_FORWARD—channel by which data quality exceptions are forwarded to the customer (e.g., sftp, jira).

DQ_FILE_DLM—a delimiter used in the data quality exception file.

In an operation 902, the one or more intake registry files 316 are read. The one or more intake registry files 316 may be XML files used to describe attributes of incoming files of transfer data 322. In an illustrative embodiment, there are two types of intake registry files, a generic intake registry file and a custom intake registry file. The one or more intake registry files 316 support registration of new (unprocessed) incoming files of transfer data 322 for data intake application 312 to process based on a matching of filename parameters that define naming pattern strings that may include regular expressions. Either or both intake registry files may be used. If both registry files are used, incoming files of transfer data 322 are matched against the filename parameters that define naming patterns of the custom intake registry file first and are matched against the filename parameters that define naming patterns of the generic intake registry file when no match is found in the custom intake registry file as described further below.

For every incoming file, the one or more intake registry files 316 include at least two hierarchies, a first-level parameters hierarchy and a second-level parameters hierarchy. The first-level parameters hierarchy defines the characteristics of the incoming file, and the second-level parameters hierarchy defines the characteristics of raw data files within the incoming file because some compressions can have multiple files within a file. For example, a tar or zip file may include multiple raw data files.

The generic intake registry file is used to process any data file of transfer data 322 without having to configure the custom intake registry file. For example, by placing a prefix of "auto_" on incoming files of transfer data 322 with specific file extensions (e.g., csv, txt, sas7dbat, lasr), the data can be simply transferred to data host system 106. Other prefixes may be used. The generic intake registry file can be extended to support additional file extensions for additional file formats. Data extraction and retrieval system 100 is designed to handle any compression or encryption of these data files using default compression and encryption. For illustration, the generic intake registry file is configured for three types of files: 1) comma delimited files (.csv), 2) SAS datasets (.sas7bdat), and 3) pipe delimited files (.txt). The file extension matches the filetype defined in the registry. Below is the content of an example generic intake registry file:

```
<REGISTRY>
  <ENTRY>
    <INCOMING>auto_\w*.csv</INCOMING>
    <FREQ>A</FREQ>
    <CONTENTS>
      <FILE>
        <FILEID>1001</FILEID>
        <FILENAME>auto_\w*.csv</FILENAME>
        <DESCRIPTION>CSV Files</DESCRIPTION>
        <FILETYPE>DLM</FILETYPE>
        <DELIMITER>,</DELIMITER>
        <FIRSTOBS>2</FIRSTOBS>
        <OVERWRITE_FLG>Y</OVERWRITE_FLG>
        <EXTRACT_SCRIPT></EXTRACT_SCRIPT>
        <LAYOUT_FILE></LAYOUT_FILE>
        <OUTPUT_TABLE></OUTPUT_TABLE>
        <PRE_PROCESS_SCRIPT></PRE_PROCESS_SCRIPT>
        <POST_PROCESS_SCRIPT></POST_PROCESS_SCRIPT>
      </FILE>
    </CONTENTS>
  </ENTRY>
  <ENTRY>
    <INCOMING>auto_\w*.sas7bdat</INCOMING>
    <FREQ>A</FREQ>
    <CONTENTS>
      <FILE>
        <FILEID>1002</FILEID>
        <FILENAME>auto_\w*.sas7bdat</FILENAME>
        <DESCRIPTION>SAS Datasets </DESCRIPTION>
        <FILETYPE>SAS</FILETYPE>
        <DELIMITER></DELIMITER>
        <FIRSTOBS>2</FIRSTOBS>
        <OVERWRITE_FLG>Y</OVERWRITE_FLG>
        <EXTRACT_SCRIPT> </EXTRACT_SCRIPT>
        <LAYOUT_FILE></LAYOUT_FILE>
        <OUTPUT_TABLE></OUTPUT_TABLE>
        <PRE_PROCESS_SCRIPT></PRE_PROCESS_SCRIPT>
```

-continued

```
        <POST_PROCESS_SCRIPT></POST_PROCESS_SCRIPT>
      </FILE>
    </CONTENTS>
  </ENTRY>
  <ENTRY>
    <INCOMING>auto_\w*.txt</INCOMING>
    <FREQ>A</FREQ>
    <CONTENTS>
      <FILE>
        <FILEID>1003</FILEID>
        <FILENAME>auto_\w*.txt</FILENAME>
        <DESCRIPTION>Pipe delimitted files </DESCRIPTION>
        <FILETYPE>DLM</FILETYPE>
        <DELIMITER>|</DELIMITER>
        <FIRSTOBS>2</FIRSTOBS>
        <OVERWRITE_FLG>Y</OVERWRITE_FLG>
        <EXTRACT_SCRIPT></EXTRACT_SCRIPT>
        <LAYOUT_FILE></LAYOUT_FILE>
        <OUTPUT_TABLE></OUTPUT_TABLE>
        <PRE_PROCESS_SCRIPT></PRE_PROCESS_SCRIPT>
        <POST_PROCESS_SCRIPT></POST_PROCESS_SCRIPT>
      </FILE>
    </CONTENTS>
  </ENTRY>
</REGISTRY>
```

The first-level parameters can be customized for specific transfer data 814 from data orchestration system 110. For illustration, a field name and description of the first-level parameters included in the first-level parameters hierarchy of the generic intake registry file are provided below:

INCOMING—the incoming filename parameter, which can be defined, for example, as a PERL or SAS regular expression or as a string. The incoming filename parameter identifies a matching filename pattern that should be unique to files of transfer data 322 that use the data included in the corresponding entry to process the source file. In an illustrative embodiment, the filename parameter may include all aspects of the filename except the encryption extension. If the filename is account_20140830.txt.gz.gpg, the matching filename pattern regular expression may be account_\d{8}.txt.gz. The encryption flag is included to indicate to data intake application 312 that the file is encrypted. The file pattern does not contain the encryption extension though. If the filename is trans_20140830.txt.zip, the matching filename pattern regular expression may be trans_\d{8}.txt.zip.

FREQ—a frequency that the incoming file is received. A is an acceptable value that indicates "Ad hoc" for a file that can be received at any time.

The second-level parameters can also be customized for specific transfer data 814 from data orchestration system 110. For illustration, a field name and description of the second-level parameters included in the second-level parameters hierarchy of the generic intake registry file are provided below:

FILEID—unique identifier (ID) for each incoming file of transfer data 814.

FILENAME—name of a raw data file post extraction from the incoming file, which can be a pattern and can be expressed, for example, as a PERL or SAS regular expression. The second level filename parameter match to this value is after decompression and/or decryption has been run.

DESCRIPTION—descriptive name of the incoming file.

FILETYPE—type of the file (e.g., delimited file, comma separated file, SAS dataset).

DELIMITER—delimiter value if FILETYPE indicates delimited file.

FIRSTOBS—observation at which data values start.

OVERWRITE_FLG—flag to indicate whether overwrites are allowed for the incoming file. If the flag is set, a previously successfully processed file can be overwritten by a new file of the same name.

EXTRACT_SCRIPT—a name of a custom extract script. Blank if not used.

LAYOUT_FILE—data layout description file of the one or more data layout description files 324 used for the associated data file. If the field is blank, data intake application 312 uses the common data layout description file listed in configuration file 314. If there is no layout information regarding this file in the common data layout description file (no matching filename parameter), intake application 312 may use the SAS command "proc import" to extract data from delimited files. An error may be generated by extraction module 1004 for a fixed width file if no data layout description file is defined here.

OUTPUT_TABLE—output table name. If the field is blank, the output table name is constructed using the first 32 characters of the data file. Otherwise, a Table prefix may be defined with an option of a date or characters from the data filename. For example, a table prefix defined as "tab" in combination with an indicator of date may generate an output table name of tab_date, where the date is in yyyymmdd format. As another example, a table prefix defined as "acc" in combination with an indicator of characters as [pos9-pos16] may generate an output table name of acc 20140930 for a data filename account 20140930.txt.

PRE_PROCESS_SCRIPT—a pre-process program indicator for a pre-process program run before the extraction of the data. Blank if not used.

POST_PROCESS_SCRIPT—a post-process program indicator for a post-process program run after the extraction of the data. Blank if not used.

The custom intake registry file supports registration of expected file types for scheduled data loads. As opposed to the generic intake registry file, the custom intake registry file includes calendar components to confirm data is received when it is expected and that notifications are sent out if the data is not received when expected. Files sent as part of this formal processing may adhere to the following naming convention: yyymmdd.{HHMM}.{env}.{x_OF_y}. FileName.[Extension].{Compression}.{Encryption}, where tokens within curly braces are optional and can be ignored where not necessary. Tokens within square brackets are mandatory, but multiple options may be available. The tokens in the filename are defined further below:

"yyyymmdd" represents a date with a four-digit year, two-digit month, and two-digit day. The date used should be consistent and predictable. For example, for daily files, the date may be incremented each day and no dates may be repeated for the same file type unless that file is being re-sent as a replacement. Weekly files may represent a consistent day of the week. Monthly files may be a consistent day of the month. If files need to be retransmitted for any reason, or if files are delayed from their expected arrival date, they may retain the expected date prefix so they can be easily identified and tracked.

"HHMM" represents a time in 24 hour format (0000-2359). This token may be useful for sending multiple independent files of the same type for a given day. For example, sending two batches of orders for a single day may look like: 20080101.1200.PRD.1_OF_1.Orders.csv.gz and 20080101.2359.PRD.1_OF_1.Orders.csv.gz.

"Env" represents a server environment that will consume the incoming file. This token may be useful when different sets of data are consumed by different environments such as development, test, production, etc. Various identifiers may be used, for example: PRD—Production, DEV—Development, UAT—User Acceptance Testing, QA—Quality Assurance, etc.

"x_OF_y" indicates that the incoming file is a multi-part file. Large files may need to be split into smaller pieces for file transfer to data intake system 104. "Y" indicates the total number of files in the set, and "X" identifies the sequence each individual file should be processed. The /yyyymmdd/, /HHMM, and /FileName/portions of the filename should be consistent for all files in the set. For example: 20080101.1405.PRD.1_OF_3.LargeFile.csv.gz, 20080101.1405.PRD.2_OF_3.LargeFile.csv.gz, 20080101.1405.PRD.3_OF_3.LargeFile.csv.gz is a consistent set of files.

"FileName" represents a meaningful filename that corresponds to the content of the file. In some embodiments, the filename should not contain any spaces. Filenames are used to match to the <INCOMING> parameter of the first-level parameters and to the <FILENAME> parameter of the second-level parameters.

"Extension" indicates a general format of the file. Typical file extensions can include .csv for comma separated values, .txt for fixed width or tab delimited text, .sas7bdat for a SAS dataset, .xml for XML text, etc. As with the "FileName" token, the "Extension" should remain consistent. In some embodiments, if multiple data files are being bundled into one file using tar or zip, the name of the file being sent may not include this extension. For example, if 20080101.account.txt and 20080101.transaction.txt are being bundled into one tar file, the resulting file may be named 20080101.daily_files.tar.gz.

"Compression" represents a type of compression used, where ".zip" may indicate use of the Windows WinZip format, ".gz" may indicate use of the UNIX gzip utility, ".z" may indicate use of the UNIX compress utility, ".tar.gz" may indicate use of the UNIX tar utility and use of the UNIX gzip utility, ".tbz or ".tar.bz2" may indicate use of the UNIX tar utility and use of the bzip2 compression program. If multiple files are bundled into one file using the tar or zip utilities, this file pattern may be mentioned in the incoming file pattern.

"Encryption" represents a type of encryption used.

The first-level parameters can be customized for specific transfer data 814 from data orchestration system 110. For illustration, a field name and a description of the first-level parameters of the first-level parameters hierarchy of the custom intake registry file are provided below:

INCOMING—the incoming filename parameter, which can be defined, for example, as a PERL or SAS regular expression or as a string. The incoming filename parameter identifies a matching filename pattern that should be unique to files of transfer data 322 that use the data included in the corresponding entry to process the source file. In an illustrative embodiment, the filename parameter may include all aspects of the filename except the encryption extension. If the filename is account_20140830.txt.gz.gpg, the matching filename pattern regular expression may be account_\d{8}.txt.gz. The encryption flag is included to indicate to data intake application 312 that the file is encrypted. The file pattern does not contain the encryption extension though. If the filename is trans_20140830.txt.zip, the matching filename pattern regular expression may be trans_\d{8}.txt.zip.

FREQ—a frequency that the incoming file is received (e.g., A=Ad hoc, D=Daily, W=Weekly, M=Monthly, Q=Quarterly, Y=Yearly, etc.).

TRIGGER_FILE_EXT—an extension of the one or more trigger files 326 (e.g. '.done', '.count').

PARTITIONED—a flag to indicate whether or not the incoming file is partitioned.

RUN_DAYS—days on which the incoming file is expected. If the frequency is indicated as ad hoc, all <RUN_...> fields should be blank. This field accepts single values, date ranges, and comma delimited values. For example, a single value indicate a day of the month; a date range may indicate any day within the indicated range of days of the month; a comma delimited value may indicate a list of days of the month the file is expected.

RUN_MONTHS—months in which the incoming file is expected using values similar to RUN_DAYS with a maximum value of 12.

RUN_DOW—days of week the incoming file is expected using values similar to RUN_DAYS with a maximum value of 7.

TRIGGER_LOAD_FLG—a flag to indicate whether or not the trigger load contents should be loaded.

LATE_ALERT_DUR—a number of hours after the last expected date-time expected for receipt of the incoming file after which a late file alert is sent based on the value of LATE_ALERT_EMAIL in configuration file 314.

REPROCESS_FLG—a previously received file can be reprocessed by sending an associated trigger file if this flag is set to yes. The new trigger filename should be the same as the original trigger filename.

MAX_DELAY—a maximum number of hours data intake application 312 waits for remaining parts after a first part of an incoming file that is partitioned is received. If parts arrive after the cut-off time, the files are not processed. Similarly, if a trigger file is expected, data intake application 312 waits for the configured number of hours for the associated trigger file after which the incoming file is invalidated and is not extracted.

COMPRESSED_FLG—a flag to indicate whether or not the file is compressed is defined here.

EXTRACT_PGM—indicator of a compression program used to compress transfer data 322 in the archive directory if transfer data 322 is uncompressed when sent to the incoming directory.

DATA_ENCRYPTION_FLG—a flag to indicate whether or not the incoming file is encrypted.

TRIGGER_ENCRYPTION_FLG—a flag to indicate whether or not the trigger file of the one or more trigger files associated with the incoming file 326 is encrypted.

The second-level parameters of the second-level parameters hierarchy of the custom intake registry file are identical to the second-level parameters of the second-level parameters hierarchy of the generic intake registry file. An example custom intake registry file that contains information to read in a zip file that includes three raw data files and to read in a single pipe delimited text file is shown below:

```
<REGISTRY>
  <ENTRY>
    <INCOMING>sample_multi_file.zip</INCOMING>
    <FREQ>A</FREQ>
    <TRIGGER_FILE_EXT></TRIGGER_FILE_EXT>
    <PARTITIONED>N</PARTITIONED>
    <RUN_DAYS></RUN_DAYS>
    <RUN_MONTHS></RUN_MONTHS>
    <RUN_DOW></RUN_DOW>
    <TRIGGER_LOAD_FLG>N</TRIGGER_LOAD_FLG>
    <LATE_ALERT_DUR></LATE_ALERT_DUR>
    <REPROCESS_FLG></REPROCESS_FLG>
```

```xml
        <MAX_DELAY></MAX_DELAY>
        <COMPRESSED_FLG>Y</COMPRESSED_FLG>
        <EXTRACT_PGM></EXTRACT_PGM>
        <DATA_ENCRYPTION_FLG></DATA_ENCRYPTION_FLG>
        <TRIGGER_ENCRYPTION_FLG>
        </TRIGGER_ENCRYPTION_FLG>
        <CONTENTS>
            <FILE>
                <FILEID>1</FILEID>
                <FILENAME>sample_pipe.txt</FILENAME>
                <DESCRIPTION>Sample Pipe Delimited file</DESCRIPTION>
                <FILETYPE>DLM</FILETYPE>
                <OVERWRITE_FLG>Y</OVERWRITE_FLG>
                <DELIMITER>|</DELIMITER>
                <FIRSTOBS>2</FIRSTOBS>
                <EXTRACT_SCRIPT></EXTRACT_SCRIPT>
                <LAYOUT_FILE></LAYOUT_FILE>
                <OUTPUT_TABLE></OUTPUT_TABLE>
                <PRE_PROCESS_SCRIPT></PRE_PROCESS_SCRIPT>
                <POST_PROCESS_SCRIPT></POST_PROCESS_SCRIPT>
            </FILE>
            <FILE>
                <FILEID>2</FILEID>
                <FILENAME>sample_csv.csv</FILENAME>
                <DESCRIPTION>Sample CSV File</DESCRIPTION>
                <FILETYPE>DLM</FILETYPE>
                <OVERWRITE_FLG>Y</OVERWRITE_FLG>
                <DELIMITER>,</DELIMITER>
                <FIRSTOBS>2</FIRSTOBS>
                <EXTRACT_SCRIPT></EXTRACT_SCRIPT>
                <LAYOUT_FILE></LAYOUT_FILE>
                <OUTPUT_TABLE></OUTPUT_TABLE>
                <PRE_PROCESS_SCRIPT></PRE_PROCESS_SCRIPT>
                <POST_PROCESS_SCRIPT></POST_PROCESS_SCRIPT>
            </FILE>
            <FILE>
                <FILEID>3</FILEID>
                <FILENAME>sample_fixedwidth.dat</FILENAME>
                <DESCRIPTION>sample Fixed Width File</DESCRIPTION>
                <FILETYPE>FIXED_WIDTH</FILETYPE>
                <OVERWRITE_FLG>Y</OVERWRITE_FLG>
                <DELIMITER></DELIMITER>
                <FIRSTOBS>1</FIRSTOBS>
                <EXTRACT_SCRIPT> </EXTRACT_SCRIPT>
                <LAYOUT_FILE></LAYOUT_FILE>
                <OUTPUT_TABLE></OUTPUT_TABLE>
                <PRE_PROCESS_SCRIPT></PRE_PROCESS_SCRIPT>
                <POST_PROCESS_SCRIPT></POST_PROCESS_SCRIPT>
            </FILE>
        </CONTENTS>
</ENTRY>
<ENTRY>
    <INCOMING>sample_bad_file.txt</INCOMING>
    <FREQ>A</FREQ>
    <TRIGGER_FILE_EXT></TRIGGER_FILE_EXT>
    <PARTITIONED>N</PARTITIONED>
    <RUN_DAYS></RUN_DAYS>
    <RUN_MONTHS></RUN_MONTHS>
    <RUN_DOW></RUN_DOW>
    <TRIGGER_LOAD_FLG>N</TRIGGER_LOAD_FLG>
    <LATE_ALERT_DUR></LATE_ALERT_DUR>
    <REPROCESS_FLG></REPROCESS_FLG>
    <MAX_DELAY></MAX_DELAY>
    <COMPRESSED_FLG></COMPRESSED_FLG>
    <EXTRACT_PGM></EXTRACT_PGM>
    <DATA_ENCRYPTION_FLG></DATA_ENCRYPTION_FLG>
    <TRIGGER_ENCRYPTION_FLG>
    </TRIGGER_ENCRYPTION_FLG>
    <CONTENTS>
        <FILE>
            <FILEID>4</FILEID>
            <FILENAME>sample_bad_file.txt</FILENAME>
            <DESCRIPTION>Sample Bad File</DESCRIPTION>
            <FILETYPE>DLM</FILETYPE>
            <OVERWRITE_FLG>Y</OVERWRITE_FLG>
            <DELIMITER>|</DELIMITER>
            <FIRSTOBS>2</FIRSTOBS>
            <EXTRACT_SCRIPT></EXTRACT_SCRIPT>
            <LAYOUT_FILE></LAYOUT_FILE>
            <OUTPUT_TABLE></OUTPUT_TABLE>
            <PRE_PROCESS_SCRIPT></PRE_PROCESS_SCRIPT>
            <POST_PROCESS_SCRIPT></POST_PROCESS_SCRIPT>
        </FILE>
    </CONTENTS>
</ENTRY>
</REGISTRY>
```

After the initial deployment, if the file requirements of transfer data 814 change, the one or more intake registry files 316 can be updated. The FILEID field for existing entries may not be updated. Instead, a new entry can be added with a unique file id (preferably incrementally) or other attributes of the entries can be updated.

Each <INCOMING> field value defined in the one or more intake registry files 316 defines a filename parameter, and each <FILENAME> field defined in the one or more intake registry files 316 defines a filename parameter. The remaining first-level parameters are associated with each filename parameter using the <INCOMING> field. The remaining second-level parameters are associated with each filename parameter using the <FILENAME> field. Each filename parameter of the resulting plurality of filename parameters identifies a matching filename pattern used to define which of the remaining first-level parameters and of the remaining second-level parameters are used for files that match the field values.

In an operation 904, a run control table of control data 1008 is created. For illustration, an example of a run control table of control data 1008 is shown in Table I(a) and Table I(b) below.

TABLE I(a)

| Record Identifier | File Checker Run ID | File Identifier | Frequency Identifier | Project Identifier | File Entry Type | Frequency | Data File Name |
|---|---|---|---|---|---|---|---|
| 1 | R20150325182747 | 18 | 0 | AID | Custom | A | sample_pipe.txt |
| 2 | R20150325183026 | 11 | 84 | AID | Custom | D | def_daily_20140811.csv |
| 3 | R20150325184158 | 18 | 0 | AID | Custom | A | sample_pipe.txt |
| 4 | R20150325185005 | 18 | 0 | AID | Custom | A | sample_pipe.txt |
| 5 | R20150325190317 | 18 | 0 | AID | Custom | A | sample_pipe.txt |
| 6 | R20150325190509 | 1 | 84 | AID | Custom | D | sample_pipe.txt |
| 7 | R20150325190702 | 1 | 84 | AID | Custom | D | sample_pipe.txt |
| 8 | R20150325191704 | 8 | 0 | AID | Custom | A | demographics_20140806.csv |
| 9 | R20150325191945 | 8 | 0 | AID | Custom | A | demographics_20140806.csv |
| 10 | R20150325192033 | 8 | 0 | AID | Custom | A | demographics_20140806.csv |
| 11 | R20150325192306 | 8 | 0 | AID | Custom | A | demographics_20140806.csv |

TABLE I(b)

| Trigger File Name | File Folder | Unarchive Datetime | Run Status | Delete Status Code |
|---|---|---|---|---|
| sample_pipe.txt.done | /unarchive/R20150325182747 | 25MAR15:18:27:47 | 4 | 1 |
| def_daily__20140811.csv.done | /unarchive/R20150325183026 | 25MAR15:18:30:26 | 2 | 1 |
| sample_pipe.txt.done | /unarchive/R20150325184158 | 25MAR15:18:41:59 | 2 | 1 |
| sample_pipe.txt.done | /unarchive/R20150325185005 | 25MAR15:18:50:05 | 4 | 1 |
| sample_pipe.txt.done | /unarchive/R20150325190317 | 25MAR15:19:03:17 | 4 | 1 |
| sample_pipe.txt.done | /unarchive/R20150325190509 | 25MAR15:19:05:09 | 4 | 1 |
| sample_pipe.txt.done | /unarchive/R20150325190702 | 25MAR15:19:07:02 | 2 | 1 |
| | /unarchive/R20150325191704 | 25MAR15:19:17:05 | 2 | 1 |
| | /unarchive/R20150325191945 | 25MAR15:19:19:45 | 2 | 1 |
| | /unarchive/R20150325192033 | 25MAR15:19:20:35 | 4 | 1 |
| | /unarchive/R20150325192306 | 25MAR15:19:23:06 | 2 | 1 |

In an operation 906, a calendar table of control data 1008 is created. For example, the calendar table is created by evaluating the custom intake registry file to determine when each incoming file is expected. For illustration, an example of a calendar table of control data 1008 is shown in Table II below.

TABLE II

| File Identifier | Frequency Identifier | Expected File Pattern | Frequency | First Expected Date | Last Expected Date | Late Alert Duration In Hours | Reprocess Flag | Last Alert Sent Datetime |
|---|---|---|---|---|---|---|---|---|
| 1 | 115 | xyz_daily_(\d{8})_file1.txt | D | 2015 Apr. 25 | 2015 Apr. 25 | 12 | 0 | 10JUN15:06:50:20 |
| 1 | 116 | xyz_daily_(\d{8})_file1.txt | D | 2015 Apr. 26 | 2015 Apr. 26 | 12 | 0 | 10JUN15:06:50:20 |
| 1 | 117 | xyz_daily_(\d{8})_file1.txt | D | 2015 Apr. 27 | 2015 Apr. 27 | 12 | 0 | 10JUN15:06:50:20 |
| 1 | 118 | xyz_daily_(\d{8})_file1.txt | D | 2015 Apr. 28 | 2015 Apr. 28 | 12 | 0 | 10JUN15:06:50:20 |
| 1 | 119 | xyz_daily_(\d{8})_file1.txt | D | 2015 Apr. 29 | 2015 Apr. 29 | 12 | 0 | 10JUN15:06:50:20 |
| 1 | 120 | xyz_daily_(\d{8})_file1.txt | D | 2015 Apr. 30 | 2015 Apr. 30 | 12 | 0 | 10JUN15:06:50:20 |
| 1 | 145 | xyz_daily_(\d{8})_file1.txt | D | 2015 May 25 | 2015 May 25 | 12 | 0 | 10JUN15:06:50:20 |
| 1 | 146 | xyz_daily_(\d{8})_file1.txt | D | 2015 May 26 | 2015 May 26 | 12 | 0 | 10JUN15:06:50:20 |
| 1 | 147 | xyz_daily_(\d{8})_file1.txt | D | 2015 May 27 | 2015 May 27 | 12 | 0 | 10JUN15:06:50:20 |

For example, an expected receipt timer is defined for each file included in the first-level parameters that is not indicated as ad hoc, for example, using <FREQ>A</FREQ>, based on the value specified in the <FREQ> field and the values specified in the <RUN_ . . . > fields. The expected receipt timer may include the value specified in the <LATE_ALERT_DUR> field. As another example, for a partitioned file, an expected receipt timer may be defined after receipt of the first file in the set to include the value specified in the <MAX_DELAY> field.

In an operation 908, a determination is made concerning whether or not the expected receipt timer has expired for any incoming file based on a review of values defined in the calendar table of control data 1008. If an expected receipt timer has expired, processing continues in an operation 980. If an expected receipt timer has not expired, processing continues in an operation 910.

In operation 910, the incoming directory, for example, defined by the value specified for the <TRANSPORT_INCOMING_DIR> field in configuration file 314, is scanned for receipt of new transfer data 322 that is a copy of transfer data 814 received from data orchestration system 110. The scan interval may be user definable.

In an operation 912, a determination is made concerning whether or not new transfer data 322 is stored in the incoming directory. If new transfer data 322 is stored in the incoming directory, processing continues in an operation 914. If new transfer data 322 is not stored in the incoming directory, processing continues in operation 908 to continue to monitor for expiration of any expected receipt timers and storage of any new source data.

In operation 914, the new transfer data 322 is stored in the archive directory, for example, defined by the value specified for the <TRANSPORT_ARCHIVE_DIR> field in configuration file 314. The new transfer data 322 is stored in the archive directory to ensure the original files can be restored if needed due to any processing or hardware failures. Operation 914 includes compressing transfer data 814 if transfer data 814 is not already compressed to minimize the disk space required to support archiving. The compression program indicated in the <COMPRESSION_PROGRAM> field in configuration file 314 may be used. Archive file names may receive a timestamp suffix to ensure files with the same name are archived uniquely.

In an operation 916, a source file is selected from the new transfer data 322 stored in the archive directory.

In an operation 918, a filename match is identified by comparing the values associated with each <INCOMING> field value with a filename of the selected source file to define which of the remaining first-level parameters are used for the selected source file. The comparison may be a string match or a regular expression match depending on how the <INCOMING> field value is defined. If both registries are used, an attempt to match the filename of the selected source file to the filename parameters included in the custom intake registry file may be performed first and an attempt to match the filename of the selected source file to the filename parameters included in the generic intake registry file may be performed second when no match is found in the custom intake registry file.

In an operation 919, a determination is made concerning whether or not a matching filename parameter was identified in operation 918. If a matching filename parameter was identified in operation 918, processing continues in an operation 920. If a matching filename parameter was not identified in operation 918, processing continues in operation 980 in FIG. 9C.

In operation 920, a determination is made concerning whether or not the selected source file is expected. For example, the receipt time may be compared to values stored in the calendar table of control data 1008 based on the value specified in the <FREQ> field and the values specified in the <RUN_ . . . > fields of the matching filename parameter. If the selected source file is expected, processing continues in an operation 922. If the selected source file is not expected, processing continues in operation 980.

In operation 922, a determination is made concerning whether or not the selected source file is compressed. For example, the determination may be based on the value specified in the <COMPRESSED_FLG> field of the matching filename parameter. If the selected source file is compressed, processing continues in an operation 924. If the selected source file is not compressed, processing continues in an operation 926.

In operation 924, the selected source file is decompressed using the program indicated by the filename.

In operation 926, a determination is made concerning whether or not the selected source file is encrypted. For example, the determination may be based on the value specified in the <DATA_ENCRYPTION_FLG> field of the matching filename parameter. If the selected source file is encrypted, processing continues in an operation 928. If the selected source file is not encrypted, processing continues in an operation 930.

In operation 928, the selected source file is decrypted. Data intake application 312 may use the location of the un-archive directory to decompress and process the selected source file. The values specified for the UNARCH_FILES_KEEP_DAYS and the UNARCH_FILES_KEEP_DAYS_ON_FAILURE fields in configuration file 314 specify how long un-archived files are kept when processing is successful and when error conditions occur, respectively.

In operation 930, a determination is made concerning whether or not a trigger file of the one or more trigger files 326 associated with the selected source file is present. For example, the incoming directory may be scanned for a trigger file having a matching filename pattern to the selected source file and having the extension specified in the <TRIGGER_FILE_EXT> field of the matching filename parameter. For illustration, if the filename of the selected source file is 20080101.1405.PRD.claims.txt.gz, the trigger file may be named 20080101.1405.PRD.claims.txt.gz.count if the extension specified in the <TRIGGER_FILE_EXT> field of the matching filename parameter is ".count". If the source file being sent is 20080101.1405.PRD.claims.txt.gz.gpg, the trigger file may be named 20080101.1405.PRD.claims.txt.gz.count because the trigger filename does not contain the extension ".gpg" that indicates the encryption extension.

If the trigger file is present, processing continues in an operation 932. If the trigger file is not present, processing continues in an operation 934.

In operation 932, the received trigger file is read. If the value specified in the <TRIGGER_ENCRYPTION_FLG> field of the matching filename parameter indicates that the trigger file is encrypted, the received trigger file is decrypted as part of reading the trigger file. For example, if the trigger file is encrypted, the trigger filename may be named 20080101.1405.PRD.claims.txt.gz.count or 20080101.1405.PRD.claims.txt.gz.done after decryption.

The one or more trigger files 326 may be plain text files that contain information used to audit the file transfer and to perform one or more data integrity tests. Trigger files may be transferred to data intake system 104 from data source system 102 after the selected source file has been transferred to indicate completion of the transfer. The one or more trigger files 326 may be optional.

Each of the one or more trigger files 326 may include a filename, a number of records, a checksum value, and a modification date that define a data integrity test value for the selected source file. The modification data may include a begin date and an end date. The filename may be the filename of one or more source files after decompression and decryption. If multiple files are being bundled into one file, the filename is the name of the individual data files within the bundle. For illustration, the checksum value may be an MD5 hash of the uncompressed individual data file. A trigger file of the one or more trigger files 326 may be empty to serve as an indicator that transfer data 322 is ready to be extracted. In an illustrative embodiment, if the trigger file is populated, the filename and the number of records may be required while the remaining fields are optional.

An example trigger file may be named "sample_pipe.txt.count" and include sample_pipe.txt|428|02/12/2015102/12/2015|5e364dc47504d63e45f999d4d923bd2f, where "sample_pipe.txt" is the filename, "428" is the number of records, "02/12/2015" is the begin date, 02/12/2015" is the end date, and "5e364dc47504d63e45f999d4d923bd2f" is the checksum value. Pipe "|" is the delimiter. If the field value is not included, the delimiter is still included.

If the file is bundled, the trigger file includes a line for each individual file. For example, if datafiles 20080201.1405.PRD.account.txt and 20080201.1405.PRD.trans.txt are sent in a compressed tar file, 20080201.1405.PRD.daily_files.tar.gz, the trigger contents could include
20080201.1405.PRD.account.
txt|13456|20080101|20080131|4a8d188b46
4d80212916e09440d34117 and
20080201.1405.PRD.trans.
txt|1248|20080101|20080131|7a0y488b464n80
212916e09440b87654.

Referring to FIG. 9B, in operation 934, the selected source file or a file of multiple files bundled into the selected source file is selected. For example, if datafiles 20080201.1405.PRD.account.txt and 20080201.1405.PRD.trans.txt are sent in a compressed tar file, 20080201.1405.PRD.daily_files.tar.gz, the uncompressed file 20080201.1405.PRD.account.txt may be selected.

In an operation 936, a filename match is identified by comparing the values associated with each <FILENAME> field value of the matching filename parameter identified from the <INCOMING> field value to define which of the remaining second-level parameters are used for the selected source file. If there is only <FILENAME> field value of the matching filename parameter identified from the <INCOMING> field value, the associated values are used to define which of the remaining second-level parameters are used for the selected source file. The comparison may be a string match or a regular expression match depending on how the <FILENAME> field value is defined.

In an operation 937, a determination is made concerning whether or not a matching filename parameter was identified in operation 936. If a matching filename parameter was identified in operation 936, processing continues in an operation 938. If matching filename parameter was not identified in operation 936, processing continues in operation 980.

In operation 938, any pre-process program indicator identified from the <PRE_PROCESS_SCRIPT> field value for the matching second level parameters is executed for the selected source file. The pre-process program associated with the pre-process program indicator may be implemented in software (e.g., comprised of computer-readable and/or computer-executable instructions) stored in second computer-readable medium 308 and accessible by second processor 310 for execution of the instructions that embody the operations of the pre-process program. The pre-process program may be written using one or more programming languages, assembly languages, scripting languages, etc. The pre-process program may be implemented as a Web application.

In operation 940, a determination is made concerning whether or not a data layout description file of the one or more data layout description files 324 associated with the selected source file is present. A delimited file such as a comma-delimited file may include a list of source files for which a data layout description file should be present. The data layout description file is used to define the layout of the selected source file. The data layout description file can be one common file for the entire project or one per data file. The common data layout description file name may match the value defined in the <DATASPEC_FILE> variable of configuration file 314. If the data layout description file is one per data file, the data layout description filename matches the value defined in the <LAYOUT_FILE> field of the matching second-level filename parameter. The data layout description file may be sent along with the selected source file. The one or more data layout description files may be stored in the location defined by the <DATASPEC_DIR> variable in configuration file 314.

For illustration, a field name and a description of a data layout description file are provided below:

extract_file_description—a descriptive name of the source file.

extract_file_pattern—a filename pattern, which should be the same as the <FILENAME> field in the one or more intake registry files 316.

extract_field_order—an order of the fields in the output table identified in the <OUTPUT_TABLE> field in the one or more intake registry files 316.

extract_field_name—a name of the column in the source file.

extract_field_label—a column label in the output table identified in the <OUTPUT_TABLE> field in the one or more intake registry files 316. If blank, extract_field_name values are used.

extract_field_type—a data type of the column (e.g., numeric, character).

extract_field_length—a length of the column.

extract_field_format—a format to be used in the output table identified in the <OUTPUT_TABLE> field in the one or more intake registry files 316. If blank, no formatting is done.

extract_field_informat—a format to be used while reading the source file. If blank, a default format is used.

extract_dq_rule—an indicator of a data quality test to execute. If blank, no data quality test is executed.

Referring to FIG. 11, a content 1100 of a data layout description file is shown in accordance with an illustrative embodiment. If a row fails a particular data quality test, it is written to a data quality exception dataset along with a reason for the data quality test failure. If multiple rules fail, all failed rules may be documented in the exception dataset. The exception dataset can be configured to be sent back to data source system 102. For illustration, a data quality test type and a description of illustrative data quality test types is provided below:

DQ_DATA_TYPE—verifies whether data in the specific column contains the data type specified.

DQ_INLIST(list=val1:val2:val3)—verifies whether data in the specific column is one of the values in the list.

DQ_DIGITS—verifies whether the data in the specific column contains only digits.

DQ_CHARS—verifies whether data in the specific column contains only characters.

DQ_ALPHANUM—verifies whether data in the specific column contains only alphanumeric characters.

DQ_NOTNULL—verifies whether data in the specific column is not null.

DQ_INRANGE(val1-val2)—verifies whether data in the specific column is within the range val1-val2 specified inclusive of the boundary values.

DQ_EXRANGE(val1-val2)—verifies whether data in the specific column is within the range val1-val2 specified exclusive of the boundary values.

DQ_LOOKUP(library.sasdsn.column)—verifies whether data in the specific column is in a look-up table defined by library.sasdsn.column.

If the data layout description file is present, processing continues in an operation 942. If the data layout description file is not present, processing continues in an operation 944.

In operation 942, the received data layout description file is read for the selected source file. In operation 944, a data layout description file is created automatically. A data layout description file may be created for certain file types (e.g., delimited file types) when a data layout description file is not present. The automatically generated data layout description file may be edited and the length, the formats, and other properties can be validated.

In an operation 946, a determination is made concerning whether or not a custom extract script indicator is defined in the <EXTRACT_SCRIPT> field of the matching filename parameter identified in operation 936. If a custom extract script indicator is defined, processing continues in an operation 948. If a custom extract script indicator was not defined, processing continues in operation 950.

In operation 948, any custom extract script identified from the <EXTRACT_SCRIPT> field value for the matching second level parameters is executed on the selected source file. The custom extract script may be implemented in software (e.g., comprised of computer-readable and/or computer-executable instructions) stored in second computer-readable medium 308 and accessible by second processor 310 for execution of the instructions that embody the operations of the custom extract script. The custom extract script may be written using one or more programming languages, assembly languages, scripting languages, etc. The custom extract script may be implemented as a Web application. Below is a sample extract script for illustration:

```
libname sasext "/aid/warehouse/quicketl/sinlef/extract/extractETL";
data sasext.custom_table;
attrib id length=8;
attrib name length=$50;
attrib age length=8;
infile "&incoming_dir/&datafile" dsd dlm=',' lrecl=32767;
input id name age;
run;
```

As another example, the custom extract script below extracts data from a custom JavaScript object notation (JSON) object using standard java libraries for JSON.

```
*set the java classpath;
options source;
OPTIONS SET=CLASSPATH
"/dig/projects/ADI2/sas/programs/java:/dig/projects/ADI2/sas/programs/
java/json-simple-1.1.1.jar:/dig/projects/ADI2/sas/programs/java/javax.json-
1.0.jar";
*get to the location of the input file;
%let jsonfile = &INCOMING_DIR./&DATAFILE;
* call java to ingest file as a data set;
*write the file out based on the output table name in the ADI registry;
data adiext.&OUTPUT_TABLE_ENTRY.;
length b rowid objid parid 8 parsed name value $200;
*instantiate the Java Object;
declare javaobj j ('com.sas.sso.solutions.JSONConsumer', "&jsonfile.");
j.callVoidMethod ('processJSONFile');
j.callBooleanMethod('hasNext', b);
   do while(b);
   j.callStringMethod('next', parsed);
   rowid = input(substr(parsed, 1, find(parsed, ' ')), 8.);
   parsed = strip(substr(parsed, find(parsed, ' ')));
   objid = input(substr(parsed, 1, find(parsed, ' ')), 8.);
   parsed = strip(substr(parsed, find(parsed, ' ')));
   parid = input(substr(parsed, 1, find(parsed, ' ')), 8.);
   parsed = strip(substr(parsed, find(parsed, ' ')));
   name = strip(substr(parsed, 1, find(parsed, ' ')));
   value = strip(substr(parsed, find(parsed, ' ')));
   output;
   j.callBooleanMethod('hasNext', b);
end;
drop b parsed;
run;
```

A new registry entry may be added to the custom intake registry file of intake registry files 316 (e.g., adi_custom_reg.xml) to enable the described example. The registry updates are illustrated in FIG. 12, which includes XML text 1200, and are summarized below:

Incoming file pattern 1202—the file pattern for the JSON object to receive;

File ID 1204—unique ID (7) assigned to the JSON file to receive;

Filename 1206—same as incoming file pattern 1202 because the JSON file is not compressed;

FileType 1208—set to "CUSTOM",

Extract_Script 1210—a name of the custom extract script;

Output_Table 1212—an output table name for the extract script to reference when extracting input; and Post_Process_Script 1214—a name of a custom post-process script.

In operation 950, a default extractor is executed on the selected source file. The default extractor may be implemented in software (comprised of computer-readable and/or computer-executable instructions) stored in second computer-readable medium 308 and accessible by second processor 310 for execution of the instructions that embody the operations of the default extractor. The default extractor may be written using one or more programming languages, assembly languages, scripting languages, etc. The default extractor may be executed/kicked off from a web application. For illustration, if the selected source file is a comma delimited file, for example, as indicated by the extension "csv", a default extractor is executed that extracts comma delimited text. For illustration, if the selected source file is a SAS dataset, for example, as indicated by the extension "sas7bdat", a default extractor is executed that extracts data from a SAS dataset. For illustration, if the selected source file is a pipe delimited file, for example, as indicated by the extension "txt", a default extractor is executed that extracts pipe delimited text.

If a file extraction fails due to a data layout issue, a corrected file can be sent again. The filename should match the original filename.

In an operation 952, a determination is made concerning whether or not the file is a partitioned file as defined in the <PARTITIONED> field of the matching filename parameter identified in operation 936. If the file is a partitioned file, processing continues in an operation 954. If the file is not a partitioned file, processing continues in an operation 956. In operation 954, the partitioned files are appended.

In operation 956, a determination is made concerning whether or not any data integrity test or tests is performed based on the trigger file. If a data integrity test is performed, processing continues in an operation 958. If a data integrity test is not performed, processing continues in an operation 962.

In operation 958, the one or more data integrity tests are performed. For example, one or more of a number of records test, a begin date test, an end date test, a checksum test, etc. is performed based on the fields defined in the trigger file, if any, for the selected source file. The integrity test may be performed by comparing the defined data integrity test value read from a line of the trigger file to a test value determined by reading the selected source file.

In operation 960, a determination is made concerning whether or not any data integrity test or tests failed. If a data integrity test failed, processing continues in operation 980. If no data integrity test failed, processing continues in operation 962.

In operation 962, a determination is made concerning whether or not any data quality test or tests is performed based on the data layout description file. If a data quality test is performed, processing continues in an operation 964. If a data quality test is not performed, processing continues in an operation 968.

In operation 964, the one or more data quality tests are performed on each column read from the selected source file based on the entries in the "extract_dq_rule" column for that column (columns in the selected source file are defined as a row of the data layout description file).

In operation 966, a determination is made concerning whether or not any data quality test or tests failed. If a data quality test failed, processing continues in operation 980. If no data quality test failed, processing continues in operation 968.

In operation 968, any post-process program identified from the <POST_PROCESS_SCRIPT> field value for the matching second level parameters is executed. The post-process program may be implemented in software (comprised of computer-readable and/or computer-executable instructions) stored in second computer-readable medium 308 and accessible by second processor 310 for execution of the instructions that embody the operations of the post-process program. The post-process program may be written using one or more programming languages, assembly languages, scripting languages, etc. The post-process program may be implemented as a Web application. For illustration, a post-process program can load data into a data base management system, an in-memory server, into a Hadoop file system, etc.

A list of macro variables and a description of each that may be available for a custom extract script, a pre-process program, and/or a post-process program to use are provided below:

&datafile—name of the source file.

&project_cd—name of the project as defined in configuration file 314.

&triggerfile—name of the trigger file associated with the source file.

&incoming_dir—directory in which the source file is extracted and is available.

&description—description of the source file from the custom intake registry file.

&file_pattern—file pattern from the custom intake registry file.

&filetype—diletype from the custom intake registry file.

&file_delimiter—dile delimiter from the custom intake registry file.

&output_table—name of the output table.

&id—unique id per job to identify an individual job from among parallel processes. This value may not be unique across runs, but may be unique for a single run.

&dqdsn—a data quality dataset name.

In an operation 970, one or more of the status files 320 are updated to indicate success or failure of the extraction from the selected source file. One or more signal files can be produced to communicate status/success/failure of data intake back to data source system 102 or to downstream processes of data host system 106.

In operation 972, a determination is made concerning whether or not another file is included in a bundled file. If another file is included in a bundled file, processing continues in operation 934 to select and process the next file. For example, if data files 20080201.1405.PRD.account.txt and 20080201.1405.PRD.trans.txt are sent in a compressed tar file, 20080201.1405.PRD.daily_files.tar.gz, the uncompressed file 20080201.1405.PRD.trans.txt may be selected next. If another file is not included in a bundled file, processing continues in an operation 974.

In operation 974, the calendar table of control data 1008 is updated as needed to indicate a next expected receipt time for the selected source file.

In operation 976, a determination is made concerning whether or not another source file is present in the archive location. If another file is present, processing continues in operation 916 to select and process the next file. If another file is not present, processing continues in operation 908 to continue to monitor for expiration of any expected receipt timers and storage of any new transfer data.

In operation 980, an error status file is updated. For example, an error message may be generated in one of log file A 320a, log file B 320b, or log file C 320c. In an operation 982, an error notification email may be sent. For example, status and/or error messages 1010 may be created and sent to message locations predefined in configuration file 314 based on a type of the message selected based on which operation called operation 980. Processing may continue in either operation 908 or in an operation immediately after the operation that called operation 980 depending on whether or not the subsequent processing can continue based on the error that occurred. For example, processing continues if errors happen during extraction of data unless a fatal error (e.g., validation of custom registry fails) occurs, in which case processing stops.

Processing through operations 900-984 continues until processing is stopped as understood by a person of skill in the art. As mentioned previously, multiple instances of extraction module 1004 may be executing in parallel. For illustration, extraction module 1004 may be executing operations 940 to 950.

Data intake application 312 provides a standardized process to automate the intake of data, and all that entails including archiving, encryption, data integrity/quality tests, decryption, audit trail, error handling, notifications, etc. Data intake application 312 further automates the extraction and data quality processes for supported file types without any need to write code or create jobs. The extraction and data quality processes can be either ad hoc or scheduled. Data intake application 312 provides one standardized component to automate the loading and processing of ad hoc data, sample data, and scheduled data. Traditionally, it has taken manual intervention to set up these processes and to execute some of these tasks. Data intake application 312 uses configurable intake registry files to configure the automatic data intake process to meet unique project needs, which makes storing data into data host system 106 a seamless process.

Among other advantages, data intake application 312 also provides a standardized workflow, logging, audit trail; supports immediate processing; makes hosted end users (e.g., customers) self-sufficient and makes data ingestion seamless to them; supports immediate processing and utilization of data as it is received, even if the file is sent in an ad-hoc manner; provides seamless paralleled processing of extracts when multiple files exist; provides automatic extraction of data saving many man hours for coding ETL jobs; and provides a calendar feature for scheduling and built in alerting when schedules are not met.

Data orchestration application 812 integrates with data intake application 312 and provides automated processing of source data 214 into transfer data 814 sent to data intake system 104. Data orchestration application 812 also integrates with data access application 512 and provides automated processing of host data 414 into analytic data 514 sent to data access system 108. Data orchestration application 812 may include one or more modules written in the same or different languages that may be executed or run by the same or different processors. For example, data orchestration application 812 may provide SOAP/REST web services to enable querying, job execution, bi-directional reporting related to processing by data orchestration application 812 and data intake application 312. Referring to FIG. 8, data orchestration application 812 may include extract service 822, retrieve service 824, an identity service 826, an update status service 828, and a check status service 830.

Figure 13A:
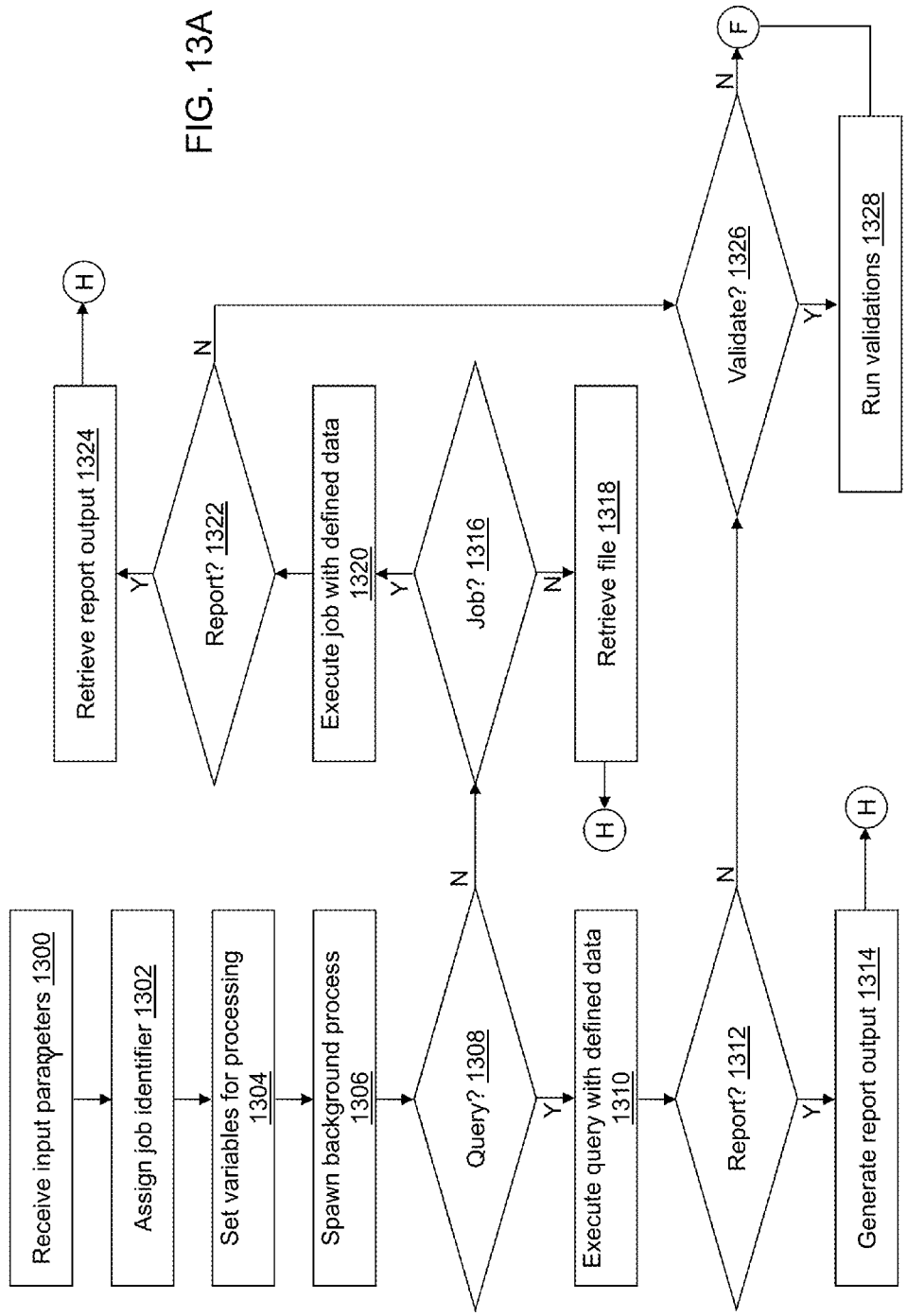
FIGS. 13A, 13B, and 13C depict a flow diagram illustrating examples of data extraction operations performed by the data orchestration system of FIG. 8 in accordance with an illustrative embodiment.
Figure 13B:
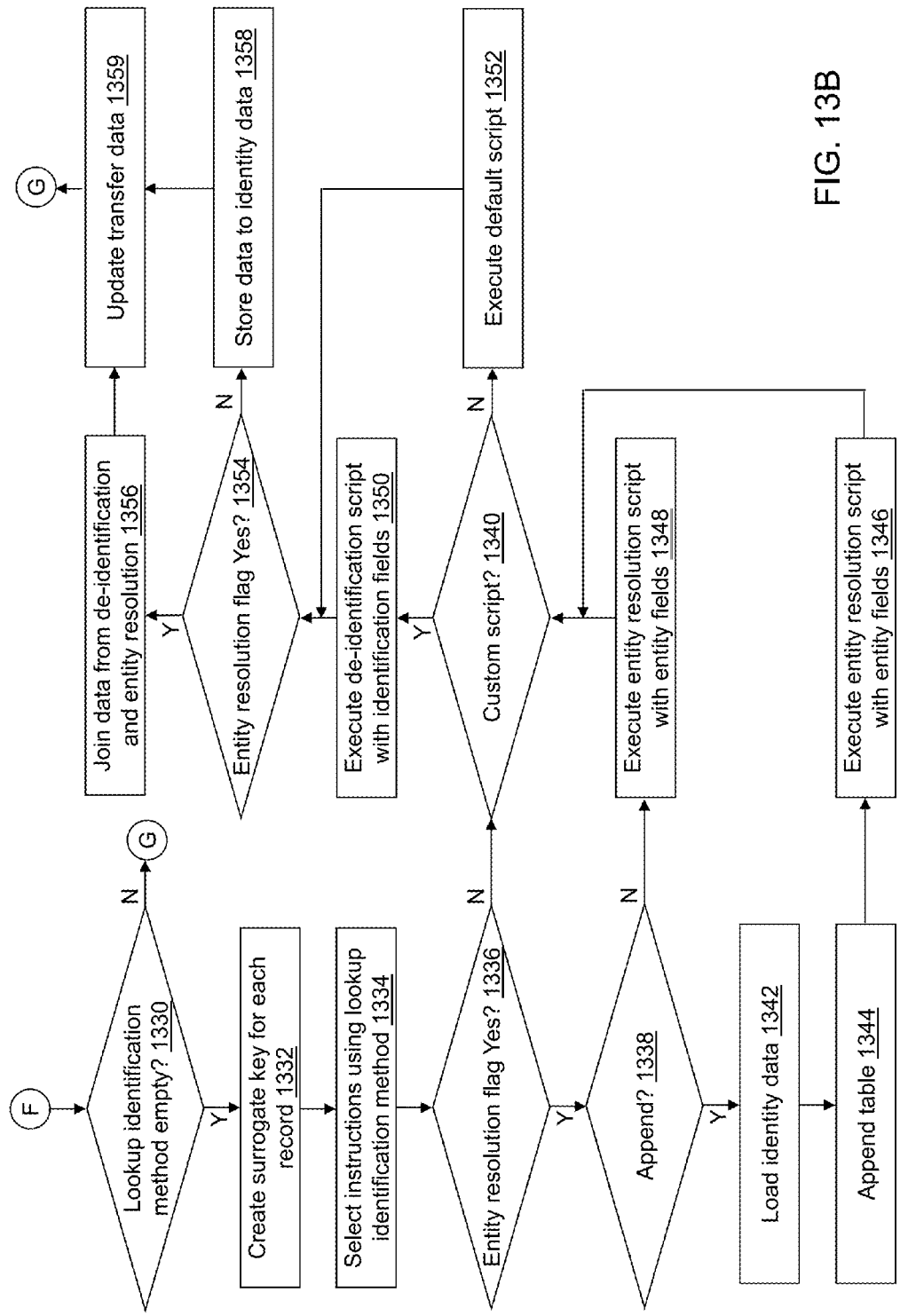
Figure 13C:
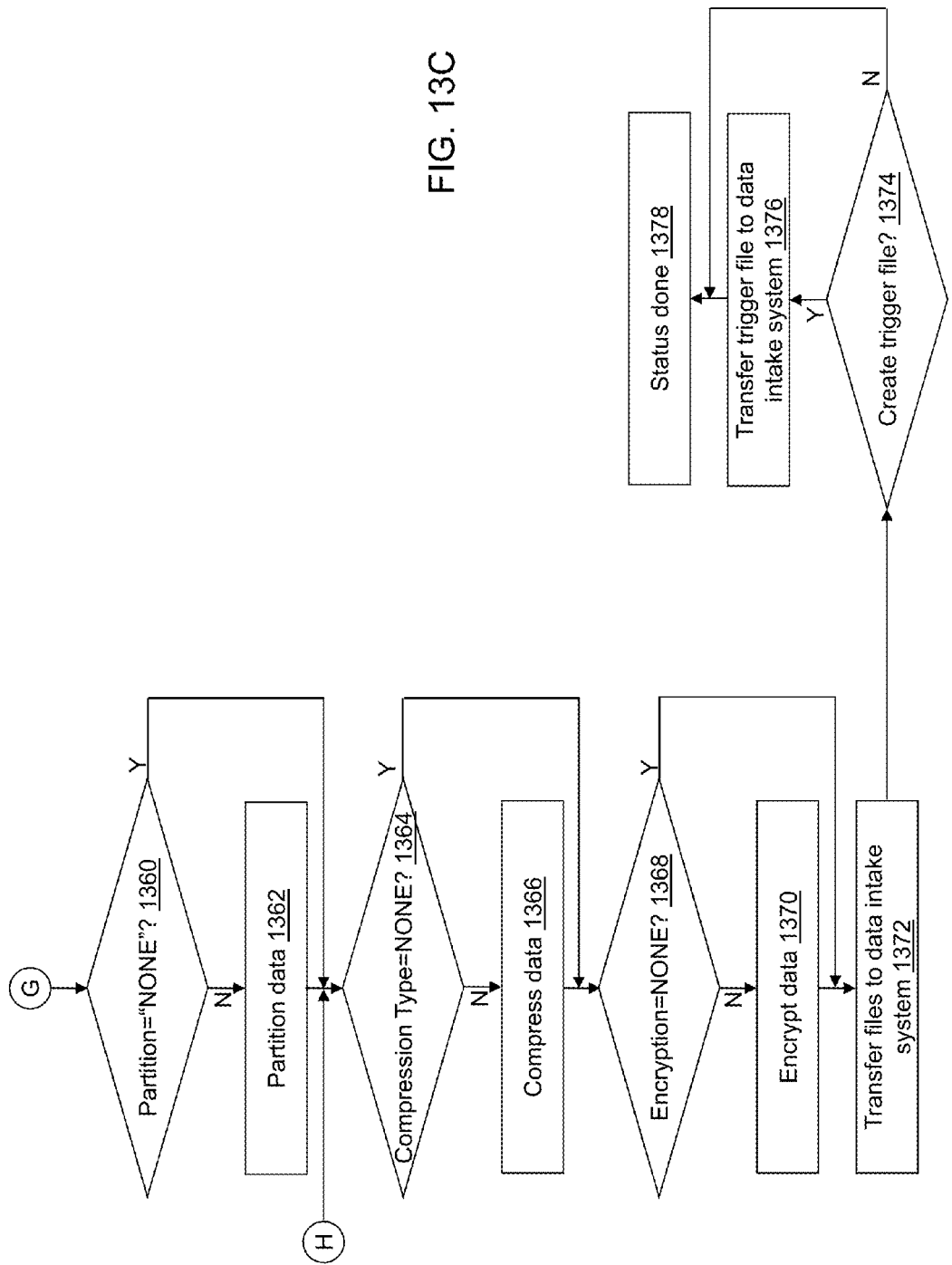

Referring to FIGS. 13A, 13B, and 13C, example operations associated with extract service 822 of data orchestration application 812 are described. Extract service 822 creates transfer data 814 from source data 214 and/or processed source data 614 optionally with one or more data layout description files 816 and one or more trigger files 818 and transfers created transfer data 814, the one or more data layout description files 816, and/or the one or more trigger files 818 to data intake system 104. The one or more data layout description files 324 are copies of the one or more data layout description files 816. The one or more trigger files 326 are copies of the one or more trigger files 818. Extract service 822 is typically called from data intake system 104 to transfer data or metadata from data source system 102 or ESP system 112 to data intake system 104. Additional, fewer, or different operations may be performed depending on the embodiment. The order of presentation of the operations of FIGS. 13A, 13B, and 13C is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using a plurality of threads or a plurality of processors.

Referring to FIG. 13A, in an operation 1300, input parameters are received. For example, the input parameters may be read from a command line triggering execution of extract service 822. The input parameters further may be read from a predefined location by default or as defined on the command line. As used herein, a "handle name" is used to communicate a set of instructions by group as input parameters. A handle lookup table may map each "handle name" defined for the associated input parameter to one or more input parameters that describe the set of instructions. Using the handle lookup table simplifies the addition of additional types of handles. Illustrative input parameters may include:

Query—SQL data query (if an ExtractType input parameter is "DataSet") or metadata query (if the ExtractType input parameter is "Metadata") of source data 214 and/or processed source data 614 that is performed to define the data to extract. The query can be encoded for security reasons and detected based on a configurable prefix for this parameter.

JobFile—if the Query input parameter is empty, and this input parameter is populated, a filename in this field is a job that extract service 822 will execute. A JobFile may be used when a standard reoccurring process is run on source data 214 and/or processed source data 614 to integrate with host data 414.

TableOut—a name of an output table to create. The name is used in transfer data 814 produced and transferred to data intake system 104. Additional suffixes and prefixes may be included based on naming conventions.

ExtractType—indicates a type of output data created from source data 214 and/or processed source data 614. When the output to be produced is a data table, the ExtractType input parameter may be defined as "DataSet"; when the output to be produced is metadata, the ExtractType input parameter may be defined as "Metadata"; when the output to be produced is a report, the ExtractType input parameter may be defined as "Report"; and when a file should be transferred as-is, the ExtractType input parameter may be defined as "File Shovel".

PartitionType—indicates whether or not large data files of source data 214 and/or processed source data 614 should be partitioned prior to transfer to data intake system 104. The naming convention for partitioned files is to include a suffix to the filename like 1_OF_N, 2_OF_N, . . . , N_OF_N. A value of "NONE" may indicate no partitioning. A value of "Obs(###)" may indicate to partition source data 214 and/or processed source data 614 that exceeds the number of observations "###" provided. A value of "DiskSize(#M, #G)" may indicate to partition by the number of megabytes (#M) or number of gigabytes (#G) provided.

ValidationRules—defines a validation handle name to run data quality test types for those columns of source data 214 and/or processed source data 614 that have them defined as described previously relative to FIG. 11 and "extract_dq_rule" of data intake application 312. A list of fields and validation checks can also be passed in JSON format for this input parameter. An illustrative JSON formatted validation rule for this input parameter is:

```
{ "dq_checks": [
{"field1":"DQ_CHARS|DQ_NOTNULL","|v|":"warning"},
{"genderField":"DQ_INLIST(list='M':'F':NULL)","|v|":"error"},
{"codesField":"DQ_LOOKUP(library.validationTable)","|v|":"fatal
error"}]}
```

If the ValidationRules input parameter is empty, no validation is performed.

CompressionType—defines whether source data 214 and/or processed source data 614 should be compressed and which method of compression to use. Illustrative options for the CompressionType input parameter include: NONE, ZIP, GZIP, TAR.GZ (TAR and compressed using GZIP).

Encryption—defines whether source data 214 and/or processed source data 614 should be encrypted and which method of encryption to use. Illustrative options for the Encryption input parameter include: NONE or an encryption handle name. The encryption handle name defines how transfer data 814 should be encrypted. An encryption type and encryption key can be retrieved from the handle lookup table using the encryption handle name. If a matching encryption handle name is found, transfer data 814 is encrypted using the encryption key with the encryption type registered with the encryption handle name.

ProcessParameters—dynamic values to be passed into the job that extract service 822 will execute. The ProcessParameters input parameter may be used to filter data extracted for processing. For example, data intake application 312 may extract data with a timestamp that includes a date/time within the last 24 hours such that 24 hours is passed as a parameter to the job that extract service 822 will execute. The ProcessParameters input parameter may be written using JSON format such as {'typeParamIn':'Sedan'}, {'originParamIn':"Asia","Europe" }, which is used to filter transfer data 814.

IncludeLog—indicates whether or not to include a processing log with transfer data 814.

SendTriggerFile—indicates whether or not to send the one or more trigger files 818 to data intake system 104 to indicate transfer data 814 has completely transferred. As discussed previously, the one or more trigger files 818 may include an MD5 hash value and a row count that can be used by data intake application 312 for integrity checking.

DataLayoutFile—if populated, the one or more data layout description files 816 included in the DataLayoutFile input parameter are transferred with transfer data 814 to enable formatting and data quality checks by data intake application 312.

OutputTransferType—defines an output handle name. The output handle name is used to retrieve registered information from the handle lookup table used to complete the transfer to data intake system 104. The registered information associated with the output handle name may include a protocol (e.g., SFTP, SCP, other), a transfer type (upload, download), credentials (i.e., username and password), connectivity options (i.e., hostname and port number), a command, a security key, etc. The registered information further may indicate whether the transfer is sequential or parallel.

FilePrefix—a prefix added to the name of a file, for example, to differentiate it from other files.

ReportOutputType—illustrative options include PDF, RTF, Excel, CSV, etc. that is used to format a report output.

ShovelFile—indicates the file to transfer when the ExtractType input parameter is "File Shovel" or when the ExtractType input parameter is "Report" and the JobFile input parameter is populated.

LookupIdentificationMethod—indicates a de-identification methodology handle name that defines how to perform entity resolution (matching and de-duplicating), to remove identifiable data from transfer data 814, to assign a surrogate key, and to store the identifying information and surrogate key in identity data 820. A location of identity data 820 further may be provided. The location of identity data 820 may not be input when identifiable data is not removed from source data 214 and/or processed source data 614. The de-identification methodology handle name is used to retrieve de-identification instructions from the handle lookup table.

In an operation 1302, a job ID is assigned.

In an operation 1304, a set of variables is loaded based on an entry in the ProcessParameters input parameter. For example, a list of parameters may optionally be passed to extract service 822 that runs underneath a web service to allow for parameters to be passed into extract service 822 incrementally. For example, extract service 822 may be called every day with the same job name. Yesterday's date is passed in to incrementally extract data closed out yesterday for transfer to data intake system 104. As another example, extract service 822 uses the list of parameters to filter data to be transferred when a data type field value is 'Sedan' and a data origin field value is IN('Asia','Europe') using {'typeParamIn':'Sedan'},{'originParamIn':"Asia", "Europe"}.

In an operation 1306, a background process may be spawned into a background thread so a web service response can be returned with the assigned job ID. For example, operations 1308 to 1378 may be performed by the spawned background process because creating transfer data 814 can take time to process.

In an operation 1308, a determination is made concerning whether or not the Query input parameter is populated. If the Query input parameter is populated, processing continues in an operation 1310. If the Query input parameter is not populated, processing continues in an operation 1316.

In operation 1310, the query specified by the Query input parameter is executed as a SQL data query if the ExtractType input parameter is "DataSet" or a metadata query if the ExtractType input parameter is "Metadata".

In an operation 1312, a determination is made concerning whether or not the ExtractType input parameter is "Report". If the ExtractType input parameter is "Report", processing continues in an operation 1314. If the ExtractType input parameter is not "Report", processing continues in an operation 1326.

In operation 1314, a report is generated using the output from the executed query, and processing continues in an operation 1364. The report file format is determined by the value of the ReportOutputType input parameter.

In operation 1316, a determination is made concerning whether or not the JobFile input parameter is populated. If the JobFile input parameter is populated, processing continues in an operation 1320. If the JobFile input parameter is not populated, processing continues in an operation 1318.

In operation 1318, the ExtractType input parameter is "File Shovel" so the file referenced by the ShovelFile input parameter is retrieved, and processing continues in operation 1364.

In operation 1320, the job specified by the JobFile input parameter is executed with the loaded set of variables.

In an operation 1322, a determination is made concerning whether or not the ExtractType input parameter is "Report". If the ExtractType input parameter is "Report", processing continues in an operation 1324. If the ExtractType input parameter is not "Report", processing continues in operation 1326.

In operation 1324, a report is retrieved as the output from the executed job based on the ShovelFile input parameter, and processing continues in operation 1364.

In operation 1326, a determination is made concerning whether or not the ValidationRules input parameter is empty. If the ValidationRules input parameter is not empty, processing continues in an operation 1328. If the ValidationRules input parameter is empty, processing continues in an operation 1330.

In operation 1328, the validation rules defined based on the validation handle name specified by the ValidationRules input parameter and included in the handle lookup table are executed on the executed query output or the executed job output, and processing continues in operation 1330. Upon completion of the validation checks, a summary may be sent to update status service 828 so it can be retrieved by check status service 830. Additional notification types (email, web service call) can be associated with the validation handle name. Using the validation rules, validation can be performed by data orchestration system 110 within the first internal network before transfer of transfer data 814 to data intake system 104.

Referring to FIG. 13B, in operation 1330, a determination is made concerning whether or not the LookupIdentificationMethod input parameter is empty. If the LookupIdentificationMethod input parameter is not empty, processing continues in an operation 1332. If the LookupIdentificationMethod input parameter is empty, processing continues in an operation 1360.

In operation 1332, a surrogate key is created for each record of the data defined as a result of the executed query output or the executed job output. For illustration, the surrogate key may be a combination of a process ID, also known as a service call ID, and a record number. For illustration, a surrogate key may be "161130_230109_myUser.1" for a process ID "161130_230109_myUser" and a record number "1".

In operation 1334, the de-identification instructions associated with the LookupIdentificationMethod input parameter are selected from the handle lookup table. Example fields associated with the de-identification methodology handle name include:

LookupMethodHandleName—defines the de-identification methodology handle name used to match the value of the LookupIdentificationMethod input parameter.

LookupTableName—defines a name of a database table that stores identifiable data and factors for entity resolution matching. The database table is stored in identity data 820. A unique table may be stored in identity data 820 for each LookupMethodHandleName.

EntityResolveFlag—indicates whether or not entity resolution is performed. When the value of the EntityResolveFlag input parameter is "N", data is appended to the table specified by the LookupTableName input parameter in an operation 1358.

EntityResolveMethod—defines an entity resolution method when the value of the EntityResolveFlag input parameter is "Y". Illustrative options for the EntityResolveMethod input parameter include "Replace" and "Append". When the EntityResolveMethod input parameter is "Replace", the entire set of entity data included in the table specified by the LookupTableName input parameter and stored in identity data 820 is replaced. When the EntityResolveMethod input parameter is "Append", the entity data stored in identity data 820 is incrementally processed and matched to previously known entities as described further below.

EntityResolveScript—defines a location of a script/logic/algorithm to perform entity resolution. The script/logic/algorithm to perform entity resolution may be referred to as the entity resolution script. For illustration, entity resolution matching can be performed using a single field, a standardized field, fuzzy/probabilistic matching, and composite matching when multiple fields and fuzzy/probabilistic matches are used.

EntityResolveFields—defines a delimited list of fieldnames used by the entity resolution script. An illustrative value for the input parameter EntityResolveFields may be "name|address_Line1|phone|gender" or "name|address|tax_id|phone".

DeIdentifyFields—defines a delimited list of fieldnames for which a de-identification methodology is performed. The same field may be included in both the EntityResolveFields input parameter and the DeIdentifyFields input parameter. An illustrative value for the input parameter DeIdentifyFields may be "name|account|address_Line1" or "name|tax_id|dba".

DeIdentifyMethodology—specifies a de-identification methodology to be performed on each field identified by the DeIdentifyFields input parameter. Illustrative values for the DeIdentifyMethodology input parameter include "Mask (SHA256)", "Mask(MD5)", "Empty Field", "Drop Field", "Custom Script Name". Selection of "Mask(SHA256)" for the DeIdentifyMethodology input parameter indicates use of a SHA-256 algorithm that generates a 256-bit hash to mask the value of each field defined by the DeIdentifyFields input parameter in transfer data 814. Selection of "Mask(MD5)" for the DeIdentifyMethodology input parameter indicates use of an MD5 algorithm that generates a 128-bit hash to mask the value of each field defined by the DeIdentifyFields input parameter in transfer data 814. Selection of "Empty Field" for the DeIdentifyMethodology input parameter indicates that the value of each field defined by the DeIdentifyFields input parameter is replaced with an empty field in transfer data 814. Selection of "Drop Field" for the DeIdentifyMethodology input parameter indicates that the field defined by the DeIdentifyFields input parameter is not included in transfer data 814. The DeIdentifyMethodology input parameter may define a location of a script/logic/algorithm to perform de-identification on values included in the field defined by the DeIdentifyFields input parameter in transfer data 814 as indicated by the option "Custom Script Name". The script/logic/algorithm to perform de-identification may be referred to as a de-identification script and may mask, scramble, encrypt, remove, clear, etc. each field indicated by the DeIdentifyFields input parameter value. "Mask(SHA256)", "Mask(MD5)", "Empty Field", and "Drop Field" may each be associated with a default de-identification script that performs the described function on each field defined by the DeIdentifyFields input parameter.

In an operation 1336, a determination is made concerning whether or not the EntityResolveFlag input parameter value is "Y". If the EntityResolveFlag input parameter value is "Y", processing continues in an operation 1338. If the EntityResolveFlag input parameter value is "N", processing continues in an operation 1340.

In operation 1338, a determination is made concerning whether or not the EntityResolveMethod input parameter value is "Append" or "Replace". If the EntityResolveMethod input parameter value is "Append", processing continues in an operation 1342. If the EntityResolveMethod input parameter value is "Replace", processing continues in an operation 1348.

In operation 1342, identity data 820 is loaded by reading identity data 820.

In an operation 1344, the defined data from operations 1310 or 1320 (data defined as a result of the executed query output or the executed job output) is appended to the surrogate key created for each record in operation 1332.

In an operation 1346, the entity resolution script defined by the EntityResolveScript input parameter value is executed. Input variables made available to the entity resolution script include a variable for the defined data and a variable that includes the table name defined by the LookupTableName input parameter value. The entity resolution script uses these variables to perform entity resolution logic on the defined data. Outputs from execution of the entity resolution script may include the created surrogate key value, a record type value, an entity ID, an entity lineage value, an entity match summary value, and field values 1-N used to match the entity. The surrogate key uniquely identifies each data record being processed so it can be matched back to corresponding identifiable data stored in identity data 820 in the future, for example, using retrieve service 824, identity service 826, or other customer use cases to match back to source data 214 and/or processed source data 614.

The record type value is either "Master" or "Record". A user may be most interested in retrieving/displaying a master record that represents all records in a matched entity cluster instead of retrieving a raw value. Setting the record type value to "Master" indicates the record is the master record for the records with the same entity ID. There should only be one record per entity ID that has the record type value set to "Master" and that record is not required to have a populated surrogate key value. The entity ID is assigned to matching entities based on the entity resolution script. The entity lineage value may be used when the EntityResolveMethod input parameter value is "Append" to reconcile matched clusters that merge between execution calls to extract service 822. The entity lineage value includes a delimited list of prior entity IDs assigned to the record. The entity match summary value stores match metrics and information related to the record's match strength relative to other entities in the cluster. Field values 1-N represent any field values used to match new records being processed to records previously matched and processed by the entity resolution script. The matching process may define one or more standardizes field values and/or one or more generated match code values for fuzzy matching.

For illustration, where the EntityResolveFields input parameter value is "name| address_Line1|phone|gender", the table referenced by the LookupTableName input parameter value contains columns for the surrogate key value, the record type value, the entity ID, the entity lineage value, the entity match summary value, a name, a first line of an address, a phone number, and a gender for each record of the defined data. An illustrative value for the entity match summary value may be "{'strength':'.85', 'criteria':'fuzzy name, fuzzy phone, gender'}" to indicate that a fuzzy match to the name field value, a fuzzy match to the phone number field value, a match to the gender field value with a computed match strength greater than or equal to 0.85 indicates a matching entity. Where a match between records is identified based on the criteria applied by the entity resolution script, one record is selected to have the record type of "Master" with the remaining records having the record type of "Record".

When retrieve service 824 or identity service 826 provide a result type parameter equal to "Entity", the fields for the record having the record type of "Master" are returned for any matching surrogate key values that have the same entity ID. The record having the record type of "Master" represents all entities in that cluster. A record processed can be selected as the master record or a new record can be inserted into the table referenced by the LookupTableName input parameter value. When a new record is saved to the table referenced by the LookupTableName input parameter value, the new record will not have a surrogate key value because it was not part of source data 214 and/or processed source data 614 extracted and processed by extract service 822. The logic for determining survivorship/master record selection or creation is included in the entity resolution script. Matching is performed as additional defined data is appended to the table referenced by the LookupTableName input parameter value.

Similar to operation 1346, in an operation 1348, the entity resolution script defined by the EntityResolveScript input parameter value is executed. Input variables made available to the entity resolution script include a variable for the defined data and the variable that includes the table name defined by the LookupTableName input parameter value. The entity resolution script uses these variables to perform entity resolution logic on the defined data. Outputs may include the created surrogate key value, the record type value, the entity ID, the entity match summary value, and the field values 1-N used to match the entity. The table referenced by the LookupTableName input parameter value is replaced for each call to extract service 822 so there is no matching between defined data and prior entries and, as a result, no inclusion of the entity lineage field value in the table referenced by the LookupTableName input parameter value.

In operation 1340, a determination is made concerning whether or not the DeIdentifyMethodology input parameter value indicates a custom script. If the DeIdentifyMethodology input parameter value indicates a custom script, processing continues in operation 1350. If the DeIdentifyMethodology input parameter value does not indicate a custom script, processing continues in an operation 1352.

In operation 1350, the custom script indicated for the de-identification script by the DeIdentifyMethodology input parameter value is executed for each field defined by the DeIdentifyFields input parameter to replace the field value in the defined data with the masked, scrambled, encrypted, removed, cleared, etc. value computed by the de-identification script.

In operation 1352, the default de-identification script indicated by the DeIdentifyMethodology input parameter value is executed for each field defined by the DeIdentifyFields input parameter to replace the field value in the defined data with the masked, scrambled, encrypted, removed, cleared, etc. value computed by the de-identification script.

In an operation 1354, a determination is made concerning whether or not the EntityResolveFlag input parameter value is "Y". If the EntityResolveFlag input parameter value is "Y", processing continues in an operation 1356. If the EntityResolveFlag input parameter value is "N", processing continues in an operation 1358.

In operation 1356, the output from operation 1346 or 1348 is joined to the identifiable data for each field defined by the DeIdentifyFields input parameter, and processing continues in an operation 1359. This table is saved to the table referenced by the LookupTableName input parameter value of identity data 820 so future entity resolution can match to previously processed records and so de-identifiable fields can be looked up by retrieve service 824 and/or identity service 826. When the same field is included in both the EntityResolveFields input parameter and the DeIdentifyFields input parameter, the field is only saved to the table once.

In operation 1358, the identifiable data associated with each field defined by the DeIdentifyFields input parameter is appended to the surrogate key created in operation 1332 and saved to the table referenced by the LookupTableName input parameter value of identity data 820 so de-identifiable fields can be looked up by retrieve service 824 and/or identity service 826, and processing continues in operation 1359.

In operation 1359, the defined data is updated to include the surrogate key and the entity ID, if any, associated with each record of the defined data that includes the de-identified field values from operation 1350 or 1352, and with any field values for which de-identification was not performed. Subsequent operations such as partitioning, compression, encryption, and/or file transfer are performed on the updated, defined data that may be referred to as de-identified data.

Referring to FIG. 13C, in operation 1360, a determination is made concerning whether or not the PartitionType input parameter is "NONE". If the PartitionType input parameter is "NONE", processing continues in operation 1364. If the PartitionType input parameter is not "NONE", processing continues in an operation 1362.

In operation 1362, the de-identified data, the executed query output, or the executed job output is partitioned based on the value of the PartitionType input parameter. Subsequent operations such as compression, encryption, and/or file transfer are performed for each partition.

In operation 1364, a determination is made concerning whether or not the CompressionType input parameter is "NONE". If the CompressionType input parameter is "NONE", processing continues in an operation 1368. If the CompressionType input parameter is not "NONE", processing continues in an operation 1366.

In operation 1366, the de-identified data, the executed query output, the executed job output, the created partitions, or the generated report output is compressed based on the value of the CompressionType input parameter, and an appropriate file extension is added (e.g., ".zip", ".gzip", etc.).

In operation 1368, a determination is made concerning whether or not the Encryption input parameter is "NONE". If Encryption input parameter is "NONE", processing continues in an operation 1372. If Encryption input parameter is not "NONE", processing continues in an operation 1370.

In operation 1370, the de-identified data, the executed query output, the executed job output, the created partitions, the generated report output, and/or the compressed output is encrypted based on the encryption type and encryption key associated with the encryption handle name defined by the value of the Encryption input parameter.

In an operation 1372, the de-identified data, the executed query output, the executed job output, the created partitions, the generated report output, the compressed output, and/or the encrypted output are transferred to data intake system 104 based on the value of the OutputTransferType input parameter. The de-identified data, the executed query output, the executed job output, the created partitions, the generated report output, the compressed output, and/or the encrypted output form transfer data 814. The connectivity information that defines the transfer characteristics are retrieved using the output handle name provided by the OutputTransferType input parameter. Using the output handle name and the handle lookup table is more secure than passing connectivity information to extract service 822. When the Query input parameter is defined, the TableOut input parameter may be used to indicate a final table created by the query to be packaged and transferred as transfer data 814. Similarly, when the JobFile input parameter is defined, the TableOut input parameter may be used to indicate which table to package and transfer as transfer data 814.

If the DataLayoutFile input parameter is populated, the referenced one or more data layout description files 816 are transferred with transfer data 814 to enable formatting and data quality checks by data intake application 312. If the IncludeLog input parameter is "Yes", a processing log is sent with transfer data 814.

In an operation 1374, a determination is made concerning whether or not a trigger file is created based on the value of the SendTriggerFile input parameter. If a trigger file is created, processing continues in an operation 1376. If a trigger file is not created, processing continues in an operation 1378.

In operation 1376, a trigger file is created and transferred to data intake system 104 to indicate transfer of transfer data 814 is complete. A plurality of trigger files may be created, for example, when the de-identified data, the executed query output, or the executed job output were partitioned in operation 1362.

In operation 1378, a status of done is indicated by extract service 822. In an alternative embodiment, instead of using a trigger file, a process using transfer data 814 can call check status service 830 to get a status of processing by extract service 822.

Figure 14A:
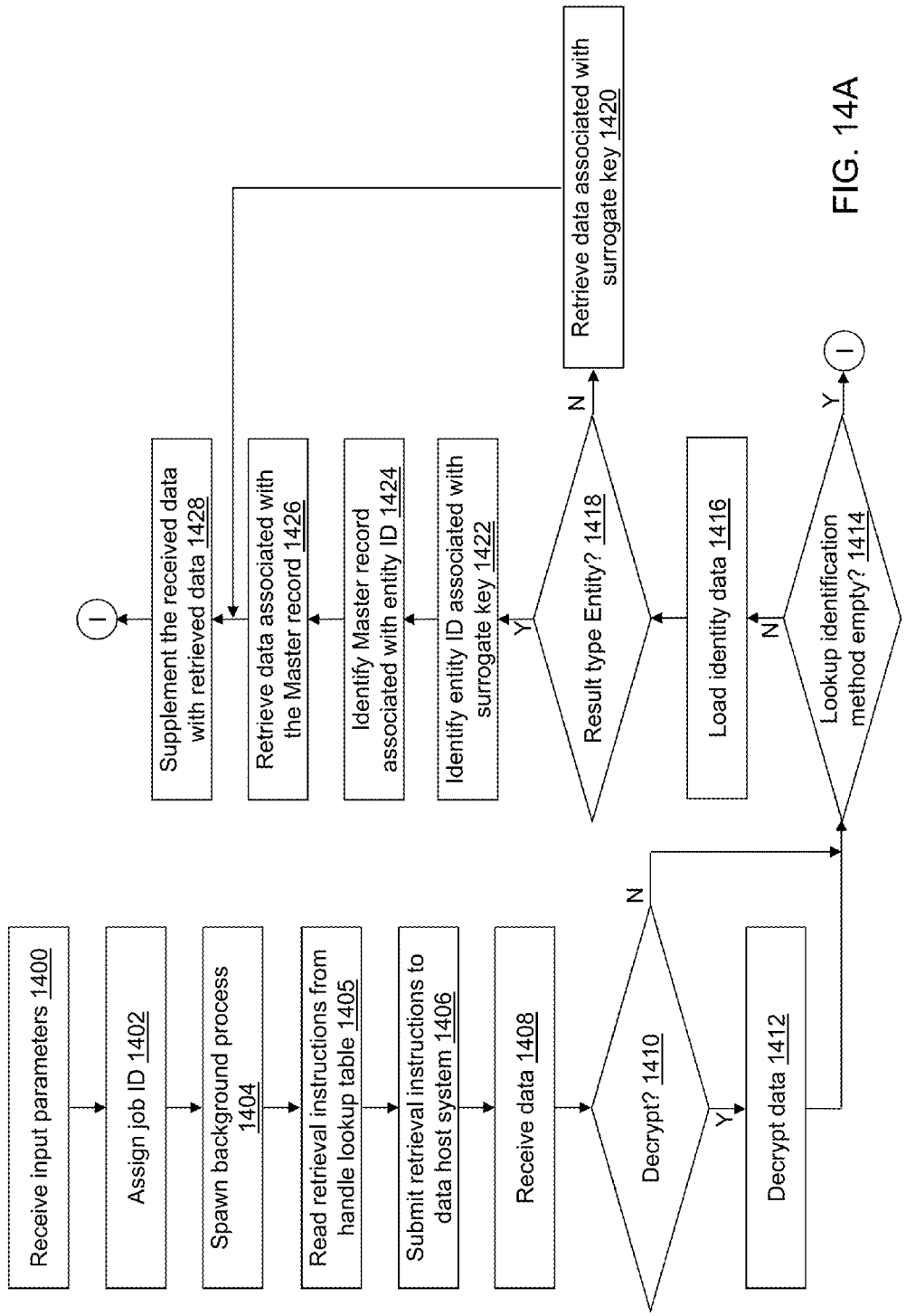
FIGS. 14A and 14B depict a flow diagram illustrating examples of data retrieval operations performed by the data orchestration system of FIG. 8 in accordance with an illustrative embodiment.
Figure 14B:
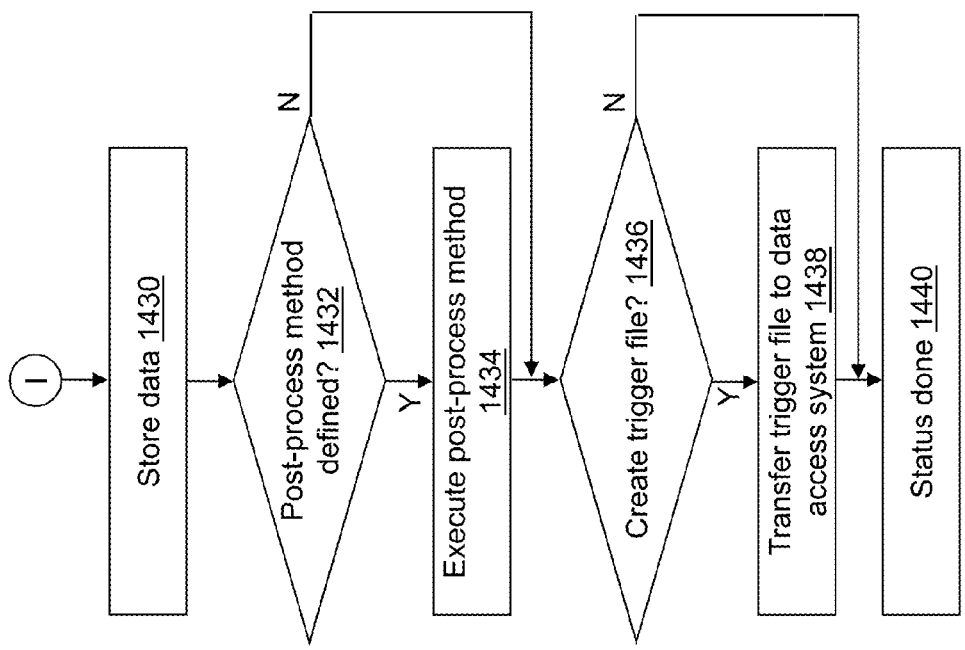

Referring to FIGS. 14A and 14B, example operations associated with retrieve service 824 of data orchestration application 812 are described. Retrieve service 824 retrieves host data 414 from data host system 106 and creates retrieved data 815 sent to data access system 108. Additional, fewer, or different operations may be performed depending on the embodiment. The order of presentation of the operations of FIGS. 14A and 14B is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using a plurality of threads or a plurality of processors. Retrieve service 824 can be automatically called from data intake application 312 when the operations of FIGS. 9A, 9B, and 9C are complete. For example, periodic calls to check status service 830 may indicate when processing by extract service 822 is complete and retrieve service 824 can be initiated.

Referring to FIG. 14A, in an operation 1400, input parameters are received. For example, the input parameters may be read from a command line triggering execution of retrieve service 824. The input parameters further may be read from a predefined location by default or as defined on the command line. Illustrative input parameters include:

FilePattern—defines host data 414 to be transferred to data access system 108. Retrieve service 824 retrieves and transfers files of host data 414 that match the file pattern included for the FilePattern input parameter, if any.

Decryption—defines whether retrieved data 815 should be decrypted and which method of decryption to use. Illustrative options for the Decryption input parameter include: NONE or a decryption handle name. The decryption handle name defines how transfer data 814 should be decrypted. A decryption type and a decryption key can be retrieved from the handle lookup table using the decryption handle name. If a matching decryption handle name is found, transfer data 814 is decrypted using the decryption key with the decryption type registered with the decryption handle name.

OutputTransferType—defines an output handle name. The output handle name is used to retrieve connection information from the handle lookup table used to complete the transfer from data host system 106 to data orchestration system 110. The connection information associated with the output handle name may include the protocol (e.g., SFTP, SCP, other), the transfer type (upload, download), credentials (i.e., username and password), connectivity options (i.e., hostname and port number), the command, the security key, etc. The connection information further may indicate whether the transfer is sequential or parallel.

SaveTriggerFile—indicates whether or not to generate one or more trigger files 818 to indicate the file transfer is complete to data access system 108, and the file is ready for processing at data access system 108.

LookupIdentificationMethod—indicates whether or not retrieved data 815 was de-identified in operations 1330 to 1359. For example, an empty LookupIdentificationMethod input parameter value or a LookupIdentificationMethod input parameter value of "NONE" may indicate that retrieved data 815 was not de-identified in operations 1330 to 1359. A location of identity data 820 further may be provided. The location of identity data 820 may not be input when identifiable data was not removed from source data 214 and/or processed source data 614. The unique table stored in identity data 820 for the LookupMethodHandleName that matches the LookupIdentificationMethod input parameter value is selected.

PostProcessMethod—defines a location of a script/logic/algorithm to perform post-processing in support of downstream integration such as to ESPE 700. The script/logic/algorithm, if any, to perform post-processing may be referred to as the post-process script. For example, the post-process script may be used to enrich, integrate, or output data in a different format. Retrieved data 815 is input to the post-process script.

ResultType—may be "Entity" or "Record", where "Entity" returns a record flagged as the "Master" record for the entity and intersects it with received data, and "Record" returns information for that record and intersects it with received data.

In an operation 1402, a job ID is assigned.

In an operation 1404, a background process may be spawned into a background thread so a web service response can be returned with the assigned job ID. For example, operations 1406 to 1440 may be performed by the spawned background process because retrieving host data 414 from data host system 106 can take time to process and create retrieved data 815.

In an operation 1405, retrieval instructions associated with the output handle name are selected and read from the handle lookup table. Using the handle lookup table is more secure than passing connectivity information to retrieve service 824.

In an operation 1406, the selected retrieval instructions are submitted to data host system 106 with the FilePattern input parameter value, if any, to identify a portion of host data 414 to transfer to data orchestration system 110.

In an operation 1408, the identified portion of host data 414 is received based on the selected retrieval instructions.

In an operation 1410, a determination is made concerning whether or not the received host data 414 should be decrypted. If the received host data 414 should be decrypted, processing continues in an operation 1412. If the received host data 414 should not be decrypted, processing continues in an operation 1414. For example, the received host data 414 is decrypted when the value of the Decryption input parameter is not "NONE".

In operation 1412, the received host data 414 is decrypted using the decryption key with the decryption type associated with the decryption handle name selected and read from the handle lookup table using the Decryption input parameter value.

In operation 1414, a determination is made concerning whether or not the LookupIdentificationMethod input parameter value is empty or "NONE". If the LookupIdentificationMethod input parameter value is empty or "NONE", processing continues in an operation 1430. If the LookupIdentificationMethod input parameter value is not empty or "NONE", processing continues in an operation 1416.

In operation 1416, identity data 820 is loaded by reading identity data 820.

In an operation 1418, a determination is made concerning whether or not the ResultType input parameter is "Entity". If the ResultType input parameter is "Entity", processing continues in an operation 1422. If the ResultType input parameter is not "Entity", processing continues in an operation 1420.

In operation 1420, the entity ID and/or identifiable data stored in operations 1356 or 1358 are retrieved from the loaded identity data 820 using the surrogate key included for each record in the received host data 414 that has been decrypted, if necessary. All records of the selected unique table stored in identity data 820 with surrogate keys matching any record of the received host data 414 are retrieved, and processing continues in operation 1428.

In operation 1422, the surrogate key for each record in the received host data 414 that has been decrypted, if necessary, is matched to the loaded identity data 820 to identify an entity ID for each record.

In an operation 1424, the "Master" record for each identified entity ID is identified in the loaded identity data 820.

In an operation 1426, the entity ID and/or the identifiable data in the loaded identity data 820 associated with each identified "Master" record are retrieved.

In an operation 1428, the received host data 414 is joined with the retrieved entity ID and/or identifiable data from operation 1420 or 1426.

Referring to FIG. 14B, in an operation 1430, the joined host data 414 or the received host data 414 that may have been decrypted is stored on data access system 108 to a predefined location.

In an operation 1432, a determination is made concerning whether or not the PostProcessMethod input parameter value is defined. If the PostProcessMethod input parameter value is defined, processing continues in an operation 1434. If the PostProcessMethod input parameter value is not defined, processing continues in an operation 1436.

In operation 1434, the post-process script indicated by the PostProcessMethod input parameter value is executed with the stored data. The stored data can be referenced by or integrated with other applications, systems, and/or software within the first internal network and/or within the second internal network.

In operation 1436, a determination is made concerning whether or not the SaveTriggerFile input parameter value indicates to create trigger file 818. If trigger file 818 is created, processing continues in an operation 1438. If trigger file 818 is not created, processing continues in an operation 1440.

In operation 1438, trigger file 818 is created and transferred to data access system 108 to indicate retrieved data 815 is ready to use.

In operation 1440, a status of done is indicated by retrieve service 824. In an alternative embodiment, instead of using trigger file 818, a process using the stored data can call check status service 830 to get a status of processing by retrieve service 824.

Figure 15:
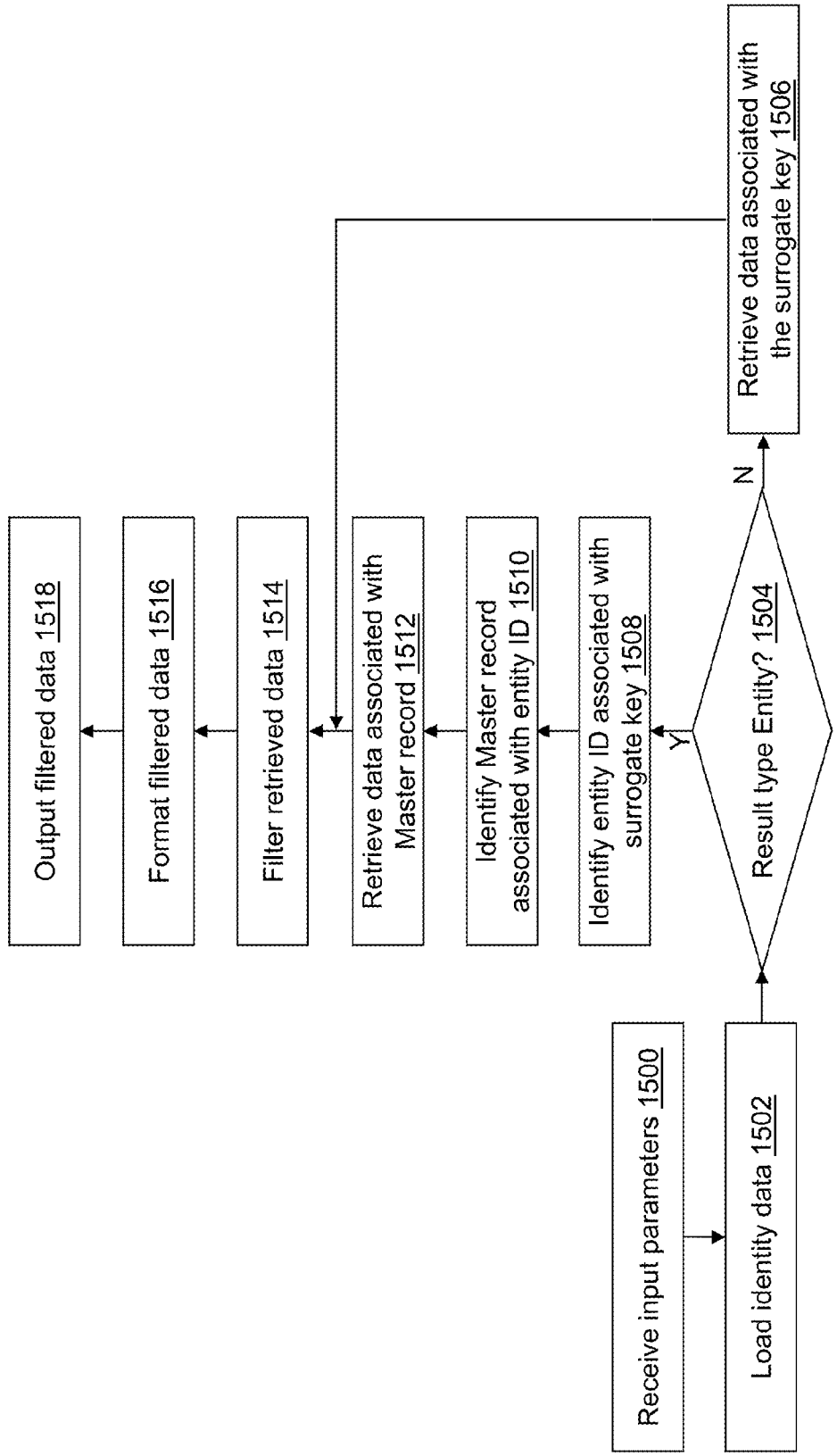
FIG. 15 depicts a flow diagram illustrating examples of data identification operations performed by the data orchestration system of FIG. 8 in accordance with an illustrative embodiment.

Referring to FIG. 15, example operations associated with identity service 826 of data orchestration application 812 are described. Identity service 826 merges identity information with host data 414 from data host system 106 to data access system 108. Additional, fewer, or different operations may be performed depending on the embodiment. The order of presentation of the operations of FIG. 15 is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using a plurality of threads or a plurality of processors.

Identity service 826 returns identifying information of de-identified entities to data access system 108. A selected set of customer users may have access to identity service 826 that outputs the entity identifying information. For customer web users, calling identity service 826 from a cloud web application prevents identifying information of de-identified data from being transferred to data intake system 104 and/or data host system 106 since the browser exists on data access system 108, which increases the security of transfer data 814, retrieved data 815, and analytic data 514 of data extraction and retrieval system 100.

For illustration, a customer user may execute a web browser on data access system 108 and connect to a web application executing on data host system 106. The web application can optionally call identity service 826 to retrieve identifiable information (if the customer user has been granted access to identity service 826). The web application can be designed such that identity service 826 is called from the web browser, using a client side script like JavaScript, to prevent any entity identifying data from passing through first firewall 114 or second firewall 116. A remote hosted application may call identity service 826 to retrieve entity identifying data to merge with queries, which may result in some entity identifying data passing through first firewall 114 or second firewall 116 though calling identity service 826 from the web application is preferred to avoid this possibility.

In an operation 1500, input parameters are received. For example, the input parameters may be read from a command line triggering execution of identity service 826. The input parameters further may be read from a predefined location by default or as defined on the command line. The input parameters may include:

SurrogateKeys—includes one or more surrogate keys for which to identify the entities and return identifying information. A plurality of surrogate keys can be included in a delimited list of surrogate keys and identifying information for each matching entity may be returned. The surrogate keys are matched and returned based on the ResultType input parameter.

OutputFormat—defines how the output should be returned. Illustrative options include HTML, XML, JSON. Returning the data in HTML or JSON format may simplify integration with a web application.

LookupIdentificationMethod—indicates a location of identity data 820. The unique table stored in identity data 820 for the LookupMethodHandleName that matches the LookupIdentificationMethod input parameter value is selected.

FieldList—defines a delimited list of fieldnames to retrieve and to return. The FieldList input parameter value may include a delimited list of field names similar to that described for the EntityResolveFields input parameter and the DeIdentifyFields input parameter. An input of blank may indicate that all fields are returned. An illustrative value for the FieldList input parameter value may be "name|account|address_Line1" or "name|tax_id|dba".

ResultType—may be "Entity" or "Record", where "Entity" returns a record flagged as the "Master" record for the entity and intersects it with received data, and "Record" returns information for that record and intersects it with received data.

In an operation 1502, identity data 820 is loaded by reading identity data 820 included with the LookupIdentificationMethod input parameter value.

In an operation 1504, a determination is made concerning whether or not the ResultType input parameter value is "Entity". If the ResultType input parameter value is "Entity", processing continues in an operation 1506. If the ResultType input parameter value is not "Entity", processing continues in an operation 1508.

In operation 1506, the entity ID and/or identifiable data stored in operations 1356 or 1358 are retrieved from the loaded identity data 820 for each of the one or more surrogate keys. All records of the selected unique table stored in identity data 820 with matching surrogate keys are retrieved, and processing continues in operation 1514.

In operation 1508, each of the one or more surrogate keys is matched to the loaded identity data 820 to identify an entity ID for each of the one or more surrogate keys.

In an operation 1510, the "Master" record for each identified entity ID is identified in the loaded identity data 820.

In an operation 1512, the entity ID and/or the identifiable data in the loaded identity data 820 associated with each identified "Master" record are retrieved.

In an operation 1514, the retrieved entity ID and/or the identifiable data is filtered using the FieldList input parameter value, if any.

In an operation 1516, the filtered data is formatted based on the OutputFormat input parameter value.

In an operation 1518, the formatted data is returned to the web browser to be rendered by the web application without transfer to or processing by data host system 106.

Update status service 828 of data orchestration application 812 updates a status of execution of data intake application 312. Update status service 828 may be called by data intake application 312 with a process ID, a user ID, a job type, a timestamp, and/or a message. This information is stored in a central logging table associated with each orchestration service. The central logging table may be initialized when data intake application 312 is installed and specified using a configuration data item.

Check status service 830 of data orchestration application 812 requests a status of any of extract service 822, retrieve service 824, or update status service 828 by passing in the job ID, a job type name, and/or a time frame. Check status service 830 may be configured to read log data. The job type name is used to filter log data by job type. The time frame defines a span of time to filter log data by job type. A job list, job details, and a job status read from the log data are returned. Check status service 830 may use any of the job ID, the job type name, and/or the time frame with an implicit "and" between them to query and return information from the read log data.

Check status service 830 can be called by a user of the first internal network associated with first firewall 114 to check a status of a job executing on the second internal network associated with second firewall 116, or check status service 830 can be called from a user of the second internal network associated with second firewall 116 to check a status of a job executing on the first internal network associated with first firewall 114. Check status service 830 is called, for example, by a web-service call that contains parameters defining what logging information a user is requesting. Check status service 830 identifies matching records in the central logging table and returns that information, for example, to a web-browser as a web page with the matching status information printed in a table.

Ad hoc tasks can be performed by calling extract service 822, retrieve service 824, identity service 826, update status service 828, and check status service 830 as described above to standardize integration resulting in fewer errors and improved auditing of tasks.

ESPE 700 can trigger execution of extract service 822 to transmit transfer data 814 to data intake system 104 when a threshold is met. Retrieve service 824 can update analytics and thresholds used by ESPE 700. ESPE 700 can be triggered to call extract service 822 based on the volume of records ready to be transferred to the cloud or a significant event (or analytic score change) occurs. These thresholds may be set in ESPE 700.

Using data orchestration application 812, data can be extracted from databases, data stores, and files, and transferred to data intake system 104 and data host system 106. Queries can be submitted to extract service 822 or a reoccurring job can be executed. Parameters can be passed into extract service 822 and jobs to extract parts of host data 414 that are available. Examples include extracting data for certain regions at a time or processing time increments of data (run extract service 822 every 15 minutes or for any new source data 214 and/or processed source data 614). Parameters passed into extract service 822 can be used to filter and query source data 214 and/or processed source data 614. Once transfer data 322 is received by data intake system 104, it is ingested using data intake application 312. because extract service 822 creates transfer data 814 that conforms to the standards described for and expected by data intake application 312.

To limit the amount of identifiable and sensitive data that exists in data intake system 104 and data host system 106, the LookupIdentificationMethod enables extract service 822 to perform entity resolution and mask (or remove) identifying data prior to transmitting transfer data 814 to data intake system 104. Identify data 820 retains the identifying information and corresponding entity surrogate key so that the identifying information is available for data access system 108.

A query and/or report using source data 214 for situational awareness may be executed to assess a data rate of change, determine if data is ready for processing, or view a subset of data not automatically loaded to data intake system 104. This may be returned when extract service 822 is called with the ExtractType input parameter value of "Report" and a ReportOutputType input parameter value. A summarized report based on data to support a decision is returned.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a first computing device control the first computing device to:
   receive a record to transfer to a second computing device, wherein the second computing device is connected to an external network separated from an internal network by a firewall, wherein the first computing device is connected to the internal network, wherein the record includes a plurality of fields, wherein each field of the plurality of fields includes a field value;
   identify a field of the plurality of fields of the received record to remove from the received record;
   create a surrogate key for the received record, wherein the created surrogate key uniquely identifies the received record;
   append the created surrogate key to the plurality of fields of the received record;
   extract a field value from the identified field of the received record;
   store the created surrogate key and the extracted field value to identity data stored on the internal network;
   update the received record to remove the identified field from the received record;
   send the updated record to the second computing device;
   receive a second record from the second computing device, wherein the second record includes the created surrogate key;
   read the identity data stored on the internal network that includes a plurality of identity records, wherein each identity record includes a second surrogate key and a second extracted field value, wherein the second surrogate key uniquely identifies the respective record;
   compare the created surrogate key included in the second record to the second surrogate key to identify a matching record from the read identity data;
   select the second extracted field value included in the identified matching record, wherein the second extracted field value is the extracted field value;
   supplement the received record with the selected second extracted field value;
   store the supplemented record on the internal network;
   read a post-process script stored on the internal network; and
   execute, on the internal network, the read post-process script with the supplemented record as an input to the read post-process script.

2. The non-transitory computer-readable medium of claim 1, wherein each identity record includes a plurality of second extracted field values, wherein the second extracted field value is one of the plurality of second extracted field values.

3. The non-transitory computer-readable medium of claim 1, wherein each identity record further includes an entity identifier field value and a record type field value, wherein, before selecting the second extracted field value, the computer-readable instructions further control the first computing device to:
   receive a result type value, wherein the result type value indicates whether or not to retrieve a master record;
   when the received result type value indicates to retrieve the master record,
   select the entity identifier field value included in the identified matching record;
   compare the selected entity identifier field value to the entity identifier field value of the plurality of records to identify the master record for the second surrogate key from the read identity data, wherein the record type field value includes an indicator that indicates whether or not the respective record is the master record; and
   select the second extracted field value included in the identified master record; and when the received result type value does not indicate to retrieve the master record, the second extracted field value is selected from the identified matching record.

4. The non-transitory computer-readable medium of claim 1, wherein, before comparing the created surrogate key to the second surrogate key, the computer-readable instructions further control the first computing device to decrypt the received record, wherein the decrypted, created surrogate key is compared to the second surrogate key.

5. The non-transitory computer-readable medium of claim 1, wherein, before sending the updated record, the computer-readable instructions further control the first computing device to:
   read retrieval instructions stored on the internal network, wherein the retrieval instructions include connection information used to connect to the second computing device; and
   connect to the second computing device using the read retrieval instructions.

6. The non-transitory computer-readable medium of claim 5, wherein the retrieval instructions are read from a handle lookup table using a predefined output handle name.

7. The non-transitory computer-readable medium of claim 5, wherein the connection information includes a protocol, credentials, and a connectivity option.

8. The non-transitory computer-readable medium of claim 7, wherein the credentials include a username and a password for connecting to the second computing device.

9. The non-transitory computer-readable medium of claim 7, wherein the connectivity option includes a hostname of the second computing device and a port number of the second computing device to which to connect.

10. The non-transitory computer-readable medium of claim 7, wherein the connection information further includes an indicator defining whether receipt of the second record is sequential or parallel.

11. The non-transitory computer-readable medium of claim 1, wherein the read post-process script streams the supplemented record to an event stream processing engine.

12. The non-transitory computer-readable medium of claim 1, wherein removing the identified field comprises dropping the identified field from the plurality of fields of the record.

13. The non-transitory computer-readable medium of claim 1, wherein removing the identified field comprises clearing the identified field of the plurality of fields of the record.

14. The non-transitory computer-readable medium of claim 1, wherein the received record is updated by executing a de-identification script.

15. A computing device comprising:
a processor; and
a non-transitory computer-readable medium operably coupled to the processor, the computer-readable medium having computer-readable instructions stored thereon that, when executed by the processor, control the computing device to
receive a record to transfer to a second computing device, wherein the second computing device is connected to an external network separated from an internal network by a firewall, wherein the first computing device is connected to the internal network, wherein the record includes a plurality of fields, wherein each field of the plurality of fields includes a field value;
identify a field of the plurality of fields of the received record to remove from the received record;
create a surrogate key for the received record, wherein the created surrogate key uniquely identifies the received record;
append the created surrogate key to the plurality of fields of the received record;
extract a field value from the identified field of the received record;
store the created surrogate key and the extracted field value to identity data stored on the internal network;
update the received record to remove the identified field from the received record;
send the updated record to the second computing device;
receive a second record from the second computing device, wherein the second record includes the created surrogate key;
read the identity data stored on the internal network that includes a plurality of identity records, wherein each identity record includes a second surrogate key and a second extracted field value, wherein the second surrogate key uniquely identifies the respective record;
compare the created surrogate key included in the second record to the second surrogate key to identify a matching record from the read identity data;
select the second extracted field value included in the identified matching record, wherein the second extracted field value is the extracted field value;
supplement the received record with the selected second extracted field value;
store the supplemented record on the internal network;
read a post-process script stored on the internal network; and
execute, on the internal network, the read post-process script with the supplemented record as an input to the read post-process script.

16. The computing device of claim 15, wherein the read post-process script streams the supplemented record to an event stream processing engine.

17. The computing device of claim 15, wherein each identity record includes a plurality of second extracted field values, wherein the second extracted field value is one of the plurality of second extracted field values.

18. The computing device of claim 15, wherein each identity record further includes an entity identifier field value and a record type field value, wherein, before selecting the second extracted value, the computer-readable instructions further control the computing device to:
receive a result type value, wherein the result type value indicates whether or not to retrieve a master record; when the received result type value indicates to retrieve the master record,
select the entity identifier field value included in the identified matching record;
compare the selected entity identifier field value to the entity identifier field value of the plurality of records to identify the master record for the second surrogate key from the read identity data, wherein the record type field value includes an indicator that indicates whether or not the respective record is the master record; and
select the second extracted field value included in the identified master record; and when the received result type value does not indicate to retrieve the master record, the second extracted field value is selected from the identified matching record.

19. The computing device of claim 15, wherein, before comparing the created surrogate key to the second surrogate key, the computer-readable instructions further control the computing device to decrypt the received second record, wherein the decrypted, created surrogate key is compared to the second surrogate key.

20. The computing device of claim 15, wherein, before sending the updated record, the computer-readable instructions further control the computing device to:
read retrieval instructions stored on the internal network, wherein the retrieval instructions include connection information used to connect to the second computing device; and
connect to the second computing device using the read retrieval instructions.

21. The computing device of claim 20, wherein the retrieval instructions are read from a handle lookup table using a predefined output handle name.

22. The computing device of claim 20, wherein the connection information includes a protocol, credentials, and a connectivity option.

23. A method of de-anonymizing data, the method comprising:
receiving, by a first computing device, a record to transfer to a second computing device, wherein the second computing device is connected to an external network separated from an internal network by a firewall, wherein the first computing device is connected to the internal network, wherein the record includes a plurality of fields, wherein each field of the plurality of fields includes a field value;
identifying, by the first computing device, a field of the plurality of fields of the received record to remove from the received record;
creating, by the first computing device, a surrogate key for the received record, wherein the created surrogate key uniquely identifies the received record;

appending, by the first computing device, the created surrogate key to the plurality of fields of the received record;

extracting, by the first computing device, a field value from the identified field of the received record;

storing, by the first computing device, the created surrogate key and the extracted field value to identity data stored on the internal network;

updating by the first computing device, the received record to remove the identified field from the received record;

sending, by the first computing device, the updated record to the second computing device;

receiving, by the first computing device, a second record from the second computing device, wherein the second record includes the created surrogate key;

reading, by the first computing device, the identity data stored on the internal network that includes a plurality of identity records, wherein each identity record includes a second surrogate key and a second extracted field value, wherein the second surrogate key uniquely identifies the respective record;

comparing, by the first computing device, the created surrogate key included in the second record to the second surrogate key to identify a matching record from the read identity data;

selecting, by the first computing device, the second extracted field value included in the identified matching record, wherein the second extracted field value is the extracted field value;

supplementing, by the first computing device, the received record with the selected second extracted field value;

storing, by the first computing device, the supplemented record on the internal network;

reading, by the first computing device, a post-process script stored on the internal network; and executing, by the first computing device on the internal network, the read post-process script with the supplemented record as an input to the read post-process script.

24. The method of claim 23, wherein the read post-process script streams the supplemented record to an event stream processing engine.

25. The method of claim 23, wherein each identity record includes a plurality of second extracted field values, wherein the second extracted field value is one of the plurality of second extracted field values.

26. The method of claim 23, wherein each identity record further includes an entity identifier field value and a record type field value, wherein, before selecting the second extracted field value, the method further comprises:

receiving, by the first computing device, a result type value, wherein the result type value indicates whether or not to retrieve a master record;

when the received result type value indicates to retrieve the master record, select the entity identifier field value included in the identified matching record;

compare the selected entity identifier field value to the entity identifier field value of the plurality of records to identify the master record for the second surrogate key from the read identity data, wherein the record type field value includes an indicator that indicates whether or not the respective record is the master record; and select the second extracted field value included in the identified master record; and when the received result type value does not indicate to retrieve the master record, the second extracted value is selected from the identified matching record.

27. The method of claim 23, wherein, before comparing the created surrogate key to the second surrogate key, the method further comprises decrypting, by the first computing device, the received record, wherein the decrypted, created surrogate key is compared to the second surrogate key.

28. The method of claim 23, wherein, before sending the updated record, the method further comprises:

reading, by the first computing device, retrieval instructions stored on the internal network, wherein the retrieval instructions include connection information used to connect to the second computing device; and connecting the first computing device to the second computing device using the read retrieval instructions.

29. The method of claim 28, wherein the retrieval instructions are read from a handle lookup table using a predefined output handle name.

30. The method of claim 28, wherein the connection information includes a protocol, credentials, and a connectivity option.

* * * * *